US010472294B2

(12) United States Patent
Rezai et al.

(10) Patent No.: US 10,472,294 B2
(45) Date of Patent: Nov. 12, 2019

(54) SEMI-HUMIC COMPOSITION AND METHODS OF USE THEREOF

(71) Applicant: Actagro, LLC, Fresno, CA (US)

(72) Inventors: Taha Rezai, Clovis, CA (US);
Qingwen He, Fresno, CA (US);
Thomas J. Gerecke, Visalia, CA (US);
John L. Breen, Fresno, CA (US);
Susan Her, Fresno, CA (US); Gregory A. Crawford, Fresno, CA (US);
Montell L. Bayer, Fresno, CA (US)

(73) Assignee: Actagro, LLC, Fresno, CA (US)

( * ) Notice: Subject to any disclaimer, the term of this patent is extended or adjusted under 35 U.S.C. 154(b) by 137 days.

(21) Appl. No.: 15/590,933

(22) Filed: May 9, 2017

(65) Prior Publication Data

US 2017/0327429 A1 Nov. 16, 2017

Related U.S. Application Data

(60) Provisional application No. 62/347,555, filed on Jun. 8, 2016, provisional application No. 62/334,248, filed on May 10, 2016.

(51) Int. Cl.
| | | |
|---|---|---|
| C05F 11/02 | (2006.01) | |
| C05C 11/00 | (2006.01) | |
| C05G 3/00 | (2006.01) | |
| C08H 99/00 | (2010.01) | |

(52) U.S. Cl.
CPC .............. *C05C 11/00* (2013.01); *C05F 11/02* (2013.01); *C05G 3/007* (2013.01); *C08H 99/00* (2013.01)

(58) Field of Classification Search
None
See application file for complete search history.

(56) References Cited

U.S. PATENT DOCUMENTS

| 4,069,034 A * | 1/1978 | Hoover ..................... C05B 7/00 |
| | | 23/300 |
| 4,319,041 A * | 3/1982 | Goff ........................ C08H 99/00 |
| | | 562/475 |
| 6,911,415 B1 | 6/2005 | Ueland et al. |

(Continued)

FOREIGN PATENT DOCUMENTS

| CN | 1104197 | 6/1995 |
| CN | 101074179 | 11/2007 |

(Continued)

OTHER PUBLICATIONS

International Search Report and Written Opinion for International Application No. PCT/US2017/031819, dated Jul. 17, 2017. (13 pages).

(Continued)

*Primary Examiner* — Wayne A Langel
(74) *Attorney, Agent, or Firm* — Sheppard Mullin Richter & Hampton LLP

(57) ABSTRACT

This disclosure relates to a semi-humic composition comprising one or more humic substance which has been chemically interacted with one or more organic non-humic nitrogenous molecules, methods of use thereof, and a process for obtaining the same. The compositions provided herein are useful for enhancing crop growth, and in particular, in the area of organic farming.

3 Claims, 6 Drawing Sheets

(56) References Cited

U.S. PATENT DOCUMENTS

| | | | |
|---|---|---|---|
| 7,947,818 B2 * | 5/2011 | Freire | C05D 9/02 536/121 |
| 10,315,962 B2 | 6/2019 | Rezai et al. | |
| 2008/0216534 A1 | 9/2008 | Karr | |
| 2012/0279266 A1 | 11/2012 | Van Dyke | |
| 2017/0217847 A1 | 8/2017 | Gerecke et al. | |
| 2017/0303534 A1 | 10/2017 | Gerecke et al. | |

FOREIGN PATENT DOCUMENTS

| | | |
|---|---|---|
| CN | 102942402 | 2/2013 |
| CN | 103436316 | 12/2013 |
| DE | 4009886 | * 10/1991 |
| DE | 19720871 | * 11/1998 |
| DK | 600988 | * 10/1988 |
| FR | 2752571 | * 2/1998 |
| WO | WO-2016/022582 | 2/2016 |
| WO | WO-2016/064756 | 4/2016 |
| WO | WO-2017/136566 | 8/2017 |

OTHER PUBLICATIONS

International Preliminary Report on Patentability for International Application No. PCT/US2017/031819 dated Nov. 13, 2018. (8 pages).

* cited by examiner

FIG. 2
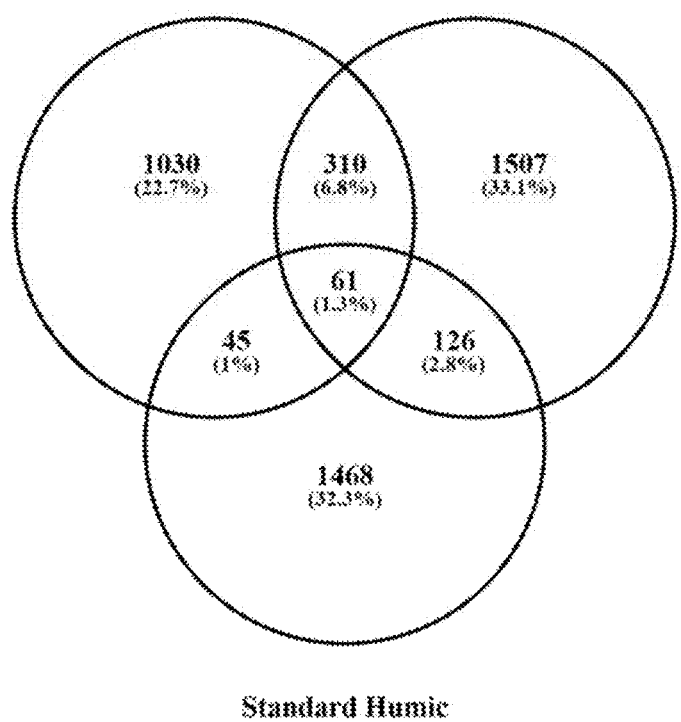

SEMI-HUMIC COMPOSITION AND METHODS OF USE THEREOF

CROSS-REFERENCE TO RELATED APPLICATIONS

This application claims the benefit under 35 U.S.C. 119(e) to U.S. Provisional Application Ser. Nos. 62/334,248, filed May 10, 2016, and 62/347,555, filed Jun. 8, 2016, where the contents of each is incorporated herein by reference in its entirety.

FIELD

This disclosure relates to a semi-humic composition comprising one or more humic substances which has been chemically interacted with one or more organic non-humic nitrogenous molecules, methods of use thereof, and a process for obtaining the same. The compositions provided herein are useful for enhancing crop growth, in particular in the area of organic farming.

BACKGROUND

Farmers typically employ agricultural fertilizers to maintain good yields, product quality and profitability. Organic farmers, like any other, need to provide nitrogen to their crops, but also must adhere to strict requirements to ensure that the nitrogen source is approved for use in organic crop farming. In addition, determining which organic fertilizer material to use, how much to apply and when to apply it, is vital, and is even considered more challenging organically than it is conventionally. One major challenge when using organic nitrogen as a fertilizer is synchronizing the timing of mineralization with plant demand as nitrogen mineralization into ammonium and nitrate forms is required before uptake by most plants. Failure to synchronize nitrogen mineralization with crop uptake can lead to plant nutrient deficiencies, excessive soil nitrogen beyond the growing season, and the potential for excessive nitrate leaching.

Manures and composts, which are commonly used as nitrogen sources in organic farming, contain and release nitrogen slowly and in varying amounts. As such, it is difficult to use them efficiently for optimal crop growth. In addition, as compost ages, the availability of the nitrogen it contains tends to decrease. An animal-based organic nitrogen fertilizer, like blood meal, may "burn" delicate vegetable roots if applied without mixing into the soil, or too close to established plants. In addition to burning roots, animal-based fertilizers may also attract rats, raccoons, opossums, and other unwelcome nocturnal pests.

SUMMARY

The present disclosure relates to a semi-humic composition comprising one or more humic substances which has been chemically interacted with organic non-humic nitrogenous molecules. It is contemplated that the semi-humic composition disclosed herein has a unique chemical make-up which provides, in one embodiment, an increased, more reliable and predictable rate of mineralization in soil. In addition, the semi-humic composition described herein results in a more rapid uptake of nitrogen in the crop, as well as improved plant growth, development and yield.

In one embodiment, the semi-humic composition disclosed herein may be obtained by a process comprising the steps of:

(a) heating an aqueous composition of an organic non-humic nitrogenous source in the presence of a base to a temperature of about 100° F. or higher;

(b) adding leonardite ore or other soft brown coal to the composition and mixing to provide a liquid portion and a solids portion; and (c) separating the liquid portion from the solids portion to provide the semi-humic composition.

In certain embodiments, step (a) is performed at a temperature of about 160° F. or higher for at least about 1 hour or more, or at least about 2 hours. In certain embodiments, step (b) is performed at a temperature of about 160° F. or higher for at least about 30 minutes, or at least about 1 hour or more, or at least about 2 hours.

In one embodiment, the semi-humic composition described herein may be obtained by a process which comprises:

(a) heating an aqueous composition of leonardite ore or other soft brown coal in the presence of a base to a temperature of about 160° F. or higher to provide a composition having a liquid portion and a solids portion;

(b) mixing an organic non-humic nitrogenous source with the composition of step (a) and heating to a temperature of at least about 160° F. for at least about 2 hours, and optionally further removing solids, to provide the semi-humic composition. In certain embodiments, step (a) is performed at a temperature of about 160° F. or higher for at least about 30 minutes, or at least about 1 hour or more, or at least about 2 hours. In certain embodiments, the process further comprises adding a non-humic organic carbon source, such as an organic acid. In certain embodiments, the process further comprises the step of separating the liquid portion from the solids portion of step (a). In such instances, the mixing of step (b) comprises mixing the organic non-humic nitrogenous source with the liquid portion of step (a).

It is contemplated that by performing the processes as described herein, the organic non-humic nitrogenous source is at least partially hydrolyzed and/or broken down into reactive organic constituents which then chemically interacts with humic material obtained from the leonardite ore or other soft brown coal. As such, also provided herein is a semi-humic composition obtainable by the processes disclosed herein.

The present disclosure also relates to methods for increasing the rate of nitrogen mineralization in soil, increasing nitrogen content in a crop, and increasing the rate of nitrogen uptake by a crop.

In addition, the present disclosure relates to methods for enhancing crop growth and yield using an organic nitrogen source.

BRIEF DESCRIPTION OF THE DRAWINGS

Other features and advantages will occur from the following description and the accompanying drawings.

FIG. 2 shows a Venn Diagram displaying the molecular formula overlap between the samples of Example 2. The unique molecular formulas identified in the semi-humic composition are displayed in Table 5B in their neutral sum format.

DETAILED DESCRIPTION

Definitions

Figure 1A:
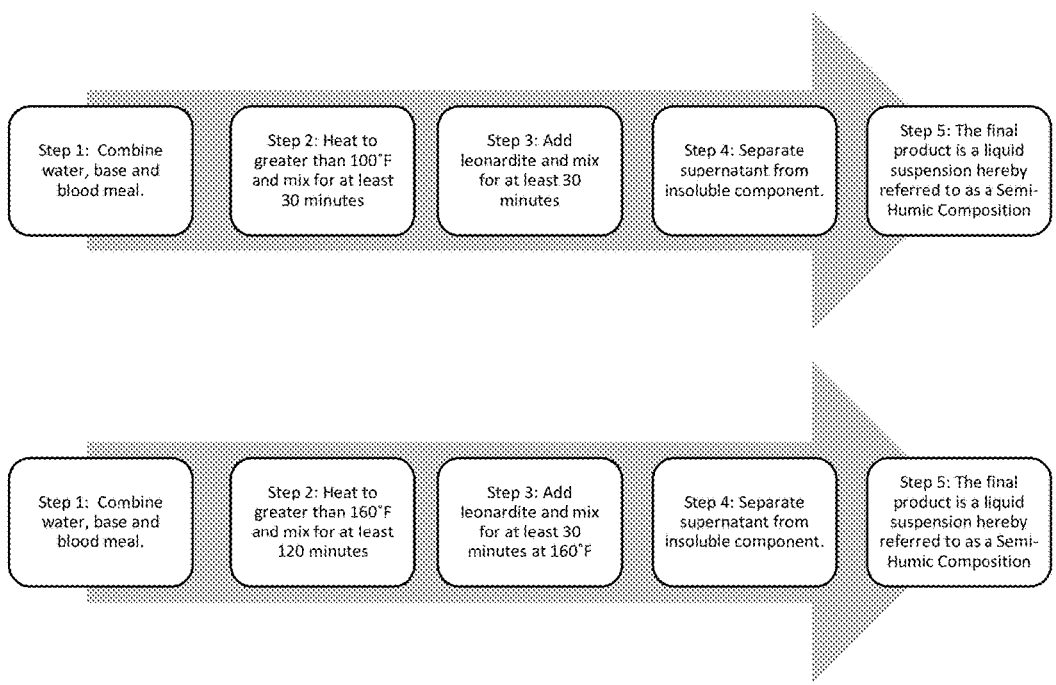
FIGS. 1A and 1B show a synthetic flow chart for semi-humic composition.

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

LIST OF ABBREVIATIONS mg Milligrams
ESI Electrospray ionization
LC-ESI- liquid chromatography-electrospray ionization-
MS tandem mass spectrometry
O:C Oxygen to carbon ratio
H:C Hydrogen to carbon ratio
FID Flame ionization detector
FTCIR Fourier transform ion cyclotron resonance
w/w Weight/weight
m/z mass-to-charge ratio
MS Mass spectrometry
Kg Kilograms
mL Milliliter
g Gram
μg Microgram
mm Millimeter
cm Centimeter
Ac/ac Acre
Ha Hectare
Da Dalton
s Seconds
wt Weight
L Liter
lbs/lb Pounds
mM Millimolar
Gal/gal Gallon
N Nitrogen
V Volume
μL Microliter
M Molar
H Hour
CDFA California Department of Food & Agriculture
ANOVA Analysis of Variance It must be noted that as used herein and in the appended claims, the singular forms "a", "an", and "the" include plural referents unless the context clearly dictates otherwise. Thus, for example, reference to "a nutrient" includes a plurality of nutrients.

Unless defined otherwise, all technical and scientific terms used herein have the same meaning as commonly understood by one of ordinary skill in the art to which this disclosure belongs. As used herein the following terms have the following meanings.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) claimed. "Consisting of" shall mean excluding more than trace elements of other ingredients and substantial method steps. Embodiments defined by each of these transition terms are within the scope of this disclosure.

The term "about" when used before a numerical designation, e.g., temperature, time, amount, and concentration, including range, indicates approximations which may vary by (+) or (−) 10%, 5% or 1%.

Humic substances (HS) are defined by the IHSS (International Humic Substances Society) as complex, heterogeneous mixtures of polydispersed materials formed by biochemical and chemical reactions during the decay and transformation of plant and microbial remains (a process called humification). HS are naturally present in soil, water, peats, brown coals and shales. Traditionally these substances have been isolated into three fractions: humic acid, fulvic acid and humin. These fractions are operationally defined based on solubility in basic and acidic solutions. Leonardite, a brown coal, is known to be rich in humic acid.

As used herein, the term "semi-humic composition" is intended to refer to a composition which comprises molecules from both humic substances and non-humic substances, such as molecules originating from an organic non-humic nitrogenous source (e.g., blood meal) and optionally additional non-humic carbon sources (e.g., an organic acid). In certain embodiments, the term "semi-humic" is intended to refer to a composition which comprises both humic and non-humic organic carbon molecules which have been transformed into new molecules containing carbon from both sources.

The term "organic non-humic nitrogenous molecules" is intended to refer to molecules which are present in plant and/or animal by-products (e.g., derived from fresh and or partially decomposed plant material, animal manure, animal and/or fish parts). The organic non-humic nitrogenous molecules are typically considered to be proteins, peptides, amines, amides and/or amino acids. Suitable sources for non-humic nitrogenous molecules includes, but are not limited to, those derived from blood meal, intestines, bone meals, feathers, crustacean, microbial, bacterial, protozoan, chromistan, fungal biomass, fresh corn meal, soy meal and/or other plant seed materials. See, e.g., Mikkelsen, et al. Better Crops, 2008, 92(4), 16-19.

The term "chemically interacted" is intended to generally refer to all types of chemical bonding, including and not limited to, non-covalent (e.g., hydrogen or ionic) and/or covalent bonding. In certain embodiments, the chemical interaction is a combination of covalent and non-covalent bonding interactions between the components obtained from the organic non-humic nitrogen source and the components obtained from the humic substance (e.g., leonardite ore or other soft brown coal).

As used herein, the term "fertilizer" is intended to refer to is any material of natural (organic) or synthetic origin (other than liming materials) that is applied to soils or to plant tissues (usually leaves) to supply one or more plant nutrients essential to the growth of plants. An "organic" type fertilizer is primarily derived from decomposed or processed plant and/or animal by-products (e.g., manure or fish emulsion). The fertilizer can comprise liquid and/or solid components and may contain one or more additional micronutrients, such as iron, manganese, molybdenum, zinc, and/or copper.

The term "applying" or "applied" is intended to refer to any suitable method for applying the semi-humic composition and a fertilizer to soil. The term is intended to encompass methods for applying liquid, solid, or other form or mixture thereof to the soil or plant (e.g., foliar application). In certain embodiments, the "applying" or "applied" comprises one or more of spraying, flooding, soil injection and/or chemigation, and can be to the soil at any point or to the plant or crop (e.g., foliar application).

The term "nitrogen mineralization" is intended to refer to the process wherein nitrogen is converted to plant-usable ammonium and nitrate forms.

Semi-Humic Composition

Disclosed herein is a semi-humic composition comprising one or more humic substance which has been chemically interacted with one or more organic non-humic nitrogenous molecules. The one or more organic non-humic nitrogenous molecules are considered to be, in general, molecules such as peptides or other amine, amide, and/or amino acid containing molecules. The source for the one or more organic non-humic nitrogenous molecules can be derived from any fresh or decomposed plant and/or animal by-product. In certain embodiments, the one or more organic non-humic nitrogenous molecules is derived from plant material, such as but not limited to, fungal biomass, fresh corn meal, soy meal and/or other plant seed materials. In another embodiment, the one or more organic non-humic nitrogenous molecules is derived from animal material. The animal material can comprise any one or more of animal waste (e.g., manure) or animal parts, such as but not limited to, blood meal, intestines, bone meals, feathers, crustaceans and/or fish. Other suitable organic non-humic nitrogenous materials are known in the art (see, e.g., Mikkelsen, et al. Better Crops, 2008, 92(4), 16-19).

In certain embodiments, it is contemplated that the one or more organic non-humic nitrogenous molecules in the semi-humic composition described herein are, at least in large part, covalently bonded to the humic substance (including chelation). However, it may be also be that one or more organic non-humic nitrogenous molecules have been chemically interacted with the humic substance via non-covalent interactions such as hydrogen bonding, coordination, ionic bonding, Van der Waals forces and/or hydrophobic interactions.

As shown in Example 1 below, the actual humic-like content of the semi-humic composition as disclosed herein is almost twice as large as the theoretically expected value, which assumes 100% organic extraction of leonardite. This suggests that the process described herein results in chemical interactions, or complexation, between molecules derived from non-humified organic matter (e.g., blood meal) and humified leonardite-derived organic matter, thus resulting in the semi-humic composition. In certain embodiments, the semi-humic composition comprises at least about 5% humic acid as calculated via the CDFA method. In other embodiments, the semi-humic composition comprises at least about 6%, or at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 20%, or from about 10 to about 20%, or from about 15 to about 20%, or from about 5 to about 12% humic acid as calculated via the CDFA method.

The increase in % weight of the humic-like component is contemplated to be due, at least in part, to the organic non-humic nitrogenous component forming a complex with the compounds obtained from the leonardite ore or other soft brown coal during the humic acid extraction process. It is therefore contemplated that this complex formation is a result of the presence of organic non-humic nitrogenous molecules during the mixing step. Accordingly, other compositions containing leonardite ore or other soft brown coal, or an extract thereof, and another organic non-humic nitrogenous component would not contain the semi-humic composition described herein simply by adding the two components to the soil, or even in a single composition before application to soil.

The amount of nitrogen in the semi-humic composition typically ranges from about 1% to about 20%, or is at least about 3%, or at least about 4%, or at least about 5%, or at least about 8%, or is at least about 10%, or is at least about 15%, or is at least about 20%. However, the amount of nitrogen in the semi-humic composition can be varied based on the amount of organic non-humic nitrogenous source used in the process for obtaining the semi-humic composition. In certain embodiments, the amount of nitrogen in the semi-humic composition is about 3-4%.

In certain embodiments, the amount of nitrogen in the semi-humic composition can be increased by implementing a higher temperature and/or longer mixing time. For example, in certain embodiments, a semi-humic composition having at least about 3% solubilized nitrogen can be prepared by performing the mixing step at a temperature at or above 160° F. for at least about 2 hours. Further, in certain embodiments, the pH of the mixing step should be at least about 14 such that the mixing can be performed for a sufficient amount of time (i.e., at least about 2 hours).

In one embodiment, provided is a semi-humic composition characterized as having from about 30 to about 40% of molecules classified as lipid, protein and other aliphatic by FTICR-MS. The lipid, protein and other aliphatic region of a Van Krevelen diagram is typically defined as those molecules exhibiting a H:C of between about 1.5 and about 2.2, and exhibiting a O:C of between 0 and about 0.67 by FTICR-MS. Accordingly, also provided herein is a semi-humic composition characterized as having about 37% of molecules exhibiting a H:C of between about 1.5 and about 2.2, and exhibiting a O:C of between 0 and about 0.67 by FTICR-MS. In certain embodiments, provided is a semi-humic composition characterized as having about 30%, or about 32%, or about 34%, or about 35%, or about 37%, or about 38% of molecules classified as Lipid, protein and other aliphatic by FTICR-MS.

In some embodiments, the semi-humic composition is characterized as having from about 25 to about 30% of molecules classified as lignin by FTICR-MS. The lignin region of a Van Krevelen diagram is typically defined as those molecules exhibiting a H:C of between about 0.7 and about 1.5, and exhibiting a O:C of between 0.1 and about 0.67 by FTICR-MS. Accordingly, also provided herein is a semi-humic composition characterized as having about 26% of molecules exhibiting a H:C of between about 0.7 and about 1.5, and exhibiting a O:C of between 0.1 and about 0.67 by FTICR-MS. In certain embodiments, provided is a semi-humic composition characterized as having about 25%, or about 26%, or about 27%, or about 28% of molecules classified as lignin by FTICR-MS.

In some embodiments, the semi-humic composition is characterized as having from about 5 to about 10% of molecules classified as condensed aromatic by FTICR-MS. The condensed aromatic region of a Van Krevelen diagram is typically defined as those molecules exhibiting a H:C of between about 0.2 and about 0.7, and exhibiting a O:C of between 0 and about 0.67 by FTICR-MS. Accordingly, also provided herein is a semi-humic composition characterized as having about 9% of molecules exhibiting a H:C of between about 0.2 and about 0.7, and exhibiting a O:C of between 0 and about 0.67 by FTICR-MS. In certain embodiments, provided is a semi-humic composition characterized as having about 5%, or about 6%, or about 7%, or about 8%, or about 9%, or about 10% of molecules classified as Condensed Aromatic by FTICR-MS.

In some embodiments, the semi-humic composition is characterized as having about 1 to about 2% of molecules classified as carbohydrate by FTICR-MS. The carbohydrate region of a Van Krevelen diagram is typically defined as those molecules exhibiting a H:C of between about 1.5 and about 2.4, and exhibiting a O:C of between 0.67 and about 1.2 by FTICR-MS. Accordingly, also provided herein is a semi-humic composition characterized as having between about 1-2% of molecules exhibiting a H:C of between about 1.5 and about 2.4, and exhibiting a O:C of between 0.67 and about 1.2 by FTICR-MS. In certain embodiments, provided is a semi-humic composition characterized as having greater than 1%, or about 1%, or about 1.5%, or about 2%, or about 3%, or about 4% or about 5% of molecules classified as carbohydrate by FTICR-MS.

In some embodiments, the semi-humic composition is characterized as having from about 25% to about 30% of molecules classified as unsaturated hydrocarbon by FTICR-MS. The unsaturated hydrocarbon region of a Van Krevelen diagram is typically defined as those molecules exhibiting a H:C of between about 0.7 and about 1.5, and exhibiting a O:C of between 0 and about 0.1 by FTICR-MS. Accordingly, also provided herein is a semi-humic composition characterized as having between about 25% to about 30% of molecules exhibiting a H:C of between about 0.7 and about 1.5, and exhibiting a O:C of between 0 and about 0.1 by FTICR-MS. In certain embodiments, provided is a semi-humic composition characterized as about 25%, or about 26%, or about 27%, or about 28%, or about 29% or about 30% of molecules classified as unsaturated hydrocarbon by FTICR-MS.

In one embodiment, provided is a semi-humic composition characterized as having about 35-40% of molecules classified as lipid, protein and other aliphatic and about 25-30% of molecules classified as lignin by FTICR-MS. In one embodiment, provided is a semi-humic composition characterized as having about 35-40% of molecules classified as lipid, protein and other aliphatic, about 25-30% of molecules classified as lignin, about 5-10% of compounds classified as condensed aromatic, and about 1-2% of molecules classified as carbohydrate by FTICR-MS. In one embodiment, provided is a semi-humic composition characterized as having about 35-40% of molecules classified as lipid, protein and other aliphatic, about 25-30% of molecules classified as lignin, about 5-10% of compounds classified as condensed aromatic, about 1-2% of molecules classified as carbohydrate, and about 25-30% of molecules classified as unsaturated hydrocarbon by FTICR-MS.

As shown in the Venn diagram of FIG. 2, a significant percentage of the molecules identified in the semi-humic composition have molecular formulas which are unique to the composition described herein (Table 5B). Accordingly, also provided is a semi-humic composition, wherein the composition is characterized as comprising at least about 50% of the molecular formulas of Table 5B. In certain embodiments, provided is a semi-humic composition, wherein the composition is characterized as comprising at least about 55%, or at least about 60%, or at least about 65%, or at least about 70%, or at least about 75%, or at least about 80%, or at least about 85%, or at least about 90%, or at least about 95% of the molecular formulas of Table 5B. In certain embodiments, provided is a semi-humic composition, wherein the composition is characterized as comprising from about 50-95%, or about 60-95%, or about 70-95% of the molecular formulas of Table 5B.

In one embodiment, the semi-humic composition described herein may be obtained by a process which comprises:

(a) heating an aqueous composition of an organic non-humic nitrogenous source in the presence of a base to a temperature of about 100° F. or higher;

(b) adding leonardite ore or other soft brown coal to the composition and mixing to provide a liquid portion and a solids portion; and (c) separating the liquid portion from the solids portion to provide the semi-humic composition.

In certain embodiments, step (a) is performed at a temperature of about 160° F. or higher for at least about 1 hour or more, or at least about 2 hours. In certain embodiments, step (b) is performed at a temperature of about 160° F. or higher for at least about 30 minutes, or at least about 1 hour or more, or at least about 2 hours.

In the above process, the amount of nitrogen and carbon components can be tailored based on the ratio of the organic non-humic nitrogenous source and the leonardite ore (or other soft brown coal) used. It is contemplated that the ratio of the organic non-humic nitrogenous source to leonardite ore (or other soft brown coal) can vary from about 1:2 to about 30:1, or about 1:2, about 1:1, about 2:1, about 3:1, about 4:1, about 5:1, about 8:1, about 10:1, about 15:1, about 20:1, or about 30:1. In certain embodiments, the ratio of the organic non-humic nitrogenous source to leonardite ore (or other soft brown coal) is about 3:1.

In certain embodiments, the organic non-humic nitrogenous source (e.g., blood meal) is used in about 15-25% by weight with respect to the total weight of the composition. In other embodiments, the blood meal is used in about 15, or about 20% or about 25% by weight with respect to the total weight of the composition.

In certain embodiments, the leonardite ore or other soft brown coal is used in about 4-8% by weight with respect to the total weight of the composition. In other embodiments, the leonardite ore or other soft brown coal is used in about 4%, about 5%, about 6%, about 7% or about 8% by weight with respect to the total weight of the composition.

In certain embodiments, the amount of water in the composition (by weight with respect to the total weight of the composition) is about 35-80% by weight, or about 55-80% by weight. In certain embodiments, the amount of water is about 35%, or about 40%, or about 45%, or about 50%, or about 55%, or about 60%, or about 65%, or about 70%, or about 75%, or about 80% by weight.

In certain embodiments, the base of step (a) is a strong base (e.g., an Arrhenius base). In certain embodiments, the base of step (a) is one or more bases selected from the group consisting of LiOH, NaOH, KOH, RbOH, CsOH, $Ca(OH)_2$, $Sr(OH)_2$, and $Ba(OH)_2$. In certain embodiments, the about of base employed in the process (by weight with respect to the total weight of the composition) is about 2-12% by weight, or about 2-10% by weight, or about 2-5% by weight, or about 4-5% by weight. In certain embodiments, the amount of base employed in the process (by weight with respect to the total weight of the composition) is about 2%, or about 3%, or about 4%, or about 4.5%, or about 5%, or about 7%, or about 10%, or about 12% by weight.

In certain embodiments, the base employed is potassium hydroxide (KOH). Accordingly, in certain embodiments, the semi-humic composition comprises a percentage of soluble potassium (e.g., $K_2O$) which is, at least in part, attributed to the base used in the preparation thereof. In certain embodiments, the about of potassium hydroxide employed in the process (by weight with respect to the total weight of the composition) is about 2-12% by weight, or about 2-10% by weight, or about 2-5% by weight, or about 4-5% by weight. In certain embodiments, the amount of potassium hydroxide employed in the process (by weight with respect to the total weight of the composition) is about 2%, or about 3%, or about 4%, or about 4.5%, or about 5%, or about 7%, or about 10%, or about 12% by weight. In certain embodiments, the semi-humic composition comprises about 1%, or about 2%, or about 3%, or about 4%, or about 5%, or about 6% soluble potassium (e.g., $K_2O$).

In certain embodiments, the temperature of step (a) is greater than about 100° F., or greater than about 100° F., or greater than about 110° F., or greater than about 120° F., or greater than about 130° F., or greater than about 140° F., or greater than about 150° F., or greater than about 160° F. In some embodiments, the heating of step (a) is performed for at least about 30 minutes or more. In some embodiments, the heating of step (a) is performed for about 1 hour or more, or about 2 hours or more, or about 3 hours or more.

In certain embodiments, the temperature of step (b) is greater than about 100° F., or greater than about 100° F., or greater than about 110° F., or greater than about 120° F., or greater than about 130° F., or greater than about 140° F., or greater than about 150° F., or greater than about 160° F. In some embodiments, the mixing of step (b) is performed for at least about 30 minutes or more. In some embodiments, the mixing of step (b) is performed for about 1 hour or more, or about 2 hours or more, or about 3 hours or more.

The separating of step (c) can be accomplished using any method known in the art, including, but not limited to, centrifugation, decanting, filtration, etc., or a combination thereof.

By performing the process, the weight of the humic fraction is increased as determined by the CDFA Humic Acid Method (see, e.g., Example 1). In some embodiments, the liquid portion comprises at least about 50%, or at least about 75%, at least about 100%, at least about 125%, at least about 150%, by weight greater on a carbon basis than the humic acid fraction which would be obtained by performing the process in the absence of the organic non-humic nitrogenous component obtained by step (a).

In another embodiment, the semi-humic composition described herein may be obtained by a process which comprises:

(a) heating an aqueous composition of leonardite ore or other soft brown coal in the presence of a base to a temperature of about 160° F. or higher to provide a composition having a liquid portion and a solids portion;

(b) mixing an organic non-humic nitrogenous source with the composition of step (a) and heating to a temperature of at least about 160° F. for at least about 2 hours, and optionally further removing solids, to provide the semi-humic composition.

In certain embodiments, step (a) is performed at a temperature of about 160° F. or higher for at least about 30 minutes, or at least about 1 hour or more, or at least about 2 hours. In certain embodiments, the pH of step (b) is greater than about 14.

In certain embodiments, the process further comprises the step of separating the liquid portion from the solids portion of step (a). In such instances, the mixing of step (b) comprises mixing the organic non-humic nitrogenous source with the liquid portion of step (a).

In certain embodiments, the pH of the composition at the mixing of step (b) is sufficiently high such that the composition remains a flowable liquid, and is thus able to be mixed with the composition of step (a) for a sufficient amount of time (e.g., at least about 2 hours) at a sufficient temperature (e.g., at least about 160° F.) such that the semi-humic composition is provided. In certain embodiments, the pH of the composition of step (b) is at least about 14 when the organic non-humic nitrogenous source is mixed therewith. In certain embodiments, the pH of the composition is about 14, or greater than about 14, or about 15, or greater than about 15, or about 16, or from about 14-15, or from about 14-16.

It is contemplated that the ratio of the organic non-humic nitrogenous source used in step (b) to leonardite ore (or other soft brown coal) used in step (a) can vary from about 1:2 to about 30:1, or about 1:2, about 1:1, about 2:1, about 3:1, about 4:1, about 5:1, about 8:1, about 10:1, about 15:1, about 20:1, or about 30:1. In certain embodiments, the ratio of the organic non-humic nitrogenous source to leonardite ore (or other soft brown coal) is about 3:1.

In certain embodiments, the organic non-humic nitrogenous source (e.g., blood meal) is used in about 15-25% by weight with respect to the total weight of the composition. In other embodiments, the blood meal is used in about 15, or about 20% or about 25% by weight with respect to the total weight of the composition.

In certain embodiments, the leonardite ore or other soft brown coal is used in about 4-8% by weight with respect to the total weight of the composition. In other embodiments, the leonardite ore or other soft brown coal is used in about 4%, about 5%, about 6%, about 7%, about 7.5% or about 8% by weight with respect to the total weight of the composition.

In certain embodiments, the amount of water in the composition (by weight with respect to the total weight of the composition) is about 35-80% by weight, or about 55-80% by weight. In certain embodiments, the amount of water is about 35%, or about 40%, or about 45%, or about 50%, or about 55%, or about 60%, or about 65%, or about 70%, or about 75%, or about 80% by weight.

In certain embodiments, the base of step (a) is a strong base (e.g., an Arrhenius base). In certain embodiments, the base of step (a) is one or more bases selected from the group consisting of LiOH, NaOH, KOH, RbOH, CsOH, $Ca(OH)_2$, $Sr(OH)_2$, and $Ba(OH)_2$. In certain embodiments, the about of base employed in step (a) (by weight with respect to the total weight of the composition) is about 5-20% by weight, or about 5-15% by weight, or about 8-10% by weight. In certain embodiments, the amount of base employed in step (a) (by weight with respect to the total weight of the composition) is about 5%, or about 7%, or about 8%, or about 9%, or about 10%, or about 15%, or about 20% by weight of the entire composition.

In certain embodiments, the base employed in step (a) is potassium hydroxide (KOH). Accordingly, in certain embodiments, the semi-humic composition comprises a percentage of soluble potassium (e.g., $K_2O$) which is, at least in part, attributed to the base used in the preparation thereof. In certain embodiments, the about of potassium hydroxide employed in step (a) (by weight with respect to the total weight of the composition) is greater than about 8% by weight, or about 8-20% by weight, or about 8-15% by weight, or about 8-10% by weight. In certain embodiments, the amount of potassium hydroxide employed in step (a) (by weight with respect to the total weight of the composition) or about 8%, or about 9%, or about 10%, or about 15%, or about 20% by weight of the entire composition. In certain embodiments, the semi-humic composition comprises about 5%, or about 6%, or about 7%, or about 8%, or about 9%, or about 10% soluble potassium (e.g., $K_2O$).

In certain embodiments of this process, the temperature of step (a) is greater than about 160° F., or greater than about 170° F., or greater than about 180° F., or from about 160° F. to about 180° F. In some embodiments, the heating of step (a) is performed for at least about 30 minutes or more. In some embodiments, the heating of step (a) is performed for about 1 hour or more, or about 2 hours or more, or about 3 hours or more.

The separating can be accomplished using any method known in the art, including, but not limited to, centrifugation, decanting, filtration, etc., or a combination thereof.

In certain embodiments, the temperature of step (b) is greater than about 160° F., or greater than about 170° F., or greater than about 180° F., or from about 160° F. to about 180° F. In some embodiments, the mixing of step (b) is performed for about 2 hours or more, or about 3 hours or more. In certain embodiments, the temperature is at or greater than about 160° F. for at least 2 hours. In certain embodiments, the temperature is from about 160° F. to about 180° F. for 2-3 hours.

In certain embodiments, a non-humic organic carbon source is used for preparing the semi-humic composition. It is contemplated that the organic acid can be any organic acid, such as ethylene diamine tetraacetic acid, hydroxyethylene diamine triacetic acid, diethylene triamine pentaacetic acid, nitrillo triacetic acid, ethanol diglycine, citric acid, galactaric acid, gluconic acid, glucono delta-lactone, glucoheptoic acid, glucaric acid, glutaric acid, glutamic acid, tartaric acid or tartronic acid. In certain embodiments, the composition further comprises gluconic acid. It is contemplated that the organic acid can be present in any amount, although it is contemplated that an amount of up to about 10% is effective. Therefore, in certain embodiments, the semi-humic composition comprises about 45-50% water by weight, about 15-20% of an aqueous base (e.g., a 50% KOH solution in water), about 20-25% of organic non-humic nitrogenous source, and about 5-20% of an organic acid.

The pH of the composition can vary due to the concentration of base employed in any of the processes described herein. In certain embodiments, the pH of the composition is about 10, or greater than about 10, or about 11, or about 12, or about 13, or about 14, or about 10-14, or about 11-12, or about 12-13, or about 13-14.

In any one embodiment, any composition as described herein can further comprise additional fertilizer. The fertilizer may comprise any nitrogen and/or phosphorus containing fertilizer used for agricultural or other plant growth enhancing purposes. The fertilizer as used herein can comprise one or more of a urea component, an ammonium component, a nitrate component, an ammonia component, an organic nitrogen component, and/or a phosphorus component. In certain embodiments, the fertilizer is an organic fertilizer.

In certain embodiments, the fertilizer and a semi-humic or aqueous composition as described herein are pre-mixed in solution prior to the addition to the soil. Their respective concentrations may range from 1% to about 20%, or from 1% to about 15%, or from 1% to about 10% by weight of any of the compositions described herein to fertilizer. In certain embodiments, the weight/weight ratio of any of the compositions described herein to fertilizer is about 1:100 to about 2:1. Exemplary ratios further include about 1:90; about 1:75; about 1:60; about 1:50; about 1:25; about 1:10; and about 1:1.

Methods

In one aspect, the present disclosure involves treating the soil of an agricultural, turf or sod grass field or other planting site with a semi-humic composition described herein, or obtained by the processes described herein, or an aqueous composition comprising the same.

In practice, organic residues may be added to the field following harvest. Decomposition of such residues and nitrogen release therefrom (mineralization) is seldom synchronized with crop growth. Use of the present method helps to promote nitrogen mineralization so that the nitrogen becomes available as a plant nutrient at a time that beneficially coincides with the crop's need for nitrogen for optimum growth.

The semi-humic composition described herein provides more mineralized Nitrogen (e.g., at about two weeks) when compared to blood meal granules at the same rate of Nitrogen. Provided herein is a method of increasing the amount of mineralized Nitrogen (e.g., nitrate) in soil by at least about 20% after up to about 2 weeks, comprising applying a semi-humic composition to soil. In certain embodiments, the semi-humic composition is applied to the soil at a concentration of at least about 10 mg of semi-humic composition per 100 grams of soil, or between about 10 mg and 1 gram of semi-humic composition per about 100 grams of soil. In certain embodiments, the amount of mineralized Nitrogen in the soil is increased by at least about 50%, or at least about 45%, or at least about 40%, or at least about 35%, or at least about 30%, or at least about 25%, or at least about 20% after about 2 weeks.

In addition, as shown by the Examples below, the standard deviations of measured mineralized soil Nitrogen at each time point from the semi-humic composition are almost an order of magnitude smaller than the blood meal granules treatment. This suggests that the semi-humic composition provides both a faster and, importantly, more consistent mineralized Nitrogen to meet plant demand.

Accordingly, provided herein is a method of increasing the rate of nitrogen mineralization in soil, comprising applying the semi-humic composition disclosed herein to soil. In certain embodiments, the rate of nitrogen mineralization in soil is increased by at least about 20%, or at least about 30%, or at least about 40%, or at least about 50%, or more, after about 1 week, or about 2 weeks, or about 3 weeks, or about 4 weeks, as compared to the rate of nitrogen mineralization from applying a standard organic non-humic nitrogenous source (e.g., blood meal, hydrolyzed soybean meal, hydrolyzed bovine serum isolate, etc.).

Also provided, in one embodiment, is a method for increasing nitrogen uptake within a crop, comprising applying a semi-humic composition to soil and/or to the crop. In certain embodiments, the weight of nitrogen contained in the biomass of the crop is increased by least about 15%, or about 50%, or about 45%, or about 40%, or about 35%, or about 30%, or about 25%, or about 20%, or about 15%, or about 10%, or about 5% by weight versus the weight of nitrogen contained in the biomass of a crop where a semi-humic composition was not applied. In certain embodiments, the weight of nitrogen contained in the biomass of the crop is increased by least about 15%, or about 50%, or about 45%, or about 40%, or about 35%, or about 30%, or about 25%, or about 20%, or about 15%, or about 10%, or about 5% by weight versus the weight of nitrogen contained in the biomass of a crop where an organic Nitrogen source was applied.

A further benefit to more of the Nitrogen applied to the soil and/or the crop being made available for uptake by the plant, is an increased Nitrogen content in the crop itself, which for example, can be measured as an increase in grain protein content, or feed value in hay. Therefore, in one embodiment, provided herein is a method of increasing nitrogen content in a crop comprising applying the semi-humic composition as disclosed herein to soil and/or to the crop. In certain embodiments, the weight of nitrogen contained in the biomass of the crop is increased by least about 15%, or about 50%, or about 45%, or about 40%, or about 35%, or about 30%, or about 25%, or about 20%, or about 15%, or about 10%, or about 5% by weight versus the weight of nitrogen contained in the biomass of a crop where a semi-humic composition was not applied. In certain embodiments, the weight of nitrogen contained in the biomass of the crop is increased by least about 15%, or about 50%, or about 45%, or about 40%, or about 35%, or about 30%, or about 25%, or about 20%, or about 15%, or about 10%, or about 5% by weight versus the weight of nitrogen contained in the biomass of a crop where an organic Nitrogen source was applied.

In addition, since more of the Nitrogen applied is made available for uptake by the plant, also provided herein is a method for limiting the risk of Nitrogen contamination of the environment that has previously accompanied the use of organic Nitrogen-based fertilizers. Subsurface nitrogen adsorption also minimizes accumulation of nitrates and ammonium in the surface soil, which can otherwise lead to denitrification and resultant volatilization of nitrogen gas or nitrous oxide from the soil or runoff with rainfall.

As shown in Example 5, the semi-humic composition described herein performed better that the organic Nitrogen source alone (e.g., blood meal alone) in various key plant growth parameters. Therefore, these results support the conclusion that the semi-humic composition described herein would be a superior source of Nitrogen that is able to be readily utilized by the crop for growth and development. In addition, the semi-humic composition described herein can be used by organic farmers.

Accordingly, in certain embodiments, provided is a method of enhancing crop growth comprising applying the semi-humic composition as described herein to soil and/or to the crop. In certain embodiments, the semi-humic composition as described herein which is derived from one or more organic Nitrogen sources, results in a comparable crop to that provided using urea, a nitrogen source commonly used in conventional farming systems. In certain embodiments, the crop growth is enhanced by at least about 15%, or about 50%, or about 45%, or about 40%, or about 35%, or about 30%, or about 25%, or about 20%, or about 15%, or about 10%, or about 5% by weight versus the crop growth where a semi-humic composition was not applied In certain embodiments, the crop growth is increased by least about 15%, or about 50%, or about 45%, or about 40%, or about 35%, or about 30%, or about 25%, or about 20%, or about 15%, or about 10%, or about 5% by weight versus the crop growth where an organic Nitrogen source was applied.

By increasing the crop growth and root size, it is further contemplated that the crop yield would be increased as well. In certain embodiments, provided is a method of increasing crop yield comprising applying the semi-humic composition as disclosed herein to soil and/or to the crop. In certain embodiments, the crop yield is enhanced by at least about 15%, or about 50%, or about 45%, or about 40%, or about 35%, or about 30%, or about 25%, or about 20%, or about 15%, or about 10%, or about 5% by weight versus the crop yield where a semi-humic composition was not applied. In certain embodiments, the crop yield is increased by least about 15%, or about 50%, or about 45%, or about 40%, or about 35%, or about 30%, or about 25%, or about 20%, or about 15%, or about 10%, or about 5% by weight versus the crop yield where an organic Nitrogen source was applied.

It is contemplated that the semi-humic composition disclosed herein is easier to apply, and can be used at lower application rates than many other sources of organic Nitrogen. Thus by using the semi-humic composition disclosed herein, the amount of Nitrogen applied can be decreased while still maintaining the benefits of the semi-humic composition. The amount of semi-humic composition to be applied may be calculated in a variety of ways. For example, the amount of the semi-humic composition may be expressed in a variety of units, including mass or volume of material per mass or volume of soil, area of land, or mass of fertilizer. In one embodiment, the rate may be calculated by the mass of the semi-humic composition per mass of soil or the estimated mass of nitrogen in the semi-humic composition. In certain embodiments, the semi-humic composition may be applied at a concentration of at least about 1 milligram, or 2 milligrams, or 5 milligrams or 10 milligrams or 20 milligrams of the semi-humic composition per 10 grams of soil. Alternative ratios for applying the semi-humic composition are described below. Suitable rates include:

|  | Units | |
| --- | --- | --- |
|  | Liters semi-humic composition per hectare | Liter semi-humic composition per 100 kg Nitrogen |
| Low end of range | 5 | 1,000 |
|  | 100, 500, 1,500, 3,000, 6,000, or 10,000 | 2,000, 3,000, 5,000, 10,000, 15,000 |
| High end of range | 15,000 | 20,000 |

In other embodiments, the amount of semi-humic composition applied to the soil ranges from about 0.1 mL to about 10 mL of the semi-humic composition kilogram of soil, or about 5 mL of the semi-humic composition per kilogram of soil, or about 2 mL per kilogram of soil, or about 1 mL per kilogram of soil, or about 0.5 mL of the semi-humic composition per kilogram of soil, or about 0.3 mL of the semi-humic composition per kilogram of soil. In certain embodiments, the amount of the semi-humic composition applied to the soil ranges from about 0.001 mL to about 50 mL of the semi-humic composition per kilogram of soil. Typically, the semi-humic composition is applied to the soil in a range of from about 300 to about 15,000 Liters per hectare of land.

However, as the semi-humic composition can be applied to the soil or the crop during plant grown, the amount rate may vary and can be calculated based on area. In certain embodiments, the semi-humic composition is applied to the soil and/or to the crop at a concentration of less than about 10 pounds of Nitrogen per acre, or about 1 pound of Nitrogen per acre, or about 3 pounds of Nitrogen per acre, or about 5 pounds of Nitrogen per acre, or about 10 pounds of Nitrogen per acre, or about 25 pounds of Nitrogen per acre, or about 50 pounds of Nitrogen per acre, or about 75 pounds of Nitrogen per acre, or about 100 pounds of Nitrogen per acre, or about 150 pounds of Nitrogen per acre, or about 200 pounds of Nitrogen per acre, or about 250 pounds of Nitrogen per acre, or about 300 pounds of Nitrogen per acre, or greater than about 300 pounds of Nitrogen per acre.

The soil to be treated can be any soil type, including, but not limited to, clay, loam, clay-loam, silt-loam, and the like. However, it is contemplated that the soils to be treated with the semi-humic composition described herein can have any amount of organic matter (typically from less than 1% to greater than about 20%).

In one embodiment, the semi-humic composition is applied in combination with additional fertilizer, where the semi-humic composition and fertilizer are pre-mixed in solution prior to the addition to the soil. Their respective concentrations may range from 1% to about 20%, or from 1% to about 15%, or from 1% to about 10% by weight of the semi-humic composition to fertilizer. In certain embodiments, the weight/weight ratio of the semi-humic composition to fertilizer is from about 1:100 to about 2:1. Exemplary ratios further include about 1:90; about 1:75; about 1:60; about 1:50; about 1:25; about 1:10; and about 2:1.

EXAMPLES

Example 1: Increase in Humic-Like Fraction of a Semi-Humic Composition

Figure 1B:
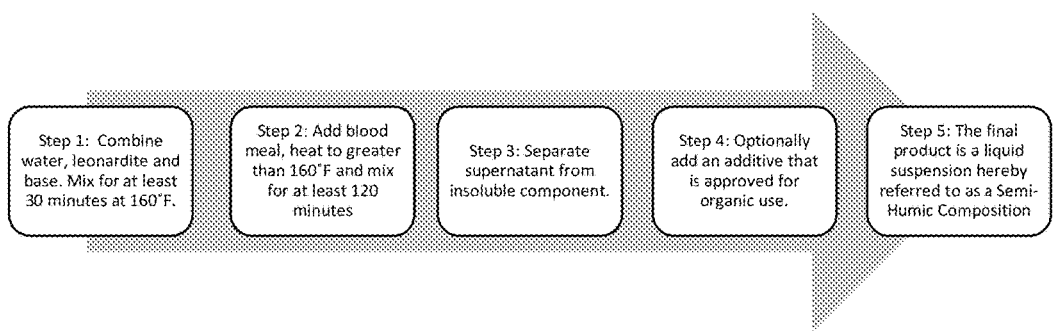

The process described herein, and as shown in FIGS. 1A and 1B, results in a liquid suspension, referred to herein as Composition 1, with an unexpected increase in the base extracted, acid precipitated fraction.

Methods

Extracts from leonardite and other humic substances are defined as humic acid, fulvic acid or humin based on the following operational definitions (see, e.g., Aiken, George R., et al. Humic substances in soil, sediment, and water: geochemistry, isolation and characterization. John Wiley & Sons, 1985):

1. Humic Acid: the base extracted, acid precipitated fraction
2. Fulvic Acid: the base extracted, acid soluble fraction
3. Humin: the base extracted, insoluble fraction The CDFA Humic Acid Method is currently the widely accepted method for quantifying Humic Acid and is available to customers at some soil and fertilizer labs. The CDFA Method reports Humic Acid as a weight percentage of the initial sample. In this example all organic inputs and the final semi-humic composition were analyzed by the CDFA Method. The result of the CDFA Method on blood meal and the finished semi-humic composition are referred to as humic-like because these samples may contain all or some non-humified organic matter. An exemplary method for preparing a 1,000 pound batch of the semi-humic composition from leonardite and blood meal was as described below.

The following assumes a blood meal total nitrogen content of 14% for a target of 3% nitrogen by weight in the composition. A sufficient amount of water (e.g., 60.5% by weight of the total batch weight) was heated to at least about 160° F. Base (e.g., 50% KOH in Water) was then added (e.g., 9% by weight of the total batch weight) followed by blood meal (e.g., 23% of the batch weight) (Boer Blood Meal, manufactured by Boer Commodities, Inc.). The resulting composition was then agitated at a temperature of at least about 160° F. for at least about 2 hours at which time leonardite ore was added (e.g., 7.5% by weight of the total batch weight). The resulting composition was then agitated at a temperature of at least about 160° F. for an additional time (e.g., 1-2 hours), during which time, additional water was added to make up for evaporative loss. After the allotted time, the liquid portion was separated from any remaining solids (decanting and filtration through a 149 mesh filter to afford the semi-humic composition).

Results

Table 1 shows results of the CDFA Method for the blood meal and leonardite used to produce the semi-humic composition. This composition is also called Composition 1.

TABLE 1

Humic Acid and Humic-Like Content of Organic Inputs

| Input | % Humic Acid | % Humic-Like |
|---|---|---|
| Blood Meal | — | 0 |
| Leonardite | 76.5 | — |

Table 2 shows the expected and actual Humic-Like content of the Semi-Humic composition. The expected Humic-Like content is calculated based on the assumption that 100% of the Humic Acid in leonardite was extracted and included in the final Semi-Humic Composition.

TABLE 2

Expected vs Actual Humic-Like Content of Semi-Humic Composition

| Semi-Humic Composition Prepared via FIG. 1A | | Semi-Humic Composition Prepared via FIG. 1B | |
|---|---|---|---|
| Expected % Humic-Like Content | Actual Humic-Like Content | Expected % Humic-Like Content | Actual Humic-Like Content |
| 5.10% | 16.18 | 3.90% | 14.14 |
| 5.10% | 14.94 | 3.90% | 12.65 |
| 5.10% | 14.3 | | |
| 5.10% | 15.18 | | |
| 5.10% | 18.13 | | |
| 5.10% | 10.1 | | |
| Standard Deviation | 1.34 | Standard Deviation | 0.75 |

Conclusion

The actual Humic-Like content of the Semi-Humic Composition prepared as described herein (see, e.g., FIGS. 1A and 1B) is, at least, nearly twice as large as the expected value, which assumes 100% organic extraction of leonardite. However, as shown above in Table 2, the actual Humic-Like content of the Semi-Humic Compositions prepared via the methods described herein are more than twice, or even more than three times larger than the expected value (i.e., 2.8-3.6 times larger than the expected value). This suggests that the processes in FIGS. 1A and 1B result in chemical interactions between non-humified blood meal-derived organic matter and humified leonardite-derived organic matter, resulting in a Semi-Humic Composition.

Example 2: Molecular Characterization of the Semi-Humic Composition, a Blood Meal Solution and a Standard Humic Extract Fourier Transform Ion Cyclotron Resonance Mass Spectrometry (FTICR-MS) is a powerful tool for the molecular characterization of complex organic mixtures. The ultra-high mass resolution and mass accuracy of FTICR-MS allows for the identification of elemental compositions for thousands of species, with minimal sample preparation. For singly charged ions of <700 Da, unambiguous molecular formulas can be assigned directly from the measured mass if about 1 ppm mass accuracy can be achieved.[1] In this example the semi-humic composition, a blood meal solution and a standard humic extract were characterized with FTICR-MS.

Methods

Sample Preparation.

The semi-humic composition was prepared as previously described. The standard humic extract was prepared by combining 172 g of dry leonardite, 731 g of water and 97 g of 50% (w/w) KOH solution. After mixing for 3 hours, the insoluble residue was removed and the supernatant was isolated. The blood meal solution was prepared by combining 250 g of blood meal granules, 650 g of water and 94 g of 50% (w/w) KOH solution. The mixture was then mixed for 1.5 hours at 160° F. The resulting liquid contained 3.7% (w/w) nitrogen.

Analytical Method.

Analysis was performed by LC-ESI-MS on a 7T Solarix FTICR-MS (Bruker) equipped with an Infinity Cell (Bruker) and a Surveyor Plus HPLC System (Thermo). Each sample was diluted 200 fold by volume and run in ESI negative mode. ESI Source Conditions and LC Method Details are shown in Tables 3 and 4.

Data Analysis.

Post-acquisition, spectra were externally calibrated against a known standardized tuning mixture. Mass lists including peaks above a SN threshold of three, relative intensity threshold of 0.01% and absolute intensity threshold of 0.5 were then generated. Only masses in the 120-700 m/z range were used to determine molecular formulas since mass accuracy is highest in the lower mass range for FTICR-MS. To generate molecular formulas, the maximum error allowed between the measured and theoretical m/z from the calculated molecular formula was set to 1.0 ppm. Deprotonated (M-H) ions were included in formula determination and all final mass lists used for subsequent analysis were converted to their Neutral Sum equivalent. Molecular formulas were then screened to exclude O/C>1.5 and N/C>0.7 as well as include H/C<2.25 and H/C>0.33. These cutoffs were similar to those determined for natural organic matter by Stubbins, et al. (2010).[2]

Results

Table 5A displays the number of molecular formula assigned to each sample. The semi-humic composition has more assigned molecular formulas compared to the standard humic extract or blood meal solution. FIG. 2 displays a Venn Diagram that shows the number of overlapping and unique molecular formulas assigned to each sample. Only 61 out of the 5152 total molecular formulas identified are consistently shared amongst all samples. In addition, 1507 out of the 2004 molecular formulas identified in the semi-humic composition are unique. Table 5B displays those formulas in their neutral sum format.

TABLE 3

ESI Negative Source Conditions

| Polarity | Capillary Voltage (V) | End Plate Offset (V) | Nebulizer Pressure (bar) | Dry Gas Flow (L/min) | Dry Temp (° C.) | FID Transient (s) |
|---|---|---|---|---|---|---|
| ESI Negative | 4500 | −500 | 3 | 3 | 200 | 0.4893 |

TABLE 4

LC Method Details

| Column | Solvent A | Solvent B | Sample Injection Volume | Flow Rate (mL/min) | LC Method Description | Total Method Time (min) |
|---|---|---|---|---|---|---|
| Merck ZIC-pHILIC 150 * 4.6 mm, 5 μm | Acetonitrile | Water | 5 μL | 0.25-0.9 | Ramp: [95% A-5% B], [5% A-95% B] Equilibrate: [95% A-5% B] | 50 |

TABLE 5A

Number of Molecular Formulas Attributed to Each Sample Type

| Sample | Number of Molecular Formulas (120-700 m/z) |
|---|---|
| Semi-Humic Composition | 2004 |
| Standard Humic Extract | 1702 |
| Blood Meal Solution | 1446 |

TABLE 5B

Unique Molecular Formulas Identified in the Semi-Humic Composition

| Unique Formulas | H/C | O/C | N/C |
|---|---|---|---|
| $C_{10}H_7N_7O_7S$ | 0.70 | 0.70 | 0.70 |
| $C_9H_6O_6$ | 0.67 | 0.67 | 0.00 |
| $C_7H_6O_5S$ | 0.86 | 0.71 | 0.00 |
| $C_7H_5NO_6$ | 0.71 | 0.86 | 0.14 |

TABLE 5B-continued

Unique Molecular Formulas Identified in the Semi-Humic Composition

| Unique Formulas | H/C | O/C | N/C |
|---|---|---|---|
| $C_{12}H_8N_2O_9S_9$ | 0.67 | 0.75 | 0.17 |
| $C_{15}H_{10}N_4O_9S$ | 0.67 | 0.60 | 0.27 |
| $C_7H_6N_2O_6$ | 0.86 | 0.86 | 0.29 |
| $C_6H_4N_2O_5S_3$ | 0.67 | 0.83 | 0.33 |
| $C_{18}H_{12}N_{12}S$ | 0.67 | 0.00 | 0.67 |
| $C_{46}H_{28}$ | 0.61 | 0.00 | 0.00 |
| $C_{27}H_{20}S$ | 0.74 | 0.00 | 0.00 |
| $C_{40}H_{30}$ | 0.75 | 0.00 | 0.00 |
| $C_{37}H_{30}$ | 0.81 | 0.00 | 0.00 |
| $C_{38}H_{32}$ | 0.84 | 0.00 | 0.00 |
| $C_{40}H_{34}$ | 0.85 | 0.00 | 0.00 |
| $C_{28}H_{24}S_4$ | 0.86 | 0.00 | 0.00 |
| $C_{39}H_{34}$ | 0.87 | 0.00 | 0.00 |
| $C_{27}H_{24}S_4$ | 0.89 | 0.00 | 0.00 |
| $C_{29}H_{26}S$ | 0.90 | 0.00 | 0.00 |
| $C_{40}H_{36}$ | 0.90 | 0.00 | 0.00 |
| $C_{26}H_{24}S_4$ | 0.92 | 0.00 | 0.00 |
| $C_{28}H_{26}S_4$ | 0.93 | 0.00 | 0.00 |
| $C_{17}H_{16}S_2$ | 0.94 | 0.00 | 0.00 |
| $C_{25}H_{24}S_4$ | 0.96 | 0.00 | 0.00 |
| $C_{27}H_{26}S_4$ | 0.96 | 0.00 | 0.00 |
| $C_{29}H_{28}S$ | 0.97 | 0.00 | 0.00 |
| $C_{42}H_{37}N$ | 0.88 | 0.00 | 0.02 |
| $C_{49}H_{43}NS$ | 0.88 | 0.00 | 0.02 |
| $C_{43}H_{39}N$ | 0.91 | 0.00 | 0.02 |
| $C_{43}H_{41}N$ | 0.95 | 0.00 | 0.02 |
| $C_{29}H_{21}NS$ | 0.72 | 0.00 | 0.03 |
| $C_{32}H_{27}NS$ | 0.84 | 0.00 | 0.03 |
| $C_{34}H_{29}NS$ | 0.85 | 0.00 | 0.03 |
| $C_{24}H_{19}NS$ | 0.79 | 0.00 | 0.04 |
| $C_{46}H_{38}N_2$ | 0.83 | 0.00 | 0.04 |
| $C_{50}H_{42}N_2$ | 0.84 | 0.00 | 0.04 |
| $C_{24}H_{21}NS$ | 0.88 | 0.00 | 0.04 |
| $C_{46}H_{42}N_2$ | 0.91 | 0.00 | 0.04 |
| $C_{27}H_{25}NS$ | 0.93 | 0.00 | 0.04 |
| $C_{45}H_{44}N_2$ | 0.98 | 0.00 | 0.04 |
| $C_{42}H_{38}N_2$ | 0.90 | 0.00 | 0.05 |
| $C_{44}H_{40}N_2$ | 0.91 | 0.00 | 0.05 |
| $C_{16}H_{11}NS_2$ | 0.69 | 0.00 | 0.06 |
| $C_{18}H_{13}NS_2$ | 0.72 | 0.00 | 0.06 |
| $C_{33}H_{28}N_2S$ | 0.85 | 0.00 | 0.06 |
| $C_{17}H_{15}NS_2$ | 0.88 | 0.00 | 0.06 |
| $C_{29}H_{28}N_2S$ | 0.97 | 0.00 | 0.07 |
| $C_{33}H_{31}N_3S$ | 0.94 | 0.00 | 0.09 |
| $C_{30}H_{25}N_3S$ | 0.83 | 0.00 | 0.10 |
| $C_{46}H_{37}N_5$ | 0.80 | 0.00 | 0.11 |
| $C_{37}H_{32}N_4S$ | 0.86 | 0.00 | 0.11 |
| $C_{46}H_{45}N_5S$ | 0.98 | 0.00 | 0.11 |
| $C_{24}H_{17}N_3$ | 0.71 | 0.00 | 0.13 |
| $C_{29}H_{26}N_4S_2$ | 0.90 | 0.00 | 0.14 |
| $C_{20}H_{13}N_3S$ | 0.65 | 0.00 | 0.15 |
| $C_{26}H_{24}N_4S_2$ | 0.92 | 0.00 | 0.15 |
| $C_{44}H_{37}N_7S$ | 0.84 | 0.00 | 0.16 |
| $C_{23}H_{16}N_4$ | 0.70 | 0.00 | 0.17 |
| $C_{33}H_{32}N_6S$ | 0.97 | 0.00 | 0.18 |
| $C_{22}H_{21}N_5$ | 0.95 | 0.00 | 0.23 |
| $C_{16}H_{12}N_4$ | 0.75 | 0.00 | 0.25 |
| $C_{16}H_{14}N_4S_3$ | 0.88 | 0.00 | 0.25 |
| $C_{18}H_{15}N_5S$ | 0.83 | 0.00 | 0.28 |
| $C_{24}H_{21}N_7$ | 0.88 | 0.00 | 0.29 |
| $C_{24}H_{22}N_8$ | 0.92 | 0.00 | 0.33 |
| $C_{33}H_{32}N_{12}$ | 0.97 | 0.00 | 0.36 |
| $C_{19}H_{12}N_8S$ | 0.63 | 0.00 | 0.42 |
| $C_{18}H_{16}N_8S$ | 0.89 | 0.00 | 0.44 |
| $C_{27}H_{26}N_{12}$ | 0.96 | 0.00 | 0.44 |
| $C_{29}H_{20}N_{16}$ | 0.69 | 0.00 | 0.55 |
| $C_{19}H_{13}N_{11}$ | 0.68 | 0.00 | 0.58 |
| $C_{47}H_{30}OS_2$ | 0.64 | 0.02 | 0.00 |
| $C_{46}H_{30}OS_2$ | 0.65 | 0.02 | 0.00 |
| $C_{45}H_{34}O$ | 0.76 | 0.02 | 0.00 |
| $C_{52}H_{50}O$ | 0.96 | 0.02 | 0.00 |
| $C_{43}H_{31}NO$ | 0.72 | 0.02 | 0.02 |
| $C_{44}H_{33}NO$ | 0.75 | 0.02 | 0.02 |
| $C_{41}H_{33}NO$ | 0.80 | 0.02 | 0.02 |
| $C_{41}H_{37}NO$ | 0.90 | 0.02 | 0.02 |
| $C_{48}H_{38}N_2O$ | 0.79 | 0.02 | 0.04 |
| $C_{46}H_{38}N_2O$ | 0.83 | 0.02 | 0.04 |
| $C_{45}H_{42}N_2O$ | 0.93 | 0.02 | 0.04 |
| $C_{44}H_{40}N_2O$ | 0.91 | 0.02 | 0.05 |
| $C_{44}H_{29}N_3OS_2$ | 0.66 | 0.02 | 0.07 |
| $C_{43}H_{33}N_7O$ | 0.77 | 0.02 | 0.16 |
| $C_{42}H_{41}N_7OS$ | 0.98 | 0.02 | 0.17 |
| $C_{40}H_{32}O$ | 0.80 | 0.03 | 0.00 |
| $C_{31}H_{30}OS$ | 0.97 | 0.03 | 0.00 |
| $C_{30}H_{21}NOS$ | 0.70 | 0.03 | 0.03 |
| $C_{39}H_{29}NOS_5$ | 0.74 | 0.03 | 0.03 |
| $C_{29}H_{23}NOS$ | 0.79 | 0.03 | 0.03 |
| $C_{33}H_{27}NOS$ | 0.82 | 0.03 | 0.03 |
| $C_{40}H_{35}NO$ | 0.88 | 0.03 | 0.03 |
| $C_{30}H_{27}NOS$ | 0.90 | 0.03 | 0.03 |
| $C_{29}H_{27}NOS$ | 0.93 | 0.03 | 0.03 |
| $C_{30}H_{29}NOS$ | 0.97 | 0.03 | 0.03 |
| $C_{31}H_{24}N_2OS$ | 0.77 | 0.03 | 0.06 |
| $C_{29}H_{28}N_2OS$ | 0.97 | 0.03 | 0.07 |
| $C_{31}H_{29}N_3O$ | 0.94 | 0.03 | 0.10 |
| $C_{30}H_{22}N_4OS_2$ | 0.73 | 0.03 | 0.13 |
| $C_{29}H_{23}N_{15}OS_2$ | 0.79 | 0.03 | 0.52 |
| $C_{24}H_{20}OS_4$ | 0.83 | 0.04 | 0.00 |
| $C_{26}H_{22}OS_4$ | 0.85 | 0.04 | 0.00 |
| $C_{24}H_{22}OS$ | 0.92 | 0.04 | 0.00 |
| $C_{23}H_{22}OS_2$ | 0.96 | 0.04 | 0.00 |
| $C_{27}H_{26}OS_4$ | 0.96 | 0.04 | 0.00 |
| $C_{46}H_{43}NO_2$ | 0.93 | 0.04 | 0.02 |
| $C_{50}H_{40}N_2O_2$ | 0.80 | 0.04 | 0.04 |
| $C_{28}H_{23}NOS$ | 0.82 | 0.04 | 0.04 |
| $C_{28}H_{25}NOS$ | 0.89 | 0.04 | 0.04 |
| $C_{25}H_{23}NOS_4$ | 0.92 | 0.04 | 0.04 |
| $C_{45}H_{42}N_2O_2S$ | 0.93 | 0.04 | 0.04 |
| $C_{28}H_{27}NOS$ | 0.96 | 0.04 | 0.04 |
| $C_{28}H_{26}N_2OS$ | 0.93 | 0.04 | 0.07 |
| $C_{23}H_{17}N_3O$ | 0.74 | 0.04 | 0.13 |
| $C_{26}H_{21}N_5O$ | 0.81 | 0.04 | 0.19 |
| $C_{27}H_{20}N_8O$ | 0.74 | 0.04 | 0.30 |
| $C_{21}H_{16}OS_2$ | 0.76 | 0.05 | 0.00 |
| $C_{44}H_{34}O_2$ | 0.77 | 0.05 | 0.00 |
| $C_{41}H_{32}O_2S_3$ | 0.78 | 0.05 | 0.00 |
| $C_{21}H_{18}OS_2$ | 0.86 | 0.05 | 0.00 |
| $C_{20}H_{18}O$ | 0.90 | 0.05 | 0.00 |
| $C_{19}H_{18}O$ | 0.95 | 0.05 | 0.00 |
| $C_{21}H_{20}O$ | 0.95 | 0.05 | 0.00 |
| $C_{42}H_{40}O_2$ | 0.95 | 0.05 | 0.00 |
| $C_{42}H_{35}NO_2$ | 0.83 | 0.05 | 0.02 |
| $C_{41}H_{35}NO_2$ | 0.85 | 0.05 | 0.02 |
| $C_{44}H_{39}NO_2$ | 0.89 | 0.05 | 0.02 |
| $C_{44}H_{41}NO_2$ | 0.93 | 0.05 | 0.02 |
| $C_{19}H_{15}NOS_2$ | 0.79 | 0.05 | 0.05 |
| $C_{21}H_{17}NOS_2$ | 0.81 | 0.05 | 0.05 |
| $C_{19}H_{17}NOS_2$ | 0.89 | 0.05 | 0.05 |
| $C_{42}H_{35}N_3O_2$ | 0.83 | 0.05 | 0.07 |
| $C_{37}H_{35}N_3O_2S$ | 0.95 | 0.05 | 0.08 |
| $C_{39}H_{26}N_6O_2S$ | 0.67 | 0.05 | 0.15 |
| $C_{43}H_{39}N_7O_2$ | 0.91 | 0.05 | 0.16 |
| $C_{19}H_{18}N_4O$ | 0.95 | 0.05 | 0.21 |
| $C_{20}H_{19}N_{11}OS$ | 0.95 | 0.05 | 0.55 |
| $C_{17}H_{12}O$ | 0.71 | 0.06 | 0.00 |
| $C_{17}H_{14}OS_2$ | 0.82 | 0.06 | 0.00 |
| $C_{18}H_{16}OS_2$ | 0.89 | 0.06 | 0.00 |
| $C_{48}H_{41}NO_3$ | 0.85 | 0.06 | 0.02 |
| $C_{18}H_{13}NOS_2$ | 0.72 | 0.06 | 0.06 |
| $C_{17}H_{13}NOS_2$ | 0.76 | 0.06 | 0.06 |
| $C_{18}H_{15}NOS_2$ | 0.83 | 0.06 | 0.06 |
| $C_{31}H_{26}N_2O_2S$ | 0.84 | 0.06 | 0.06 |
| $C_{17}H_{15}NOS_2$ | 0.88 | 0.06 | 0.06 |
| $C_{18}H_{17}NOS_2$ | 0.94 | 0.06 | 0.06 |
| $C_{18}H_{14}N_2O_2S$ | 0.78 | 0.06 | 0.11 |
| $C_{34}H_{29}N_7O_2$ | 0.85 | 0.06 | 0.21 |
| $C_{17}H_{14}N_4O$ | 0.82 | 0.06 | 0.24 |
| $C_{34}H_{32}N_{12}O_2$ | 0.94 | 0.06 | 0.35 |
| $C_{35}H_{33}N_{13}O_2$ | 0.94 | 0.06 | 0.37 |
| $C_{32}H_{28}N_{12}O_2$ | 0.88 | 0.06 | 0.38 |

TABLE 5B-continued

Unique Molecular Formulas Identified in the Semi-Humic Composition

| Unique Formulas | H/C | O/C | N/C |
|---|---|---|---|
| $C_{32}H_{30}N_{14}O_2$ | 0.94 | 0.06 | 0.44 |
| $C_{17}H_{15}N_9OS_2$ | 0.88 | 0.06 | 0.53 |
| $C_{14}H_{10}OS_3$ | 0.71 | 0.07 | 0.00 |
| $C_{14}H_{12}OS_3$ | 0.86 | 0.07 | 0.00 |
| $C_{30}H_{28}O_2S$ | 0.93 | 0.07 | 0.00 |
| $C_{29}H_{25}NO_2S$ | 0.86 | 0.07 | 0.03 |
| $C_{46}H_{42}N_2O_3$ | 0.91 | 0.07 | 0.04 |
| $C_{14}H_{11}NOS_2$ | 0.79 | 0.07 | 0.07 |
| $C_{14}H_{13}NOS_3$ | 0.93 | 0.07 | 0.07 |
| $C_{29}H_{18}N_4O_2S_2$ | 0.62 | 0.07 | 0.14 |
| $C_{28}H_{26}N_4O_2S_2$ | 0.93 | 0.07 | 0.14 |
| $C_{14}H_9N_3OS$ | 0.64 | 0.07 | 0.21 |
| $C_{28}H_{20}N_8O_2$ | 0.71 | 0.07 | 0.29 |
| $C_{30}H_{29}N_{13}O_2$ | 0.97 | 0.07 | 0.43 |
| $C_{25}H_{20}O_2S_2$ | 0.80 | 0.08 | 0.00 |
| $C_{24}H_{20}O_2S_2$ | 0.83 | 0.08 | 0.00 |
| $C_{24}H_{22}O_2S_2$ | 0.92 | 0.08 | 0.00 |
| $C_{48}H_{39}NO_4$ | 0.81 | 0.08 | 0.02 |
| $C_{13}H_{12}N_2OS_7$ | 0.92 | 0.08 | 0.15 |
| $C_{24}H_{23}N_7O_2$ | 0.96 | 0.08 | 0.29 |
| $C_{36}H_{29}N_{11}O_3$ | 0.81 | 0.08 | 0.31 |
| $C_{37}H_{30}N_{12}O_3$ | 0.81 | 0.08 | 0.32 |
| $C_{22}H_{14}O_2S_2$ | 0.64 | 0.09 | 0.00 |
| $C_{22}H_{16}O_2S_2$ | 0.73 | 0.09 | 0.00 |
| $C_{23}H_{18}O_2S_2$ | 0.78 | 0.09 | 0.00 |
| $C_{22}H_{18}O_2S_2$ | 0.82 | 0.09 | 0.00 |
| $C_{22}H_{20}O_2S_2$ | 0.91 | 0.09 | 0.00 |
| $C_{32}H_{31}NO_3S$ | 0.97 | 0.09 | 0.03 |
| $C_{23}H_{15}NO_2S_2$ | 0.65 | 0.09 | 0.04 |
| $C_{23}H_{19}NO_2$ | 0.83 | 0.09 | 0.04 |
| $C_{23}H_{21}N_7O_2$ | 0.91 | 0.09 | 0.30 |
| $C_{23}H_{22}N_8O_2$ | 0.96 | 0.09 | 0.35 |
| $C_{20}H_{14}O_2S_2$ | 0.70 | 0.10 | 0.00 |
| $C_{21}H_{16}O_2S_4$ | 0.76 | 0.10 | 0.00 |
| $C_{21}H_{16}O_2S_2$ | 0.76 | 0.10 | 0.00 |
| $C_{20}H_{16}O_2S_2$ | 0.80 | 0.10 | 0.00 |
| $C_{21}H_{20}O_2S_2$ | 0.95 | 0.10 | 0.00 |
| $C_{42}H_{33}NO_4$ | 0.79 | 0.10 | 0.02 |
| $C_{31}H_{29}NO_3S$ | 0.94 | 0.10 | 0.03 |
| $C_{20}H_{15}NO_2S_2$ | 0.75 | 0.10 | 0.05 |
| $C_{20}H_{17}NO_2S_2$ | 0.85 | 0.10 | 0.05 |
| $C_{20}H_{19}NO_2S_2$ | 0.95 | 0.10 | 0.05 |
| $C_{21}H_{18}N_4O_2$ | 0.86 | 0.10 | 0.19 |
| $C_{20}H_{14}N_4O_2$ | 0.70 | 0.10 | 0.20 |
| $C_{31}H_{20}N_8O_3$ | 0.65 | 0.10 | 0.26 |
| $C_{21}H_{18}N_6O_2S_3$ | 0.86 | 0.10 | 0.29 |
| $C_{20}H_{17}N_7O_2$ | 0.85 | 0.10 | 0.35 |
| $C_{18}H_{12}O_2$ | 0.67 | 0.11 | 0.00 |
| $C_{18}H_{12}O_2S_3$ | 0.67 | 0.11 | 0.00 |
| $C_{18}H_{12}O_2S_2$ | 0.67 | 0.11 | 0.00 |
| $C_{19}H_{14}O_2S_2$ | 0.74 | 0.11 | 0.00 |
| $C_{18}H_{14}O_2S_2$ | 0.78 | 0.11 | 0.00 |
| $C_{18}H_{16}O_2S_2$ | 0.89 | 0.11 | 0.00 |
| $C_{19}H_{18}O_2S_2$ | 0.95 | 0.11 | 0.00 |
| $C_{19}H_{17}NO_2S_2$ | 0.89 | 0.11 | 0.05 |
| $C_{18}H_{13}NO_2S_2$ | 0.72 | 0.11 | 0.06 |
| $C_{18}H_{15}NO_2S_2$ | 0.83 | 0.11 | 0.06 |
| $C_{18}H_{17}NO_2S_2$ | 0.94 | 0.11 | 0.06 |
| $C_{27}H_{21}N_5O_3$ | 0.78 | 0.11 | 0.19 |
| $C_{18}H_{14}N_6O_2$ | 0.78 | 0.11 | 0.33 |
| $C_{18}H_{15}N_7O_2$ | 0.83 | 0.11 | 0.39 |
| $C_{19}H_{18}N_8O_2S_2$ | 0.95 | 0.11 | 0.42 |
| $C_{25}H_{18}O_3S_2$ | 0.72 | 0.12 | 0.00 |
| $C_{17}H_{15}NO_2S_2$ | 0.88 | 0.12 | 0.06 |
| $C_{26}H_{22}N_8O_3$ | 0.85 | 0.12 | 0.31 |
| $C_{26}H_{24}N_8O_3$ | 0.92 | 0.12 | 0.31 |
| $C_{24}H_{16}O_3S_2$ | 0.67 | 0.13 | 0.00 |
| $C_{23}H_{16}O_3S_2$ | 0.70 | 0.13 | 0.00 |
| $C_{16}H_{12}O_2S_3$ | 0.75 | 0.13 | 0.00 |
| $C_{16}H_{12}O_2S_2$ | 0.75 | 0.13 | 0.00 |
| $C_{15}H_{12}O_2S_3$ | 0.80 | 0.13 | 0.00 |
| $C_{24}H_{20}O_3S_2$ | 0.83 | 0.13 | 0.00 |
| $C_{23}H_{20}O_3S_2$ | 0.87 | 0.13 | 0.00 |
| $C_{16}H_{14}O_2S_2$ | 0.88 | 0.13 | 0.00 |
| $C_{23}H_{22}O_3S_2$ | 0.96 | 0.13 | 0.00 |
| $C_{40}H_{26}N_2O_5$ | 0.65 | 0.13 | 0.05 |
| $C_{16}H_{13}NO_2S_2$ | 0.81 | 0.13 | 0.06 |
| $C_{16}H_{15}NO_2S_2$ | 0.94 | 0.13 | 0.06 |
| $C_{24}H_{18}N_4O_3$ | 0.75 | 0.13 | 0.17 |
| $C_{22}H_{14}O_3S_2$ | 0.64 | 0.14 | 0.00 |
| $C_{22}H_{16}O_3S_2$ | 0.73 | 0.14 | 0.00 |
| $C_{22}H_{18}O_3S_2$ | 0.82 | 0.14 | 0.00 |
| $C_{14}H_{12}O_2S_2$ | 0.86 | 0.14 | 0.00 |
| $C_{22}H_{20}O_3S_2$ | 0.91 | 0.14 | 0.00 |
| $C_{21}H_{13}NO_3S_2$ | 0.62 | 0.14 | 0.05 |
| $C_{22}H_{15}NO_3S_2$ | 0.68 | 0.14 | 0.05 |
| $C_{21}H_{15}NO_3S_2$ | 0.71 | 0.14 | 0.05 |
| $C_{22}H_{17}NO_3S_2$ | 0.77 | 0.14 | 0.05 |
| $C_{21}H_{17}NO_3S_2$ | 0.81 | 0.14 | 0.05 |
| $C_{22}H_{19}NO_3S_2$ | 0.86 | 0.14 | 0.05 |
| $C_{22}H_{21}NO_3S_2$ | 0.95 | 0.14 | 0.05 |
| $C_{21}H_{14}N_4O_3$ | 0.67 | 0.14 | 0.19 |
| $C_{28}H_{20}N_{14}O_4$ | 0.71 | 0.14 | 0.50 |
| $C_{20}H_{14}O_3S_2$ | 0.70 | 0.15 | 0.00 |
| $C_{20}H_{16}O_3S_{10}$ | 0.80 | 0.15 | 0.00 |
| $C_{20}H_{14}N_4O_3$ | 0.70 | 0.15 | 0.20 |
| $C_{20}H_{15}N_5O_3S_{10}$ | 0.75 | 0.15 | 0.25 |
| $C_{20}H_{17}N_5O_3$ | 0.85 | 0.15 | 0.25 |
| $C_{13}H_9N_7O_2S_{10}$ | 0.69 | 0.15 | 0.54 |
| $C_{20}H_{13}N_{11}O_3S$ | 0.65 | 0.15 | 0.55 |
| $C_{19}H_{14}O_3S_2$ | 0.74 | 0.16 | 0.00 |
| $C_{25}H_{20}N_4O_4$ | 0.80 | 0.16 | 0.16 |
| $C_{19}H_{18}N_6O_3S_3$ | 0.95 | 0.16 | 0.32 |
| $C_{23}H_{16}O_4S_2$ | 0.70 | 0.17 | 0.00 |
| $C_{23}H_{18}O_4S_2$ | 0.78 | 0.17 | 0.00 |
| $C_{18}H_{14}O_3S_2$ | 0.78 | 0.17 | 0.00 |
| $C_{18}H_{16}O_3S_2$ | 0.89 | 0.17 | 0.00 |
| $C_{18}H_{15}NO_3S_2$ | 0.83 | 0.17 | 0.06 |
| $C_{23}H_{16}N_4O_4$ | 0.70 | 0.17 | 0.17 |
| $C_{17}H_{12}O_3S_2$ | 0.71 | 0.18 | 0.00 |
| $C_{17}H_{14}O_3S_2$ | 0.82 | 0.18 | 0.00 |
| $C_{17}H_{11}NO_3S_2$ | 0.65 | 0.18 | 0.06 |
| $C_{17}H_{13}NO_3S_2$ | 0.76 | 0.18 | 0.06 |
| $C_{17}H_{15}NO_3S_2$ | 0.88 | 0.18 | 0.06 |
| $C_{22}H_{16}N_4O_4$ | 0.73 | 0.18 | 0.18 |
| $C_{22}H_{18}N_4O_4$ | 0.82 | 0.18 | 0.18 |
| $C_{21}H_{16}O_4S_2$ | 0.76 | 0.19 | 0.00 |
| $C_{16}H_{14}O_3S_2$ | 0.88 | 0.19 | 0.00 |
| $C_{21}H_{15}NO_4S_2$ | 0.71 | 0.19 | 0.05 |
| $C_{21}H_{19}NO_4S_2$ | 0.90 | 0.19 | 0.05 |
| $C_{16}H_{15}NO_3S_2$ | 0.94 | 0.19 | 0.06 |
| $C_{27}H_{26}N_4O_5$ | 0.96 | 0.19 | 0.15 |
| $C_{10}H_6O_2S_5$ | 0.60 | 0.20 | 0.00 |
| $C_{20}H_{14}O_4S_2$ | 0.70 | 0.20 | 0.00 |
| $C_{15}H_{12}O_3S_2$ | 0.80 | 0.20 | 0.00 |
| $C_{15}H_{14}O_3S_2$ | 0.93 | 0.20 | 0.00 |
| $C_{20}H_{13}NO_4S_2$ | 0.65 | 0.20 | 0.05 |
| $C_{20}H_{15}NO_4S_2$ | 0.75 | 0.20 | 0.05 |
| $C_{20}H_{19}NO_4S_2$ | 0.95 | 0.20 | 0.05 |
| $C_{15}H_{11}NO_3S_2$ | 0.73 | 0.20 | 0.07 |
| $C_{25}H_{16}N_4O_5$ | 0.64 | 0.20 | 0.16 |
| $C_{20}H_{18}N_{10}O_4S$ | 0.90 | 0.20 | 0.50 |
| $C_{14}H_{12}O_3S_3$ | 0.86 | 0.21 | 0.00 |
| $C_{19}H_{13}NO_4S_2$ | 0.68 | 0.21 | 0.05 |
| $C_{19}H_{15}NO_4S_2$ | 0.79 | 0.21 | 0.05 |
| $C_{14}H_9NO_3$ | 0.64 | 0.21 | 0.07 |
| $C_{14}H_{13}NO_3S_2$ | 0.93 | 0.21 | 0.07 |
| $C_{24}H_{22}N_4O_5$ | 0.92 | 0.21 | 0.17 |
| $C_{36}H_{30}N_2O_8$ | 0.83 | 0.22 | 0.06 |
| $C_{23}H_{14}N_2O_5S_9$ | 0.61 | 0.22 | 0.09 |
| $C_{23}H_{16}N_4O_5$ | 0.70 | 0.22 | 0.17 |
| $C_{18}H_{14}N_6O_4S_3$ | 0.78 | 0.22 | 0.33 |
| $C_{22}H_{19}NO_5S_2$ | 0.86 | 0.23 | 0.05 |
| $C_{13}H_{11}NO_3S_2$ | 0.85 | 0.23 | 0.08 |
| $C_{22}H_{14}N_4O_5$ | 0.64 | 0.23 | 0.18 |
| $C_{22}H_{14}N_{10}O_5S$ | 0.64 | 0.23 | 0.45 |
| $C_{22}H_{16}N_{10}O_5S$ | 0.73 | 0.23 | 0.45 |
| $C_{17}H_{12}O_4S_2$ | 0.71 | 0.24 | 0.00 |
| $C_{21}H_{16}O_5S_2$ | 0.76 | 0.24 | 0.00 |
| $C_{17}H_{14}O_4S_2$ | 0.82 | 0.24 | 0.00 |

TABLE 5B-continued

Unique Molecular Formulas Identified in the Semi-Humic Composition

| Unique Formulas | H/C | O/C | N/C |
|---|---|---|---|
| $C_{17}H_{11}NO_4S_2$ | 0.65 | 0.24 | 0.06 |
| $C_{17}H_{16}N_6O_4S_3$ | 0.94 | 0.24 | 0.35 |
| $C_{21}H_{20}N_{10}O_5S$ | 0.95 | 0.24 | 0.48 |
| $C_{20}H_{14}O_5S_8$ | 0.70 | 0.25 | 0.00 |
| $C_{16}H_{12}O_4S_2$ | 0.75 | 0.25 | 0.00 |
| $C_{20}H_{13}NO_5S_2$ | 0.65 | 0.25 | 0.05 |
| $C_{16}H_{13}NO_4S_2$ | 0.81 | 0.25 | 0.06 |
| $C_{19}H_{15}NO_5S_2$ | 0.79 | 0.26 | 0.05 |
| $C_{23}H_{14}N_4O_6$ | 0.61 | 0.26 | 0.17 |
| $C_{31}H_{22}N_6O_8S_2$ | 0.71 | 0.26 | 0.19 |
| $C_{19}H_{18}N_4O_5$ | 0.95 | 0.26 | 0.21 |
| $C_{23}H_{14}N_{10}O_6S$ | 0.61 | 0.26 | 0.43 |
| $C_{11}H_{10}O_3$ | 0.91 | 0.27 | 0.00 |
| $C_{15}H_{14}O_4S_2$ | 0.93 | 0.27 | 0.00 |
| $C_{15}H_{13}NO_4S_2$ | 0.87 | 0.27 | 0.07 |
| $C_{11}H_9NO_3$ | 0.82 | 0.27 | 0.09 |
| $C_{22}H_{20}N_4O_6$ | 0.91 | 0.27 | 0.18 |
| $C_{18}H_{11}N_5O_5$ | 0.61 | 0.28 | 0.28 |
| $C_{18}H_{13}N_5O_5S_9$ | 0.72 | 0.28 | 0.28 |
| $C_{14}H_{12}O_4S_2$ | 0.86 | 0.29 | 0.00 |
| $C_{21}H_{14}N_4O_6$ | 0.67 | 0.29 | 0.19 |
| $C_{10}H_8O_3$ | 0.80 | 0.30 | 0.00 |
| $C_{20}H_{12}N_4O_6$ | 0.60 | 0.30 | 0.20 |
| $C_{20}H_{18}N_4O_6$ | 0.90 | 0.30 | 0.20 |
| $C_{20}H_{18}N_{10}O_6S$ | 0.90 | 0.30 | 0.50 |
| $C_{13}H_{10}O_4S_2$ | 0.77 | 0.31 | 0.00 |
| $C_{13}H_{11}NO_4S_2$ | 0.85 | 0.31 | 0.08 |
| $C_{16}H_{14}N_4O_5$ | 0.88 | 0.31 | 0.25 |
| $C_{19}H_{12}O_6S_2$ | 0.63 | 0.32 | 0.00 |
| $C_{31}H_{28}N_4O_{10}$ | 0.90 | 0.32 | 0.13 |
| $C_{22}H_{14}N_4O_7$ | 0.64 | 0.32 | 0.18 |
| $C_{19}H_{16}N_4O_6$ | 0.84 | 0.32 | 0.21 |
| $C_{19}H_{16}N_{10}O_6S$ | 0.84 | 0.32 | 0.53 |
| $C_{21}H_{16}O_7S_9$ | 0.76 | 0.33 | 0.00 |
| $C_9H_8O_3$ | 0.89 | 0.33 | 0.00 |
| $C_{18}H_{16}N_4O_6$ | 0.89 | 0.33 | 0.22 |
| $C_{34}H_{30}N_2O_{12}$ | 0.88 | 0.35 | 0.06 |
| $C_{11}H_8O_4S_6$ | 0.73 | 0.36 | 0.00 |
| $C_{11}H_9NO_4S_6$ | 0.82 | 0.36 | 0.09 |
| $C_8H_5N_5O_3S_{10}$ | 0.63 | 0.38 | 0.63 |
| $C_{13}H_9N_7O_5S$ | 0.69 | 0.38 | 0.54 |
| $C_{13}H_{11}N_7O_5S$ | 0.85 | 0.38 | 0.54 |
| $C_{10}H_8O_4$ | 0.80 | 0.40 | 0.00 |
| $C_{10}H_7NO_4S_4$ | 0.70 | 0.40 | 0.10 |
| $C_{13}H_{12}N_6O_6S$ | 0.92 | 0.46 | 0.46 |
| $C_8H_7NO_4S$ | 0.88 | 0.50 | 0.13 |
| $C_{12}H_9N_7O_6S$ | 0.75 | 0.50 | 0.58 |
| $C_{13}H_8N_6O_7S$ | 0.62 | 0.54 | 0.46 |
| $C_9H_8N_6O_5S$ | 0.89 | 0.56 | 0.67 |
| $C_9H_8O_5$ | 0.89 | 0.56 | 0.00 |
| $C_{11}H_8O_{12}S_4$ | 0.73 | 1.09 | 0.00 |
| $C_{10}H_6O_{11}S_2$ | 0.60 | 1.10 | 0.00 |
| $C_{12}H_9N_3O_{14}S_7$ | 0.75 | 1.17 | 0.25 |
| $C_{15}H_{24}S_2$ | 1.60 | 0.00 | 0.00 |
| $C_{20}H_{32}S_2$ | 1.60 | 0.00 | 0.00 |
| $C_{25}H_{40}S_4$ | 1.60 | 0.00 | 0.00 |
| $C_{40}H_{64}$ | 1.60 | 0.00 | 0.00 |
| $C_{20}H_{32}OS_2$ | 1.60 | 0.05 | 0.00 |
| $C_{20}H_{32}N_4OS_2$ | 1.60 | 0.05 | 0.20 |
| $C_{15}H_{24}OS_2$ | 1.60 | 0.07 | 0.00 |
| $C_{15}H_{24}O_2S_2$ | 1.60 | 0.13 | 0.00 |
| $C_{35}H_{56}O_7$ | 1.60 | 0.20 | 0.00 |
| $C_{15}H_{24}O_3S_2$ | 1.60 | 0.20 | 0.00 |
| $C_{25}H_{40}N_4O_5S_3$ | 1.60 | 0.20 | 0.16 |
| $C_{10}H_{16}O_3S_8$ | 1.60 | 0.30 | 0.00 |
| $C_{15}H_{24}O_5$ | 1.60 | 0.33 | 0.00 |
| $C_{25}H_{40}N_4O_{10}$ | 1.60 | 0.40 | 0.16 |
| $C_{15}H_{24}N_2O_{20}$ | 1.60 | 1.33 | 0.13 |
| $C_{31}H_{50}N_{10}S_2$ | 1.61 | 0.00 | 0.32 |
| $C_{18}H_{29}N_3OS_2$ | 1.61 | 0.06 | 0.17 |
| $C_{28}H_{45}NO_6S_2$ | 1.61 | 0.21 | 0.04 |
| $C_{33}H_{53}NO_{10}$ | 1.61 | 0.30 | 0.03 |
| $C_{21}H_{34}S_4$ | 1.62 | 0.00 | 0.00 |
| $C_{21}H_{34}N_2S_7$ | 1.62 | 0.00 | 0.10 |
| $C_{39}H_{63}N_5S_3$ | 1.62 | 0.00 | 0.13 |
| $C_{29}H_{47}N_3OS_4$ | 1.62 | 0.03 | 0.10 |
| $C_{13}H_{21}NOS_2$ | 1.62 | 0.08 | 0.08 |
| $C_{26}H_{42}N_8O_2$ | 1.62 | 0.08 | 0.31 |
| $C_{34}H_{55}NO_{10}$ | 1.62 | 0.29 | 0.03 |
| $C_{34}H_{55}NO_{11}$ | 1.62 | 0.32 | 0.03 |
| $C_{29}H_{47}NO_{11}S_2$ | 1.62 | 0.38 | 0.03 |
| $C_8H_{13}NO_6S_7$ | 1.63 | 0.75 | 0.13 |
| $C_{19}H_{31}N_3S_2$ | 1.63 | 0.00 | 0.16 |
| $C_{30}H_{49}N_5OS_4$ | 1.63 | 0.03 | 0.17 |
| $C_{38}H_{62}O_2S_4$ | 1.63 | 0.05 | 0.00 |
| $C_{16}H_{26}OS_2$ | 1.63 | 0.06 | 0.00 |
| $C_{27}H_{44}N_4O_2S_2$ | 1.63 | 0.07 | 0.15 |
| $C_{16}H_{26}O_2S_2$ | 1.63 | 0.13 | 0.00 |
| $C_{24}H_{39}N_3O_4S_2$ | 1.63 | 0.17 | 0.13 |
| $C_{30}H_{49}N_9O_5S$ | 1.63 | 0.17 | 0.30 |
| $C_{16}H_{26}O_3S_2$ | 1.63 | 0.19 | 0.00 |
| $C_{35}H_{57}NO_7S_2$ | 1.63 | 0.20 | 0.03 |
| $C_{30}H_{49}N_7O_9S$ | 1.63 | 0.30 | 0.23 |
| $C_{16}H_{26}O_9$ | 1.63 | 0.56 | 0.00 |
| $C_{28}H_{46}N_{10}S_2$ | 1.64 | 0.00 | 0.36 |
| $C_{28}H_{46}N_4O$ | 1.64 | 0.04 | 0.14 |
| $C_{22}H_{36}N_{14}OS_3$ | 1.64 | 0.05 | 0.64 |
| $C_{14}H_{23}NOS_2$ | 1.64 | 0.07 | 0.07 |
| $C_{22}H_{36}N_{14}O_4S$ | 1.64 | 0.18 | 0.64 |
| $C_{22}H_{36}N_4O_5S_2$ | 1.64 | 0.23 | 0.18 |
| $C_{14}H_{23}N_5O_5$ | 1.64 | 0.36 | 0.36 |
| $C_{25}H_{41}N_{11}O_9S$ | 1.64 | 0.36 | 0.44 |
| $C_{33}H_{54}O_{13}$ | 1.64 | 0.39 | 0.00 |
| $C_{11}H_{18}O_{14}$ | 1.64 | 1.27 | 0.00 |
| $C_{17}H_{28}N_6S_3$ | 1.65 | 0.00 | 0.35 |
| $C_{17}H_{28}OS_2$ | 1.65 | 0.06 | 0.00 |
| $C_{40}H_{66}O_4S_2$ | 1.65 | 0.10 | 0.00 |
| $C_{17}H_{28}O_2S_2$ | 1.65 | 0.12 | 0.00 |
| $C_{17}H_{28}N_2O_2S_2$ | 1.65 | 0.12 | 0.12 |
| $C_{23}H_{38}N_6O_3S_2$ | 1.65 | 0.13 | 0.26 |
| $C_{20}H_{33}NO_6S$ | 1.65 | 0.30 | 0.05 |
| $C_{20}H_{33}N_3O_6S_2$ | 1.65 | 0.30 | 0.15 |
| $C_{23}H_{38}N_2O_{10}S$ | 1.65 | 0.43 | 0.09 |
| $C_{17}H_{28}N_2O_9$ | 1.65 | 0.53 | 0.12 |
| $C_{29}H_{48}N_4O$ | 1.66 | 0.03 | 0.14 |
| $C_{29}H_{48}N_4O_4S_3$ | 1.66 | 0.14 | 0.14 |
| $C_{32}H_{53}NO_5S_3$ | 1.66 | 0.16 | 0.03 |
| $C_{29}H_{48}O_8$ | 1.66 | 0.28 | 0.00 |
| $C_{18}H_{30}N_2S_7$ | 1.67 | 0.00 | 0.11 |
| $C_{24}H_{40}N_{14}S_3$ | 1.67 | 0.00 | 0.58 |
| $C_{39}H_{65}NOS_4$ | 1.67 | 0.03 | 0.03 |
| $C_{18}H_{30}N_6OS_3$ | 1.67 | 0.06 | 0.33 |
| $C_{27}H_{45}NO_2S_4$ | 1.67 | 0.07 | 0.04 |
| $C_{15}H_{25}NOS_2$ | 1.67 | 0.07 | 0.07 |
| $C_{27}H_{45}N_5O_2S_2$ | 1.67 | 0.07 | 0.19 |
| $C_{21}H_{35}N_9O_2S_3$ | 1.67 | 0.10 | 0.43 |
| $C_{30}H_{50}N_2O_4S_2$ | 1.67 | 0.13 | 0.07 |
| $C_{27}H_{45}NO_6S_3$ | 1.67 | 0.22 | 0.04 |
| $C_{15}H_{25}NO_4S_2$ | 1.67 | 0.27 | 0.07 |
| $C_{33}H_{55}NO_{10}S_2$ | 1.67 | 0.30 | 0.03 |
| $C_{24}H_{40}O_{11}S$ | 1.67 | 0.46 | 0.00 |
| $C_{19}H_{32}N_2S_7$ | 1.68 | 0.00 | 0.11 |
| $C_{19}H_{32}OS_2$ | 1.68 | 0.05 | 0.00 |
| $C_{19}H_{32}N_4OS_2$ | 1.68 | 0.05 | 0.21 |
| $C_{19}H_{32}N_4O_4S_2$ | 1.68 | 0.21 | 0.21 |
| $C_{26}H_{44}N_4O$ | 1.69 | 0.04 | 0.15 |
| $C_{26}H_{44}N_{10}OS$ | 1.69 | 0.04 | 0.38 |
| $C_{16}H_{27}N_3OS_2$ | 1.69 | 0.06 | 0.19 |
| $C_{36}H_{61}NO_6S_2$ | 1.69 | 0.17 | 0.03 |
| $C_{13}H_{22}O_3S_2$ | 1.69 | 0.23 | 0.00 |
| $C_{13}H_{22}N_2O_3S_2$ | 1.69 | 0.23 | 0.15 |
| $C_{16}H_{27}NO_4S_2$ | 1.69 | 0.25 | 0.06 |
| $C_{13}H_{22}O_4$ | 1.69 | 0.31 | 0.00 |
| $C_{13}H_{22}N_2O_{19}$ | 1.69 | 1.46 | 0.15 |
| $C_{10}H_{17}N_3O_7S_2$ | 1.70 | 0.70 | 0.30 |
| $C_{20}H_{34}N_2S_5$ | 1.70 | 0.00 | 0.10 |
| $C_{27}H_{46}N_4O$ | 1.70 | 0.04 | 0.15 |
| $C_{20}H_{34}N_{10}OS_3$ | 1.70 | 0.05 | 0.50 |
| $C_{10}H_{17}NOS_7$ | 1.70 | 0.10 | 0.10 |
| $C_{23}H_{39}N_5O_4S_2$ | 1.70 | 0.17 | 0.22 |

TABLE 5B-continued

Unique Molecular Formulas Identified in the Semi-Humic Composition

| Unique Formulas | H/C | O/C | N/C |
|---|---|---|---|
| $C_{20}H_{34}N_2O_7S$ | 1.70 | 0.35 | 0.10 |
| $C_{28}H_{48}S_2$ | 1.71 | 0.00 | 0.00 |
| $C_{35}H_{60}N_4$ | 1.71 | 0.00 | 0.11 |
| $C_{56}H_{96}N_8$ | 1.71 | 0.00 | 0.14 |
| $C_{28}H_{48}N_4O$ | 1.71 | 0.04 | 0.14 |
| $C_{28}H_{48}N_6OS_5$ | 1.71 | 0.04 | 0.21 |
| $C_{21}H_{36}OS_2$ | 1.71 | 0.05 | 0.00 |
| $C_{21}H_{36}O_3S_3$ | 1.71 | 0.14 | 0.00 |
| $C_{21}H_{36}N_2O_4S$ | 1.71 | 0.19 | 0.10 |
| $C_{14}H_{24}O_3S_2$ | 1.71 | 0.21 | 0.00 |
| $C_{14}H_{24}N_2O_{18}$ | 1.71 | 1.29 | 0.14 |
| $C_{18}H_{31}N_9S_3$ | 1.72 | 0.00 | 0.50 |
| $C_{18}H_{31}N_3OS_2$ | 1.72 | 0.06 | 0.17 |
| $C_{18}H_{31}N_3O_2S_2$ | 1.72 | 0.11 | 0.17 |
| $C_{18}H_{31}N_3O_5S_2$ | 1.72 | 0.28 | 0.17 |
| $C_{22}H_{38}N_2S_7$ | 1.73 | 0.00 | 0.09 |
| $C_{15}H_{26}N_8S_6$ | 1.73 | 0.00 | 0.53 |
| $C_{37}H_{64}OS_4$ | 1.73 | 0.03 | 0.00 |
| $C_{15}H_{26}O_3S_2$ | 1.73 | 0.20 | 0.00 |
| $C_{15}H_{26}N_2O_3S_2$ | 1.73 | 0.20 | 0.13 |
| $C_{15}H_{26}O_4$ | 1.73 | 0.27 | 0.00 |
| $C_{26}H_{45}N_5O_{10}S$ | 1.73 | 0.38 | 0.19 |
| $C_{22}H_{38}O_{11}S$ | 1.73 | 0.50 | 0.00 |
| $C_{23}H_{40}N_{10}S$ | 1.74 | 0.00 | 0.43 |
| $C_{31}H_{54}OS_7$ | 1.74 | 0.03 | 0.00 |
| $C_{38}H_{66}OS_4$ | 1.74 | 0.03 | 0.00 |
| $C_{31}H_{54}N_4O$ | 1.74 | 0.03 | 0.13 |
| $C_{19}H_{33}N_3OS_2$ | 1.74 | 0.05 | 0.16 |
| $C_{31}H_{54}N_4O_2$ | 1.74 | 0.06 | 0.13 |
| $C_{27}H_{47}N_5O_2S_4$ | 1.74 | 0.07 | 0.19 |
| $C_{19}H_{33}N_3O_2S_2$ | 1.74 | 0.11 | 0.16 |
| $C_{31}H_{54}N_2O_4S_2$ | 1.74 | 0.13 | 0.06 |
| $C_{19}H_{33}N_5O_4$ | 1.74 | 0.21 | 0.26 |
| $C_{23}H_{40}O_7S_2$ | 1.74 | 0.30 | 0.00 |
| $C_{27}H_{47}N_5O_{10}S$ | 1.74 | 0.37 | 0.19 |
| $C_{32}H_{56}N_4$ | 1.75 | 0.00 | 0.13 |
| $C_{16}H_{28}N_4S_2$ | 1.75 | 0.00 | 0.25 |
| $C_{32}H_{56}N_{10}S_3$ | 1.75 | 0.00 | 0.31 |
| $C_{16}H_{28}N_6$ | 1.75 | 0.00 | 0.38 |
| $C_{24}H_{42}OS_4$ | 1.75 | 0.04 | 0.00 |
| $C_{20}H_{35}N_3OS_4$ | 1.75 | 0.05 | 0.15 |
| $C_{20}H_{35}N_3OS_2$ | 1.75 | 0.05 | 0.15 |
| $C_{20}H_{35}N_9OS_3$ | 1.75 | 0.05 | 0.45 |
| $C_{36}H_{63}NO_2S_4$ | 1.75 | 0.06 | 0.03 |
| $C_{32}H_{56}N_4O_2$ | 1.75 | 0.06 | 0.13 |
| $C_{28}H_{49}N_5O_2S_4$ | 1.75 | 0.07 | 0.18 |
| $C_{20}H_{35}N_5O_2S_2$ | 1.75 | 0.10 | 0.25 |
| $C_{16}H_{28}N_2O_2S_2$ | 1.75 | 0.13 | 0.13 |
| $C_{16}H_{28}N_2O_3S_2$ | 1.75 | 0.19 | 0.13 |
| $C_{20}H_{35}N_5O_4S_3$ | 1.75 | 0.20 | 0.25 |
| $C_{24}H_{42}O_5S_3$ | 1.75 | 0.21 | 0.00 |
| $C_{12}H_{21}N_3O_3S$ | 1.75 | 0.25 | 0.25 |
| $C_{16}H_{28}O_5$ | 1.75 | 0.31 | 0.00 |
| $C_{16}H_{28}N_4O_8$ | 1.75 | 0.50 | 0.25 |
| $C_8H_{14}N_2O_9S_7$ | 1.75 | 1.13 | 0.25 |
| $C_{17}H_{30}S_2$ | 1.76 | 0.00 | 0.00 |
| $C_{34}H_{60}N_4$ | 1.76 | 0.00 | 0.12 |
| $C_{17}H_{30}N_6OS_3$ | 1.76 | 0.06 | 0.35 |
| $C_{21}H_{37}NO_2S_3$ | 1.76 | 0.10 | 0.05 |
| $C_{17}H_{30}N_4O_2S_2$ | 1.76 | 0.12 | 0.24 |
| $C_{37}H_{65}NO_5S_2$ | 1.76 | 0.14 | 0.03 |
| $C_{17}H_{30}N_4O_3S_2$ | 1.76 | 0.18 | 0.24 |
| $C_{17}H_{30}O_4$ | 1.76 | 0.24 | 0.00 |
| $C_{33}H_{58}O_{11}S$ | 1.76 | 0.33 | 0.00 |
| $C_{35}H_{62}N_4$ | 1.77 | 0.00 | 0.11 |
| $C_{35}H_{62}N_4O_2$ | 1.77 | 0.06 | 0.11 |
| $C_{31}H_{55}N_5O_3$ | 1.77 | 0.10 | 0.16 |
| $C_{22}H_{39}N_{15}O_4S$ | 1.77 | 0.18 | 0.68 |
| $C_{18}H_{32}N_2S_5$ | 1.78 | 0.00 | 0.11 |
| $C_{37}H_{66}N_4$ | 1.78 | 0.00 | 0.11 |
| $C_{27}H_{48}N_4$ | 1.78 | 0.00 | 0.15 |
| $C_{18}H_{32}N_6S_2$ | 1.78 | 0.00 | 0.33 |
| $C_{27}H_{48}N_4OS$ | 1.78 | 0.04 | 0.15 |
| $C_{18}H_{32}N_{10}OS$ | 1.78 | 0.06 | 0.56 |
| $C_9H_{16}N_6OS_4$ | 1.78 | 0.11 | 0.67 |
| $C_{18}H_{32}N_2O_2S_2$ | 1.78 | 0.11 | 0.11 |
| $C_{37}H_{66}O_5S_2$ | 1.78 | 0.14 | 0.00 |
| $C_9H_{16}O_2S_7$ | 1.78 | 0.22 | 0.00 |
| $C_{34}H_{61}NS_6$ | 1.79 | 0.00 | 0.03 |
| $C_{29}H_{52}N_4$ | 1.79 | 0.00 | 0.14 |
| $C_{28}H_{50}N_6S_4$ | 1.79 | 0.00 | 0.21 |
| $C_{24}H_{43}N_5S_5$ | 1.79 | 0.00 | 0.21 |
| $C_{29}H_{52}N_4OS$ | 1.79 | 0.03 | 0.14 |
| $C_{19}H_{34}N_4OS_2$ | 1.79 | 0.05 | 0.21 |
| $C_{24}H_{43}NO_3S_4$ | 1.79 | 0.13 | 0.04 |
| $C_{24}H_{43}N_{11}O_5S_3$ | 1.79 | 0.21 | 0.46 |
| $C_{14}H_{25}N_9O_4S$ | 1.79 | 0.29 | 0.64 |
| $C_{20}H_{36}N_2S_4$ | 1.80 | 0.00 | 0.10 |
| $C_{30}H_{54}N_4$ | 1.80 | 0.00 | 0.13 |
| $C_{20}H_{36}N_{10}OS_3$ | 1.80 | 0.05 | 0.50 |
| $C_{20}H_{36}N_{10}O_2S_4$ | 1.80 | 0.10 | 0.50 |
| $C_{20}H_{36}N_2O_3S_2$ | 1.80 | 0.15 | 0.10 |
| $C_{30}H_{54}N_2O_5S_5$ | 1.80 | 0.17 | 0.07 |
| $C_{20}H_{36}N_4O_4S_2$ | 1.80 | 0.20 | 0.20 |
| $C_{10}H_{18}O_5$ | 1.80 | 0.50 | 0.00 |
| $C_{16}H_{29}N_3S_2$ | 1.81 | 0.00 | 0.19 |
| $C_{31}H_{56}N_4OS$ | 1.81 | 0.03 | 0.13 |
| $C_{26}H_{47}N_5OS_5$ | 1.81 | 0.04 | 0.19 |
| $C_{21}H_{38}OS_2$ | 1.81 | 0.05 | 0.00 |
| $C_{16}H_{29}NO_2S_2$ | 1.81 | 0.13 | 0.06 |
| $C_{31}H_{56}N_{10}O_6S$ | 1.81 | 0.19 | 0.32 |
| $C_{31}H_{56}N_2O_9S_3$ | 1.81 | 0.29 | 0.06 |
| $C_{34}H_{62}N_4S$ | 1.82 | 0.00 | 0.12 |
| $C_{11}H_{20}N_2S_3$ | 1.82 | 0.00 | 0.18 |
| $C_{17}H_{31}N_3S_2$ | 1.82 | 0.00 | 0.18 |
| $C_{33}H_{60}N_4O$ | 1.82 | 0.03 | 0.12 |
| $C_{17}H_{31}N_3OS_2$ | 1.82 | 0.06 | 0.18 |
| $C_{22}H_{40}O_2S_4$ | 1.82 | 0.09 | 0.00 |
| $C_{17}H_{31}N_3O_5S_2$ | 1.82 | 0.29 | 0.18 |
| $C_{11}H_{20}O_5$ | 1.82 | 0.45 | 0.00 |
| $C_{28}H_{51}N_5O_{14}$ | 1.82 | 0.50 | 0.18 |
| $C_{12}H_{22}N_8O_8$ | 1.83 | 0.67 | 0.67 |
| $C_{23}H_{42}N_4S_4$ | 1.83 | 0.00 | 0.17 |
| $C_{12}H_{22}N_2S_3$ | 1.83 | 0.00 | 0.17 |
| $C_{24}H_{44}N_4S_5$ | 1.83 | 0.00 | 0.17 |
| $C_{24}H_{44}N_6S_5$ | 1.83 | 0.00 | 0.25 |
| $C_{18}H_{33}N_5OS_2$ | 1.83 | 0.06 | 0.28 |
| $C_{18}H_{33}N_3O_2S_2$ | 1.83 | 0.11 | 0.17 |
| $C_{12}H_{22}N_2O_2S_2$ | 1.83 | 0.17 | 0.17 |
| $C_{12}H_{22}N_2O_3S_5$ | 1.83 | 0.25 | 0.17 |
| $C_{24}H_{44}N_2O_7S_5$ | 1.83 | 0.29 | 0.08 |
| $C_{24}H_{44}O_{12}S$ | 1.83 | 0.50 | 0.00 |
| $C_6H_{11}NO_3S_5$ | 1.83 | 0.50 | 0.17 |
| $C_{12}H_{22}N_2O_6$ | 1.83 | 0.50 | 0.17 |
| $C_{12}H_{22}N_2O_{18}$ | 1.83 | 1.50 | 0.17 |
| $C_{37}H_{68}N_8OS_6$ | 1.84 | 0.03 | 0.22 |
| $C_{19}H_{35}N_3OS_2$ | 1.84 | 0.05 | 0.16 |
| $C_{25}H_{46}N_2O_3S_5$ | 1.84 | 0.12 | 0.08 |
| $C_{32}H_{59}NO_4S_5$ | 1.84 | 0.13 | 0.03 |
| $C_{19}H_{35}N_5O_6S$ | 1.84 | 0.32 | 0.26 |
| $C_{13}H_{24}O_9S_2$ | 1.85 | 0.69 | 0.00 |
| $C_{20}H_{37}N_5O_{17}$ | 1.85 | 0.85 | 0.25 |
| $C_{33}H_{61}NS_5$ | 1.85 | 0.00 | 0.03 |
| $C_{20}H_{37}N_3OS_2$ | 1.85 | 0.05 | 0.15 |
| $C_{13}H_{24}OS_2$ | 1.85 | 0.08 | 0.00 |
| $C_{26}H_{48}N_{14}O_2S$ | 1.85 | 0.08 | 0.54 |
| $C_{20}H_{37}N_5O_2S_3$ | 1.85 | 0.10 | 0.25 |
| $C_{27}H_{50}O_3S_5$ | 1.85 | 0.11 | 0.00 |
| $C_{20}H_{37}N_3O_3S_2$ | 1.85 | 0.15 | 0.15 |
| $C_{20}H_{37}N_3O_9$ | 1.85 | 0.45 | 0.15 |
| $C_{29}H_{54}N_{10}S$ | 1.86 | 0.00 | 0.34 |
| $C_{28}H_{52}N_4O_4S_4$ | 1.86 | 0.14 | 0.14 |
| $C_{14}H_{26}N_4O_7$ | 1.86 | 0.50 | 0.29 |
| $C_{23}H_{43}N_{15}S_3$ | 1.87 | 0.00 | 0.65 |
| $C_{15}H_{28}N_4S_2$ | 1.87 | 0.00 | 0.27 |
| $C_{15}H_{28}N_6S_3$ | 1.87 | 0.00 | 0.40 |
| $C_{30}H_{56}N_{10}OS_3$ | 1.87 | 0.03 | 0.33 |
| $C_{15}H_{28}O_4$ | 1.87 | 0.27 | 0.00 |
| $C_{17}H_{32}N_2S_5$ | 1.88 | 0.00 | 0.12 |
| $C_{32}H_{60}N_4S$ | 1.88 | 0.00 | 0.13 |

TABLE 5B-continued

Unique Molecular Formulas Identified in the Semi-Humic Composition

| Unique Formulas | H/C | O/C | N/C |
|---|---|---|---|
| $C_{34}H_{64}N_4OS$ | 1.88 | 0.03 | 0.12 |
| $C_{16}H_{30}N_4OS_2$ | 1.88 | 0.06 | 0.25 |
| $C_{17}H_{32}N_4O_2S_2$ | 1.88 | 0.12 | 0.24 |
| $C_{24}H_{45}NO_3S_3$ | 1.88 | 0.13 | 0.04 |
| $C_{17}H_{32}O_4$ | 1.88 | 0.24 | 0.00 |
| $C_{16}H_{30}O_4$ | 1.88 | 0.25 | 0.00 |
| $C_{19}H_{36}N_4O_{17}$ | 1.89 | 0.89 | 0.21 |
| $C_{35}H_{66}N_6S_4$ | 1.89 | 0.00 | 0.17 |
| $C_{18}H_{34}N_4OS_3$ | 1.89 | 0.06 | 0.22 |
| $C_{18}H_{34}N_2O_2S_2$ | 1.89 | 0.11 | 0.11 |
| $C_{19}H_{36}N_4O_3S_2$ | 1.89 | 0.16 | 0.21 |
| $C_{27}H_{51}NO_7S_3$ | 1.89 | 0.26 | 0.04 |
| $C_{21}H_{40}S_2$ | 1.90 | 0.00 | 0.00 |
| $C_{31}H_{59}NS_6$ | 1.90 | 0.00 | 0.03 |
| $C_{21}H_{40}OS_2$ | 1.90 | 0.05 | 0.00 |
| $C_{21}H_{40}N_{12}O_2S_3$ | 1.90 | 0.10 | 0.57 |
| $C_{21}H_{40}N_4O_6S$ | 1.90 | 0.29 | 0.19 |
| $C_{10}H_{19}N_3O_3$ | 1.90 | 0.30 | 0.30 |
| $C_{10}H_{19}N_3O_4S$ | 1.90 | 0.40 | 0.30 |
| $C_{32}H_{61}N_{11}S_3$ | 1.91 | 0.00 | 0.34 |
| $C_{34}H_{65}N_3OS_5$ | 1.91 | 0.03 | 0.09 |
| $C_{23}H_{44}O_2S_4$ | 1.91 | 0.09 | 0.00 |
| $C_{23}H_{44}N_{16}O_3S$ | 1.91 | 0.13 | 0.70 |
| $C_{23}H_{44}O_3S_4$ | 1.91 | 0.13 | 0.00 |
| $C_{22}H_{42}O_8S_3$ | 1.91 | 0.36 | 0.00 |
| $C_{11}H_{21}N_3O_4S$ | 1.91 | 0.36 | 0.27 |
| $C_{25}H_{48}S_5$ | 1.92 | 0.00 | 0.00 |
| $C_{13}H_{25}N_3S_3$ | 1.92 | 0.00 | 0.23 |
| $C_{12}H_{23}N_3S_3$ | 1.92 | 0.00 | 0.25 |
| $C_{24}H_{46}N_6S_4$ | 1.92 | 0.00 | 0.25 |
| $C_{25}H_{48}N_{10}S$ | 1.92 | 0.00 | 0.40 |
| $C_{26}H_{50}O_2S_4$ | 1.92 | 0.08 | 0.00 |
| $C_{13}H_{25}N_7OS$ | 1.92 | 0.08 | 0.54 |
| $C_{26}H_{50}O_{11}S_3$ | 1.92 | 0.42 | 0.00 |
| $C_{14}H_{27}N_5O_3S$ | 1.93 | 0.21 | 0.36 |
| $C_{18}H_{35}N_3OS_2$ | 1.94 | 0.06 | 0.17 |
| $C_{31}H_{60}N_2O_4S_5$ | 1.94 | 0.13 | 0.06 |
| $C_{35}H_{68}O_6S$ | 1.94 | 0.17 | 0.00 |
| $C_{34}H_{66}O_6S$ | 1.94 | 0.18 | 0.00 |
| $C_{34}H_{66}O_7S$ | 1.94 | 0.21 | 0.00 |
| $C_{16}H_{31}NO_9S$ | 1.94 | 0.56 | 0.06 |
| $C_{21}H_{41}NOS_4$ | 1.95 | 0.05 | 0.05 |
| $C_{22}H_{43}N_{15}O_2S_4$ | 1.95 | 0.09 | 0.68 |
| $C_{22}H_{43}N_5O_6S$ | 1.95 | 0.27 | 0.23 |
| $C_{22}H_{43}N_{11}O_6$ | 1.95 | 0.27 | 0.50 |
| $C_{21}H_{41}N_5O_7S_3$ | 1.95 | 0.33 | 0.24 |
| $C_{26}H_{51}N_{17}S_3$ | 1.96 | 0.00 | 0.65 |
| $C_{28}H_{55}N_{11}S_2$ | 1.96 | 0.00 | 0.39 |
| $C_{23}H_{45}N_7OS_3$ | 1.96 | 0.04 | 0.30 |
| $C_{23}H_{45}N_{15}O_2S_4$ | 1.96 | 0.09 | 0.65 |
| $C_{27}H_{53}NO_3S_5$ | 1.96 | 0.11 | 0.04 |
| $C_{24}H_{47}NO_8S_3$ | 1.96 | 0.33 | 0.04 |
| $C_{24}H_{47}N_5O_{10}S_2$ | 1.96 | 0.42 | 0.21 |
| $C_{29}H_{57}N_{11}S$ | 1.97 | 0.00 | 0.38 |
| $C_{30}H_{59}NO_3S_5$ | 1.97 | 0.10 | 0.03 |
| $C_{29}H_{57}N_3O_8S_2$ | 1.97 | 0.28 | 0.10 |
| $C_{18}H_6N_2S_6$ | 0.33 | 0.00 | 0.11 |
| $C_{15}H_5N_3S_7$ | 0.33 | 0.00 | 0.20 |
| $C_{24}H_8N_4O_5$ | 0.33 | 0.21 | 0.17 |
| $C_{17}H_6N_8OS$ | 0.35 | 0.06 | 0.47 |
| $C_{17}H_6N_4O_5S$ | 0.35 | 0.29 | 0.24 |
| $C_{20}H_7N_5O_6$ | 0.35 | 0.30 | 0.25 |
| $C_{19}H_7N_5O_3$ | 0.37 | 0.16 | 0.26 |
| $C_{19}H_7N_3O_6S_7$ | 0.37 | 0.32 | 0.16 |
| $C_{24}H_9N_5O_6$ | 0.38 | 0.25 | 0.21 |
| $C_{21}H_8N_4O_7$ | 0.38 | 0.33 | 0.19 |
| $C_{23}H_9N_5O_4$ | 0.39 | 0.17 | 0.22 |
| $C_{10}H_4O_9S_3$ | 0.40 | 0.90 | 0.00 |
| $C_{25}H_{10}N_4O_5$ | 0.40 | 0.20 | 0.16 |
| $C_{20}H_8N_4O_5$ | 0.40 | 0.25 | 0.20 |
| $C_{10}H_4N_2O_3S_8$ | 0.40 | 0.30 | 0.20 |
| $C_{10}H_4N_6O_4S_9$ | 0.40 | 0.40 | 0.60 |
| $C_{10}H_4N_2O_{10}S_8$ | 0.40 | 1.00 | 0.20 |
| $C_{17}H_7N_3S$ | 0.41 | 0.00 | 0.18 |
| $C_{22}H_9N_5O_5$ | 0.41 | 0.23 | 0.23 |
| $C_{24}H_{10}N_4O_4$ | 0.42 | 0.17 | 0.17 |
| $C_{24}H_{10}N_4O_6$ | 0.42 | 0.25 | 0.17 |
| $C_{14}H_6N_2O_{10}S_8$ | 0.43 | 0.71 | 0.14 |
| $C_{28}H_{12}N_8O_5$ | 0.43 | 0.18 | 0.29 |
| $C_{14}H_6O_3$ | 0.43 | 0.21 | 0.00 |
| $C_{23}H_{10}N_4O_6$ | 0.43 | 0.26 | 0.17 |
| $C_{21}H_9N_5O_6$ | 0.43 | 0.29 | 0.24 |
| $C_{14}H_6N_4O_4S$ | 0.43 | 0.29 | 0.29 |
| $C_{18}H_8N_8S$ | 0.44 | 0.00 | 0.44 |
| $C_{31}H_{14}N_8O_3$ | 0.45 | 0.10 | 0.26 |
| $C_{22}H_{10}N_4O_5$ | 0.45 | 0.23 | 0.18 |
| $C_{20}H_9N_5O_5$ | 0.45 | 0.25 | 0.25 |
| $C_{20}H_9N_5O_6$ | 0.45 | 0.30 | 0.25 |
| $C_{22}H_{10}N_4O_7$ | 0.45 | 0.32 | 0.18 |
| $C_{35}H_{16}O_4S$ | 0.46 | 0.11 | 0.00 |
| $C_{26}H_{12}N_4O_5$ | 0.46 | 0.19 | 0.15 |
| $C_{19}H_9N_5O_5$ | 0.47 | 0.26 | 0.26 |
| $C_{17}H_8N_4O_5$ | 0.47 | 0.29 | 0.24 |
| $C_{23}H_{11}N_5O_4$ | 0.48 | 0.17 | 0.22 |
| $C_{25}H_{12}N_4O_5$ | 0.48 | 0.20 | 0.16 |
| $C_{23}H_{11}N_5O_5$ | 0.48 | 0.22 | 0.22 |
| $C_{21}H_{10}N_4O_5$ | 0.48 | 0.24 | 0.19 |
| $C_{21}H_{10}N_4O_6$ | 0.48 | 0.29 | 0.19 |
| $C_4H_2N_2S_{10}$ | 0.50 | 0.00 | 0.50 |
| $C_{14}H_7N_3O_2S$ | 0.50 | 0.14 | 0.21 |
| $C_{28}H_{14}N_8O_5$ | 0.50 | 0.18 | 0.29 |
| $C_{24}H_{12}N_4O_5$ | 0.50 | 0.21 | 0.17 |
| $C_{22}H_{11}N_5O_5$ | 0.50 | 0.23 | 0.23 |
| $C_{18}H_9N_5O_5$ | 0.50 | 0.28 | 0.28 |
| $C_{24}H_{12}N_4O_7$ | 0.50 | 0.29 | 0.17 |
| $C_{12}H_6O_{12}S_5$ | 0.50 | 1.00 | 0.00 |
| $C_4H_2N_2O_4S_3$ | 0.50 | 1.00 | 0.50 |
| $C_{39}H_{20}N_{10}O$ | 0.51 | 0.03 | 0.26 |
| $C_{27}H_{14}N_4O_5$ | 0.52 | 0.19 | 0.15 |
| $C_{21}H_{11}N_5O_4$ | 0.52 | 0.19 | 0.24 |
| $C_{21}H_{11}N_5O_6$ | 0.52 | 0.29 | 0.24 |
| $C_{19}H_{10}N_4OS_9$ | 0.53 | 0.05 | 0.21 |
| $C_{17}H_9N_9O_2S_2$ | 0.53 | 0.12 | 0.53 |
| $C_{19}H_{10}N_4O_4$ | 0.53 | 0.21 | 0.21 |
| $C_{17}H_9N_5O_5$ | 0.53 | 0.29 | 0.29 |
| $C_{24}H_{13}N_5O_3$ | 0.54 | 0.13 | 0.21 |
| $C_{47}H_{26}N_4OS$ | 0.55 | 0.02 | 0.09 |
| $C_{20}H_{11}N_5O_4$ | 0.55 | 0.20 | 0.25 |
| $C_{22}H_{12}N_4O_6$ | 0.55 | 0.27 | 0.18 |
| $C_{11}H_6O_{12}S_3$ | 0.55 | 1.09 | 0.00 |
| $C_{39}H_{22}N_2S$ | 0.56 | 0.00 | 0.05 |
| $C_9H_5N_3O$ | 0.56 | 0.11 | 0.33 |
| $C_{25}H_{14}N_4O_5$ | 0.56 | 0.20 | 0.16 |
| $C_{21}H_{12}N_5O_5$ | 0.57 | 0.24 | 0.19 |
| $C_{21}H_{12}N_{10}O_5S$ | 0.57 | 0.24 | 0.48 |
| $C_{45}H_{26}$ | 0.58 | 0.00 | 0.00 |
| $C_{24}H_{14}N_4O_4$ | 0.58 | 0.17 | 0.17 |
| $C_{24}H_{14}N_4O_5$ | 0.58 | 0.21 | 0.17 |
| $C_{24}H_{14}N_4O_6$ | 0.58 | 0.25 | 0.17 |
| $C_{41}H_{24}$ | 0.59 | 0.00 | 0.00 |
| $C_{22}H_{13}N_5O_2$ | 0.59 | 0.09 | 0.23 |
| $C_{17}H_{10}O_3S_2$ | 0.59 | 0.18 | 0.00 |
| $C_{16}H_{16}S_2$ | 1.00 | 0.00 | 0.00 |
| $C_{44}H_{44}N_2$ | 1.00 | 0.00 | 0.05 |
| $C_{17}H_{17}NS_2$ | 1.00 | 0.00 | 0.06 |
| $C_{15}H_{15}NS_2$ | 1.00 | 0.00 | 0.07 |
| $C_{26}H_{26}N_4S_2$ | 1.00 | 0.00 | 0.15 |
| $C_{41}H_{41}N_7S$ | 1.00 | 0.00 | 0.17 |
| $C_{24}H_{24}N_4S_2$ | 1.00 | 0.00 | 0.17 |
| $C_{33}H_{33}N_7S_2$ | 1.00 | 0.00 | 0.21 |
| $C_{16}H_{16}N_4S_3$ | 1.00 | 0.00 | 0.25 |
| $C_{40}H_{40}N_{12}$ | 1.00 | 0.00 | 0.30 |
| $C_{28}H_{28}N_{16}$ | 1.00 | 0.00 | 0.57 |
| $C_{34}H_{34}N_6OS$ | 1.00 | 0.03 | 0.18 |
| $C_{49}H_{49}N_3O_2$ | 1.00 | 0.04 | 0.06 |
| $C_{28}H_{28}N_2OS$ | 1.00 | 0.04 | 0.07 |
| $C_{19}H_{19}NOS_2$ | 1.00 | 0.05 | 0.05 |
| $C_{37}H_{37}N_3O_2S$ | 1.00 | 0.05 | 0.08 |
| $C_{19}H_{19}N_3O$ | 1.00 | 0.05 | 0.16 |
| $C_{19}H_{19}N_5OS$ | 1.00 | 0.05 | 0.26 |

TABLE 5B-continued

Unique Molecular Formulas Identified in the Semi-Humic Composition

| Unique Formulas | H/C | O/C | N/C |
|---|---|---|---|
| $C_{16}H_{16}OS_2$ | 1.00 | 0.06 | 0.00 |
| $C_{29}H_{29}NO_2S$ | 1.00 | 0.07 | 0.03 |
| $C_{15}H_{15}NOS_2$ | 1.00 | 0.07 | 0.07 |
| $C_{20}H_{20}O_2S_2$ | 1.00 | 0.10 | 0.00 |
| $C_{21}H_{21}NO_2$ | 1.00 | 0.10 | 0.05 |
| $C_{29}H_{29}N_{13}O_3$ | 1.00 | 0.10 | 0.45 |
| $C_{19}H_{19}NO_2S_2$ | 1.00 | 0.11 | 0.05 |
| $C_{26}H_{26}O_3S$ | 1.00 | 0.12 | 0.00 |
| $C_{17}H_{17}NO_2S_2$ | 1.00 | 0.12 | 0.06 |
| $C_{33}H_{33}N_{13}O_4$ | 1.00 | 0.12 | 0.39 |
| $C_{16}H_{16}O_2S_2$ | 1.00 | 0.13 | 0.00 |
| $C_8H_8N_2OS_6$ | 1.00 | 0.13 | 0.25 |
| $C_{30}H_{30}N_8O_5S_2$ | 1.00 | 0.17 | 0.27 |
| $C_{16}H_{16}O_3S_2$ | 1.00 | 0.19 | 0.00 |
| $C_{15}H_{15}NO_3S_2$ | 1.00 | 0.20 | 0.07 |
| $C_{20}H_{20}N_6O_4S_3$ | 1.00 | 0.20 | 0.30 |
| $C_{20}H_{20}N_{10}O_4S$ | 1.00 | 0.20 | 0.50 |
| $C_{14}H_{14}O_3S_2$ | 1.00 | 0.21 | 0.00 |
| $C_8H_8O_2$ | 1.00 | 0.25 | 0.00 |
| $C_{13}H_{13}N_7O_5S$ | 1.00 | 0.38 | 0.54 |
| $C_{10}H_{10}O_4$ | 1.00 | 0.40 | 0.00 |
| $C_8H_8O_4$ | 1.00 | 0.50 | 0.00 |
| $C_9H_9N_3O_5$ | 1.00 | 0.56 | 0.33 |
| $C_{30}H_{31}N_{13}$ | 1.03 | 0.00 | 0.43 |
| $C_{30}H_{31}NOS$ | 1.03 | 0.03 | 0.03 |
| $C_{30}H_{31}N_3OS$ | 1.03 | 0.03 | 0.10 |
| $C_{29}H_{30}N_{12}O$ | 1.03 | 0.03 | 0.41 |
| $C_{29}H_{30}N_{12}O_2$ | 1.03 | 0.07 | 0.41 |
| $C_{30}H_{31}N_{13}O_3$ | 1.03 | 0.10 | 0.43 |
| $C_{27}H_{28}S_4$ | 1.04 | 0.00 | 0.00 |
| $C_{28}H_{29}NS$ | 1.04 | 0.00 | 0.04 |
| $C_{28}H_{29}N_{13}$ | 1.04 | 0.00 | 0.46 |
| $C_{25}H_{26}OS_4$ | 1.04 | 0.04 | 0.00 |
| $C_{28}H_{29}NO_2S$ | 1.04 | 0.07 | 0.04 |
| $C_{25}H_{26}N_4O_4S$ | 1.04 | 0.16 | 0.16 |
| $C_{43}H_{45}N_7S$ | 1.05 | 0.00 | 0.16 |
| $C_{21}H_{22}N_8$ | 1.05 | 0.00 | 0.38 |
| $C_{20}H_{21}NO_2S_2$ | 1.05 | 0.10 | 0.05 |
| $C_{39}H_{41}N_3O_4S$ | 1.05 | 0.10 | 0.08 |
| $C_{22}H_{23}NO_3S_2$ | 1.05 | 0.14 | 0.05 |
| $C_{21}H_{22}N_4O_5$ | 1.05 | 0.24 | 0.19 |
| $C_{31}H_{33}NS$ | 1.06 | 0.00 | 0.03 |
| $C_{16}H_{17}NS_2$ | 1.06 | 0.00 | 0.06 |
| $C_{17}H_{18}N_2S_2$ | 1.06 | 0.00 | 0.12 |
| $C_{36}H_{38}N_8S$ | 1.06 | 0.00 | 0.22 |
| $C_{16}H_{17}NOS_2$ | 1.06 | 0.06 | 0.06 |
| $C_{35}H_{37}N_3O_2S$ | 1.06 | 0.06 | 0.09 |
| $C_{31}H_{33}N_5O_3S_4$ | 1.06 | 0.10 | 0.16 |
| $C_{18}H_{19}NO_2S_2$ | 1.06 | 0.11 | 0.06 |
| $C_{17}H_{18}O_2S_2$ | 1.06 | 0.12 | 0.00 |
| $C_{16}H_{17}NO_2S_2$ | 1.06 | 0.13 | 0.06 |
| $C_{17}H_{18}O_3S_2$ | 1.06 | 0.18 | 0.00 |
| $C_{17}H_{18}N_8O_3$ | 1.06 | 0.18 | 0.47 |
| $C_{16}H_{17}NO_3S_2$ | 1.06 | 0.19 | 0.06 |
| $C_{18}H_{19}N_7O_4$ | 1.06 | 0.22 | 0.39 |
| $C_{17}H_{18}N_6O_4S_3$ | 1.06 | 0.24 | 0.35 |
| $C_{16}H_{17}NO_4S_2$ | 1.06 | 0.25 | 0.06 |
| $C_{30}H_{32}N_2S$ | 1.07 | 0.00 | 0.07 |
| $C_{28}H_{30}N_4S$ | 1.07 | 0.00 | 0.14 |
| $C_{28}H_{30}N_{12}$ | 1.07 | 0.00 | 0.43 |
| $C_{28}H_{30}OS_4$ | 1.07 | 0.04 | 0.00 |
| $C_{15}H_{16}OS_2$ | 1.07 | 0.07 | 0.00 |
| $C_{29}H_{31}NO_2S$ | 1.07 | 0.07 | 0.03 |
| $C_{14}H_{15}NOS_2$ | 1.07 | 0.07 | 0.07 |
| $C_{28}H_{30}N_2O_2S$ | 1.07 | 0.07 | 0.07 |
| $C_{27}H_{29}NO_3S$ | 1.07 | 0.11 | 0.04 |
| $C_{15}H_{16}O_2S_2$ | 1.07 | 0.13 | 0.00 |
| $C_{14}H_{15}N_7O_5S$ | 1.07 | 0.36 | 0.50 |
| $C_{26}H_{28}S_4$ | 1.08 | 0.00 | 0.00 |
| $C_{24}H_{26}N_{10}O_2S_3$ | 1.08 | 0.08 | 0.42 |
| $C_{13}H_{14}N_6OS$ | 1.08 | 0.08 | 0.46 |
| $C_{25}H_{27}N_{13}O_2$ | 1.08 | 0.08 | 0.52 |
| $C_{37}H_{40}N_4O_4$ | 1.08 | 0.11 | 0.11 |
| $C_{24}H_{26}O_4S_2$ | 1.08 | 0.17 | 0.00 |
| $C_{12}H_{13}N_7O_4S$ | 1.08 | 0.33 | 0.58 |
| $C_{13}H_{14}N_6O_5S$ | 1.08 | 0.38 | 0.46 |
| $C_{22}H_{24}N_6S_5$ | 1.09 | 0.00 | 0.27 |
| $C_{23}H_{25}N_9$ | 1.09 | 0.00 | 0.39 |
| $C_{22}H_{24}O_2S_2$ | 1.09 | 0.09 | 0.00 |
| $C_{23}H_{25}N_{11}O_3S$ | 1.09 | 0.13 | 0.48 |
| $C_{35}H_{38}O_6S_4$ | 1.09 | 0.17 | 0.00 |
| $C_{22}H_{24}O_4$ | 1.09 | 0.18 | 0.00 |
| $C_{22}H_{24}N_6O_4$ | 1.09 | 0.18 | 0.27 |
| $C_{40}H_{44}N_2S_4$ | 1.10 | 0.00 | 0.05 |
| $C_{21}H_{23}NS_4$ | 1.10 | 0.00 | 0.05 |
| $C_{29}H_{32}N_8S_2$ | 1.10 | 0.00 | 0.28 |
| $C_{31}H_{34}N_4OS_2$ | 1.10 | 0.03 | 0.13 |
| $C_{30}H_{33}NO_2S$ | 1.10 | 0.07 | 0.03 |
| $C_{31}H_{34}N_2O_3S$ | 1.10 | 0.10 | 0.06 |
| $C_{29}H_{32}N_2O_3S$ | 1.10 | 0.10 | 0.07 |
| $C_{20}H_{22}N_{10}O_3S$ | 1.10 | 0.15 | 0.50 |
| $C_{29}H_{32}N_8O_6$ | 1.10 | 0.21 | 0.28 |
| $C_{27}H_{30}S_4$ | 1.11 | 0.00 | 0.00 |
| $C_{28}H_{31}NS$ | 1.11 | 0.00 | 0.04 |
| $C_{19}H_{21}N_7$ | 1.11 | 0.00 | 0.37 |
| $C_{19}H_{21}NOS_2$ | 1.11 | 0.05 | 0.05 |
| $C_{36}H_{40}N_4O_2$ | 1.11 | 0.06 | 0.11 |
| $C_{18}H_{20}N_8O$ | 1.11 | 0.06 | 0.44 |
| $C_{18}H_{20}O_2S_{10}$ | 1.11 | 0.11 | 0.00 |
| $C_{19}H_{21}NO_2S_2$ | 1.11 | 0.11 | 0.05 |
| $C_{19}H_{21}NO_3S_2$ | 1.11 | 0.16 | 0.05 |
| $C_{18}H_{20}N_8O_3$ | 1.11 | 0.17 | 0.44 |
| $C_9H_{10}N_6O_2S$ | 1.11 | 0.22 | 0.67 |
| $C_{27}H_{30}O_{10}S$ | 1.11 | 0.37 | 0.00 |
| $C_{25}H_{28}S_4$ | 1.12 | 0.00 | 0.00 |
| $C_{34}H_{38}N_2S$ | 1.12 | 0.00 | 0.06 |
| $C_{33}H_{37}N_{13}S_2$ | 1.12 | 0.00 | 0.39 |
| $C_{26}H_{29}N_{15}$ | 1.12 | 0.00 | 0.58 |
| $C_{17}H_{19}NO_2S_2$ | 1.12 | 0.12 | 0.06 |
| $C_{25}H_{28}N_{12}O_4$ | 1.12 | 0.16 | 0.48 |
| $C_{25}H_{28}N_8O_5$ | 1.12 | 0.20 | 0.32 |
| $C_{15}H_{17}NS_2$ | 1.13 | 0.00 | 0.07 |
| $C_{16}H_{18}N_2S_2$ | 1.13 | 0.00 | 0.13 |
| $C_{23}H_{26}N_4S_2$ | 1.13 | 0.00 | 0.17 |
| $C_{38}H_{43}N_7S$ | 1.13 | 0.00 | 0.18 |
| $C_{32}H_{36}N_8S_2$ | 1.13 | 0.00 | 0.25 |
| $C_{16}H_{18}N_4S_3$ | 1.13 | 0.00 | 0.25 |
| $C_{30}H_{34}N_8S_2$ | 1.13 | 0.00 | 0.27 |
| $C_{23}H_{26}N_6OS_5$ | 1.13 | 0.04 | 0.26 |
| $C_{38}H_{43}N_3O_3S$ | 1.13 | 0.08 | 0.08 |
| $C_{16}H_{18}O_2S_2$ | 1.13 | 0.13 | 0.00 |
| $C_{15}H_{17}NO_2S_2$ | 1.13 | 0.13 | 0.07 |
| $C_{23}H_{26}N_8O_3$ | 1.13 | 0.13 | 0.35 |
| $C_{16}H_{18}O_3S_2$ | 1.13 | 0.19 | 0.00 |
| $C_{15}H_{17}NO_3S_2$ | 1.13 | 0.20 | 0.07 |
| $C_{15}H_{17}N_5O_3S$ | 1.13 | 0.20 | 0.33 |
| $C_{16}H_{18}O_4S_2$ | 1.13 | 0.25 | 0.00 |
| $C_{30}H_{34}O_8$ | 1.13 | 0.27 | 0.00 |
| $C_8H_9N_5O_4$ | 1.13 | 0.50 | 0.63 |
| $C_{29}H_{33}N_{13}$ | 1.14 | 0.00 | 0.45 |
| $C_{29}H_{33}N_5OS$ | 1.14 | 0.03 | 0.17 |
| $C_{36}H_{41}N_7O_2$ | 1.14 | 0.06 | 0.19 |
| $C_{21}H_{24}O_2S_2$ | 1.14 | 0.10 | 0.00 |
| $C_{29}H_{33}NO_3S$ | 1.14 | 0.10 | 0.03 |
| $C_{21}H_{24}N_6O_2S_3$ | 1.14 | 0.10 | 0.29 |
| $C_{21}H_{24}N_8O_2$ | 1.14 | 0.10 | 0.38 |
| $C_{14}H_{16}O_2S_2$ | 1.14 | 0.14 | 0.00 |
| $C_{14}H_{16}O_3S_2$ | 1.14 | 0.21 | 0.00 |
| $C_{29}H_{33}N_3O_6$ | 1.14 | 0.21 | 0.10 |
| $C_{14}H_{16}N_6O_4$ | 1.14 | 0.29 | 0.43 |
| $C_{14}H_{16}N_2O_7$ | 1.14 | 0.50 | 0.14 |
| $C_{26}H_{30}N_{18}S$ | 1.15 | 0.00 | 0.69 |
| $C_{26}H_{30}S_4$ | 1.15 | 0.00 | 0.00 |
| $C_{20}H_{23}NS_2$ | 1.15 | 0.00 | 0.05 |
| $C_{39}H_{45}N_7S$ | 1.15 | 0.00 | 0.18 |
| $C_{27}H_{31}N_{13}$ | 1.15 | 0.00 | 0.48 |
| $C_{27}H_{31}N_{13}O$ | 1.15 | 0.04 | 0.48 |
| $C_{27}H_{31}N_{13}O_2$ | 1.15 | 0.07 | 0.48 |
| $C_{13}H_{15}N_5O$ | 1.15 | 0.08 | 0.38 |
| $C_{20}H_{23}NO_2S_2$ | 1.15 | 0.10 | 0.05 |

TABLE 5B-continued

Unique Molecular Formulas Identified in the Semi-Humic Composition

| Unique Formulas | H/C | O/C | N/C |
|---|---|---|---|
| $C_{13}H_{15}NO_2S_2$ | 1.15 | 0.15 | 0.08 |
| $C_{19}H_{22}N_6O_{16}$ | 1.16 | 0.84 | 0.32 |
| $C_{19}H_{22}N_6S_3$ | 1.16 | 0.00 | 0.32 |
| $C_{32}H_{37}N_3O_2S$ | 1.16 | 0.06 | 0.09 |
| $C_{25}H_{29}N_7O_2S_2$ | 1.16 | 0.08 | 0.28 |
| $C_{32}H_{37}N_3O_3S_2$ | 1.16 | 0.09 | 0.09 |
| $C_{19}H_{22}N_6O_2$ | 1.16 | 0.11 | 0.32 |
| $C_{19}H_{22}N_6O_2S_3$ | 1.16 | 0.11 | 0.32 |
| $C_{19}H_{22}N_{10}O_2S$ | 1.16 | 0.11 | 0.53 |
| $C_{41}H_{48}N_4S_3$ | 1.17 | 0.00 | 0.10 |
| $C_{23}H_{27}N_3OS_2$ | 1.17 | 0.04 | 0.13 |
| $C_{35}H_{41}N_3O_3S$ | 1.17 | 0.09 | 0.09 |
| $C_{23}H_{27}N_7O_2$ | 1.17 | 0.09 | 0.30 |
| $C_{18}H_{21}NO_2S_2$ | 1.17 | 0.11 | 0.06 |
| $C_{12}H_{14}O_2S_3$ | 1.17 | 0.17 | 0.00 |
| $C_{36}H_{42}O_6S$ | 1.17 | 0.17 | 0.00 |
| $C_{18}H_{21}N_7O_3$ | 1.17 | 0.17 | 0.39 |
| $C_{18}H_{21}NO_4S_2$ | 1.17 | 0.22 | 0.06 |
| $C_{12}H_{14}O_3S_3$ | 1.17 | 0.25 | 0.00 |
| $C_{18}H_{21}N_3O_6$ | 1.17 | 0.33 | 0.17 |
| $C_{22}H_{26}N_2OS_2$ | 1.18 | 0.05 | 0.09 |
| $C_{17}H_{20}OS_2$ | 1.18 | 0.06 | 0.00 |
| $C_{17}H_{20}O_2S_2$ | 1.18 | 0.12 | 0.00 |
| $C_{17}H_{20}N_8O_2$ | 1.18 | 0.12 | 0.47 |
| $C_{22}H_{26}N_8O_3$ | 1.18 | 0.14 | 0.36 |
| $C_{22}H_{26}N_8O_4$ | 1.18 | 0.18 | 0.36 |
| $C_{28}H_{33}N_3O_6$ | 1.18 | 0.21 | 0.11 |
| $C_{17}H_{20}N_6O_4$ | 1.18 | 0.24 | 0.35 |
| $C_{22}H_{26}N_8O_9S_3$ | 1.18 | 0.41 | 0.36 |
| $C_{27}H_{32}N_8S_2$ | 1.19 | 0.00 | 0.30 |
| $C_{26}H_{31}N_{11}$ | 1.19 | 0.00 | 0.42 |
| $C_{32}H_{38}N_2OS$ | 1.19 | 0.03 | 0.06 |
| $C_{21}H_{25}NOS_2$ | 1.19 | 0.05 | 0.05 |
| $C_{16}H_{19}NOS_2$ | 1.19 | 0.06 | 0.06 |
| $C_{26}H_{31}N_{13}O_2$ | 1.19 | 0.08 | 0.50 |
| $C_{31}H_{37}NO_3S$ | 1.19 | 0.10 | 0.03 |
| $C_{16}H_{19}NO_2S_2$ | 1.19 | 0.13 | 0.06 |
| $C_{32}H_{38}N_2O_4S$ | 1.19 | 0.13 | 0.06 |
| $C_{16}H_{19}NO_3S_2$ | 1.19 | 0.19 | 0.06 |
| $C_{21}H_{25}N_7O_4$ | 1.19 | 0.19 | 0.33 |
| $C_{27}H_{32}N_8O_6$ | 1.19 | 0.22 | 0.30 |
| $C_{16}H_{19}N_7O_5$ | 1.19 | 0.31 | 0.44 |
| $C_{15}H_{18}O_9S_2$ | 1.20 | 0.60 | 0.00 |
| $C_{15}H_{18}S_2$ | 1.20 | 0.00 | 0.00 |
| $C_{25}H_{30}S_4$ | 1.20 | 0.00 | 0.00 |
| $C_{20}H_{24}OS_2$ | 1.20 | 0.05 | 0.00 |
| $C_{15}H_{18}OS_2$ | 1.20 | 0.07 | 0.00 |
| $C_{30}H_{36}O_2S_2$ | 1.20 | 0.07 | 0.00 |
| $C_{10}H_{12}OS_3$ | 1.20 | 0.10 | 0.00 |
| $C_{30}H_{36}N_2O_3S$ | 1.20 | 0.10 | 0.07 |
| $C_{15}H_{18}O_2S_2$ | 1.20 | 0.13 | 0.00 |
| $C_{20}H_{24}N_{10}O_3S$ | 1.20 | 0.15 | 0.50 |
| $C_{15}H_{18}O_3S_2$ | 1.20 | 0.20 | 0.00 |
| $C_{20}H_{24}N_4O_4$ | 1.20 | 0.20 | 0.20 |
| $C_{30}H_{36}O_8$ | 1.20 | 0.27 | 0.00 |
| $C_{28}H_{34}N_{14}$ | 1.21 | 0.00 | 0.50 |
| $C_{34}H_{41}N_3OS$ | 1.21 | 0.03 | 0.09 |
| $C_{14}H_{17}NOS_2$ | 1.21 | 0.07 | 0.07 |
| $C_{14}H_{17}N_7OS$ | 1.21 | 0.07 | 0.50 |
| $C_{24}H_{29}N_7O_2S$ | 1.21 | 0.08 | 0.29 |
| $C_{24}H_{29}N_9O_2$ | 1.21 | 0.08 | 0.38 |
| $C_{19}H_{23}N_{13}O_2S$ | 1.21 | 0.11 | 0.68 |
| $C_{19}H_{23}NO_2S_2$ | 1.21 | 0.11 | 0.05 |
| $C_{19}H_{23}N_7O_4$ | 1.21 | 0.21 | 0.37 |
| $C_{18}H_{22}N_8O$ | 1.22 | 0.06 | 0.44 |
| $C_{18}H_{22}O_2S_2$ | 1.22 | 0.11 | 0.00 |
| $C_{23}H_{28}N_6O_7S_3$ | 1.22 | 0.30 | 0.26 |
| $C_{30}H_{37}NOS$ | 1.23 | 0.03 | 0.03 |
| $C_{31}H_{38}N_2OS$ | 1.23 | 0.03 | 0.06 |
| $C_{30}H_{37}N_3OS$ | 1.23 | 0.03 | 0.10 |
| $C_{22}H_{27}N_3OS_2$ | 1.23 | 0.05 | 0.14 |
| $C_{22}H_{27}N_7O_2$ | 1.23 | 0.09 | 0.32 |
| $C_{26}H_{32}N_{12}O_3$ | 1.23 | 0.12 | 0.46 |
| $C_{30}H_{37}N_{13}O_4$ | 1.23 | 0.13 | 0.43 |
| $C_{35}H_{43}N_3O_7$ | 1.23 | 0.20 | 0.09 |
| $C_{31}H_{38}N_4O_7$ | 1.23 | 0.23 | 0.13 |
| $C_{21}H_{26}N_8O$ | 1.24 | 0.05 | 0.38 |
| $C_{21}H_{26}N_8O_3$ | 1.24 | 0.14 | 0.38 |
| $C_{21}H_{26}N_8O_5$ | 1.24 | 0.24 | 0.38 |
| $C_{17}H_{21}N_7O_5$ | 1.24 | 0.29 | 0.41 |
| $C_{40}H_{50}S_3$ | 1.25 | 0.00 | 0.00 |
| $C_{24}H_{30}N_6S_5$ | 1.25 | 0.00 | 0.25 |
| $C_{24}H_{30}N_6S_2$ | 1.25 | 0.00 | 0.25 |
| $C_{16}H_{20}N_4S_3$ | 1.25 | 0.00 | 0.25 |
| $C_{20}H_{25}N_7$ | 1.25 | 0.00 | 0.35 |
| $C_{28}H_{35}N_{15}S_2$ | 1.25 | 0.00 | 0.54 |
| $C_{28}H_{35}N_3OS$ | 1.25 | 0.04 | 0.11 |
| $C_{16}H_{20}N_2O$ | 1.25 | 0.06 | 0.13 |
| $C_{20}H_{25}N_7O_2$ | 1.25 | 0.10 | 0.35 |
| $C_{12}H_{15}N_3O_2$ | 1.25 | 0.17 | 0.25 |
| $C_{32}H_{40}O_6S$ | 1.25 | 0.19 | 0.00 |
| $C_{16}H_{20}O_3S_2$ | 1.25 | 0.19 | 0.00 |
| $C_{16}H_{20}N_8O_3$ | 1.25 | 0.19 | 0.50 |
| $C_{19}H_{24}S$ | 1.26 | 0.00 | 0.00 |
| $C_{19}H_{24}N_2S_5$ | 1.26 | 0.00 | 0.11 |
| $C_{23}H_{29}N_7S$ | 1.26 | 0.00 | 0.30 |
| $C_{34}H_{43}N_3OS$ | 1.26 | 0.03 | 0.09 |
| $C_{31}H_{39}N_3OS$ | 1.26 | 0.03 | 0.10 |
| $C_{19}H_{24}N_2OS_5$ | 1.26 | 0.05 | 0.11 |
| $C_{19}H_{24}N_6OS_3$ | 1.26 | 0.05 | 0.32 |
| $C_{19}H_{24}N_8O$ | 1.26 | 0.05 | 0.42 |
| $C_{19}H_{24}N_6O_2S_3$ | 1.26 | 0.11 | 0.32 |
| $C_{19}H_{24}O_4S_2$ | 1.26 | 0.21 | 0.00 |
| $C_{19}H_{24}N_8O_4$ | 1.26 | 0.21 | 0.42 |
| $C_{41}H_{52}S_4$ | 1.27 | 0.00 | 0.00 |
| $C_{37}H_{47}N_3S_3$ | 1.27 | 0.00 | 0.08 |
| $C_{30}H_{38}N_2OS$ | 1.27 | 0.03 | 0.07 |
| $C_{30}H_{38}N_{14}O$ | 1.27 | 0.03 | 0.47 |
| $C_{15}H_{19}NO_3S_2$ | 1.27 | 0.20 | 0.07 |
| $C_{26}H_{33}NO_6S$ | 1.27 | 0.23 | 0.04 |
| $C_{26}H_{33}NO_8$ | 1.27 | 0.31 | 0.04 |
| $C_{39}H_{50}O_4S$ | 1.28 | 0.10 | 0.00 |
| $C_{25}H_{32}N_8O_4$ | 1.28 | 0.16 | 0.32 |
| $C_{18}H_{23}NO_3S_2$ | 1.28 | 0.17 | 0.06 |
| $C_{39}H_{50}N_4O_7$ | 1.28 | 0.18 | 0.10 |
| $C_{18}H_{23}NO_4S_2$ | 1.28 | 0.22 | 0.06 |
| $C_{17}H_{22}N_2S_2$ | 1.29 | 0.00 | 0.12 |
| $C_{17}H_{22}N_4S_5$ | 1.29 | 0.00 | 0.24 |
| $C_{28}H_{36}N_{14}$ | 1.29 | 0.00 | 0.50 |
| $C_{35}H_{45}N_9OS$ | 1.29 | 0.03 | 0.26 |
| $C_{21}H_{27}N_3OS_2$ | 1.29 | 0.05 | 0.14 |
| $C_{17}H_{22}N_8O$ | 1.29 | 0.06 | 0.47 |
| $C_{21}H_{27}N_9O_2$ | 1.29 | 0.10 | 0.43 |
| $C_{17}H_{22}N_2O_2S_2$ | 1.29 | 0.12 | 0.12 |
| $C_{17}H_{22}N_2O_2S_2$ | 1.29 | 0.12 | 0.12 |
| $C_{24}H_{31}N_9O_4$ | 1.29 | 0.17 | 0.38 |
| $C_{17}H_{22}O_3S_2$ | 1.29 | 0.18 | 0.00 |
| $C_{34}H_{44}N_4O_6$ | 1.29 | 0.18 | 0.12 |
| $C_{34}H_{44}N_2O_7$ | 1.29 | 0.21 | 0.06 |
| $C_{14}H_{18}N_4O_3$ | 1.29 | 0.21 | 0.29 |
| $C_{17}H_{22}O_4$ | 1.29 | 0.24 | 0.00 |
| $C_{21}H_{27}NO_6S$ | 1.29 | 0.29 | 0.05 |
| $C_{23}H_{30}N_8S_2$ | 1.30 | 0.00 | 0.35 |
| $C_{23}H_{30}N_6OS_5$ | 1.30 | 0.04 | 0.26 |
| $C_{20}H_{26}N_4OS_2$ | 1.30 | 0.05 | 0.20 |
| $C_{20}H_{26}O_2S_2$ | 1.30 | 0.10 | 0.00 |
| $C_{20}H_{26}N_8O_2$ | 1.30 | 0.10 | 0.40 |
| $C_{43}H_{56}O_5S$ | 1.30 | 0.12 | 0.00 |
| $C_{23}H_{30}N_8O_3$ | 1.30 | 0.13 | 0.35 |
| $C_{20}H_{26}N_8O_4$ | 1.30 | 0.20 | 0.40 |
| $C_{23}H_{30}O_8S$ | 1.30 | 0.35 | 0.00 |
| $C_{26}H_{34}N_{14}S_2$ | 1.31 | 0.00 | 0.54 |
| $C_{16}H_{21}N_7O_2S$ | 1.31 | 0.13 | 0.44 |
| $C_{35}H_{46}N_4O_6$ | 1.31 | 0.17 | 0.11 |
| $C_{16}H_{21}NO_3S_2$ | 1.31 | 0.19 | 0.06 |
| $C_{32}H_{42}O_8S_2$ | 1.31 | 0.25 | 0.00 |
| $C_{35}H_{46}N_4O_{11}$ | 1.31 | 0.31 | 0.11 |
| $C_{34}H_{45}N_3S$ | 1.32 | 0.00 | 0.09 |
| $C_{38}H_{50}N_4S_3$ | 1.32 | 0.00 | 0.11 |
| $C_{34}H_{45}N_3OS$ | 1.32 | 0.03 | 0.09 |

TABLE 5B-continued

Unique Molecular Formulas Identified in the Semi-Humic Composition

| Unique Formulas | H/C | O/C | N/C |
|---|---|---|---|
| $C_{22}H_{29}N_9O_2$ | 1.32 | 0.09 | 0.41 |
| $C_{19}H_{25}NO_3S_2$ | 1.32 | 0.16 | 0.05 |
| $C_{37}H_{49}NO_7S_2$ | 1.32 | 0.19 | 0.03 |
| $C_{15}H_{20}S_2$ | 1.33 | 0.00 | 0.00 |
| $C_{18}H_{24}N_6S_3$ | 1.33 | 0.00 | 0.33 |
| $C_{30}H_{40}N_{10}S_2$ | 1.33 | 0.00 | 0.33 |
| $C_{21}H_{28}N_{10}S_3$ | 1.33 | 0.00 | 0.48 |
| $C_{33}H_{44}N_8OS_2$ | 1.33 | 0.03 | 0.24 |
| $C_{39}H_{52}N_4O_2S_2$ | 1.33 | 0.05 | 0.10 |
| $C_{18}H_{24}OS_2$ | 1.33 | 0.06 | 0.00 |
| $C_{18}H_{24}N_2OS_5$ | 1.33 | 0.06 | 0.11 |
| $C_{15}H_{20}OS_2$ | 1.33 | 0.07 | 0.00 |
| $C_{15}H_{20}N_2OS_2$ | 1.33 | 0.07 | 0.13 |
| $C_{15}H_{20}N_6OS$ | 1.33 | 0.07 | 0.40 |
| $C_{21}H_{28}N_8O_2$ | 1.33 | 0.10 | 0.38 |
| $C_{18}H_{24}O_2S_2$ | 1.33 | 0.11 | 0.00 |
| $C_{18}H_{24}N_8O_2$ | 1.33 | 0.11 | 0.44 |
| $C_{15}H_{20}O_2S_2$ | 1.33 | 0.13 | 0.00 |
| $C_{24}H_{32}N_8O_3$ | 1.33 | 0.13 | 0.33 |
| $C_{18}H_{24}O_3S_2$ | 1.33 | 0.17 | 0.00 |
| $C_{18}H_{24}N_2O_3S_2$ | 1.33 | 0.17 | 0.11 |
| $C_{15}H_{20}O_3S_2$ | 1.33 | 0.20 | 0.00 |
| $C_{24}H_{32}O_5$ | 1.33 | 0.21 | 0.00 |
| $C_{21}H_{28}N_8O_5$ | 1.33 | 0.24 | 0.38 |
| $C_9H_{12}N_2O_3$ | 1.33 | 0.33 | 0.22 |
| $C_6H_8N_2O_7S_{10}$ | 1.33 | 1.17 | 0.33 |
| $C_{29}H_{39}N_{13}$ | 1.34 | 0.00 | 0.45 |
| $C_{38}H_{51}N_3O_3S_2$ | 1.34 | 0.08 | 0.08 |
| $C_{32}H_{43}N_7O_6$ | 1.34 | 0.19 | 0.22 |
| $C_{20}H_{27}N_{13}$ | 1.35 | 0.00 | 0.65 |
| $C_{20}H_{27}N_9O_2$ | 1.35 | 0.10 | 0.45 |
| $C_{17}H_{23}NO_3S_2$ | 1.35 | 0.18 | 0.06 |
| $C_{17}H_{23}N_7O_3$ | 1.35 | 0.18 | 0.41 |
| $C_{11}H_{15}NO_8S_8$ | 1.36 | 0.73 | 0.09 |
| $C_{22}H_{30}N_6S_5$ | 1.36 | 0.00 | 0.27 |
| $C_{28}H_{38}N_{16}S_3$ | 1.36 | 0.00 | 0.57 |
| $C_{25}H_{34}OS_4$ | 1.36 | 0.04 | 0.00 |
| $C_{28}H_{38}N_4O$ | 1.36 | 0.04 | 0.14 |
| $C_{22}H_{30}N_4OS_2$ | 1.36 | 0.05 | 0.18 |
| $C_{22}H_{30}N_8O_3$ | 1.36 | 0.14 | 0.36 |
| $C_{22}H_{30}O_7$ | 1.36 | 0.32 | 0.00 |
| $C_{22}H_{30}N_4O_9$ | 1.36 | 0.41 | 0.18 |
| $C_{11}H_{15}NO_5$ | 1.36 | 0.45 | 0.09 |
| $C_{19}H_{26}N_2S_5$ | 1.37 | 0.00 | 0.11 |
| $C_{19}H_{26}OS_2$ | 1.37 | 0.05 | 0.00 |
| $C_{19}H_{26}N_6OS_3$ | 1.37 | 0.05 | 0.32 |
| $C_{19}H_{26}O_2S_2$ | 1.37 | 0.11 | 0.00 |
| $C_{19}H_{26}N_6O_2S_3$ | 1.37 | 0.11 | 0.32 |
| $C_{19}H_{26}O_3S_2$ | 1.37 | 0.16 | 0.00 |
| $C_{19}H_{26}N_6O_4$ | 1.37 | 0.21 | 0.32 |
| $C_{19}H_{26}N_8O_4$ | 1.37 | 0.21 | 0.42 |
| $C_{35}H_{48}N_4O_9$ | 1.37 | 0.26 | 0.11 |
| $C_{16}H_{22}N_2S_5$ | 1.38 | 0.00 | 0.13 |
| $C_{29}H_{40}N_4S_2$ | 1.38 | 0.00 | 0.14 |
| $C_{29}H_{40}N_4O_2$ | 1.38 | 0.07 | 0.14 |
| $C_{24}H_{33}N_9O_2$ | 1.38 | 0.08 | 0.38 |
| $C_{21}H_{29}N_9O_2$ | 1.38 | 0.10 | 0.43 |
| $C_{16}H_{22}O_2S_2$ | 1.38 | 0.13 | 0.00 |
| $C_{16}H_{22}N_2O_2S_2$ | 1.38 | 0.13 | 0.13 |
| $C_{32}H_{44}N_4O_4S$ | 1.38 | 0.13 | 0.13 |
| $C_{21}H_{29}N_9O_3$ | 1.38 | 0.14 | 0.43 |
| $C_{34}H_{47}N_5O_6S$ | 1.38 | 0.18 | 0.15 |
| $C_{16}H_{22}O_3S_2$ | 1.38 | 0.19 | 0.00 |
| $C_{16}H_{22}N_2O_3S_5$ | 1.38 | 0.19 | 0.13 |
| $C_{16}H_{22}N_2O_4S_5$ | 1.38 | 0.25 | 0.13 |
| $C_8H_{11}NO_8S_5$ | 1.38 | 1.00 | 0.13 |
| $C_{23}H_{32}N_8S_2$ | 1.39 | 0.00 | 0.35 |
| $C_{33}H_{46}N_2O_2S_3$ | 1.39 | 0.06 | 0.06 |
| $C_{23}H_{32}N_8O_2S_3$ | 1.39 | 0.09 | 0.35 |
| $C_{28}H_{39}NO_4$ | 1.39 | 0.14 | 0.04 |
| $C_{18}H_{25}N_7O_4$ | 1.39 | 0.22 | 0.39 |
| $C_{23}H_{32}N_8O_6$ | 1.39 | 0.26 | 0.35 |
| $C_{10}H_{14}O_6$ | 1.40 | 0.60 | 0.00 |
| $C_{15}H_{21}NS_2$ | 1.40 | 0.00 | 0.07 |
| $C_{20}H_{28}N_2OS_2$ | 1.40 | 0.05 | 0.10 |
| $C_{20}H_{28}N_6OS_3$ | 1.40 | 0.05 | 0.30 |
| $C_{20}H_{28}N_2O_2S_2$ | 1.40 | 0.10 | 0.10 |
| $C_{20}H_{28}N_6O_2S_3$ | 1.40 | 0.10 | 0.30 |
| $C_{20}H_{28}O_3S_2$ | 1.40 | 0.15 | 0.00 |
| $C_{20}H_{28}N_2O_3S_2$ | 1.40 | 0.15 | 0.10 |
| $C_{20}H_{28}N_8O_3$ | 1.40 | 0.15 | 0.40 |
| $C_{20}H_{28}N_2O_4S_2$ | 1.40 | 0.20 | 0.10 |
| $C_{20}H_{28}N_8O_4$ | 1.40 | 0.20 | 0.40 |
| $C_{53}H_{74}N_{18}O_{12}S_5$ | 1.40 | 0.23 | 0.34 |
| $C_{10}H_{14}N_6O_5S$ | 1.40 | 0.50 | 0.60 |
| $C_{10}H_{14}O_5$ | 1.40 | 0.50 | 0.00 |
| $C_{15}H_{21}N_3O_{17}$ | 1.40 | 1.13 | 0.20 |
| $C_{10}H_{14}O_{15}$ | 1.40 | 1.50 | 0.00 |
| $C_{34}H_{48}N_{10}OS_2$ | 1.41 | 0.03 | 0.29 |
| $C_{29}H_{41}N_9OS_2$ | 1.41 | 0.03 | 0.31 |
| $C_{32}H_{45}N_{13}O$ | 1.41 | 0.03 | 0.41 |
| $C_{17}H_{24}OS_2$ | 1.41 | 0.06 | 0.00 |
| $C_{34}H_{48}N_{14}O_3$ | 1.41 | 0.09 | 0.41 |
| $C_{17}H_{24}O_2S_2$ | 1.41 | 0.12 | 0.00 |
| $C_{17}H_{24}N_2O_2S_2$ | 1.41 | 0.12 | 0.12 |
| $C_{32}H_{45}NO_4$ | 1.41 | 0.13 | 0.03 |
| $C_{22}H_{31}N_9O_3$ | 1.41 | 0.14 | 0.41 |
| $C_{27}H_{38}N_{10}O_6$ | 1.41 | 0.22 | 0.37 |
| $C_{22}H_{31}NO_5S$ | 1.41 | 0.23 | 0.05 |
| $C_{17}H_{24}O_4S_2$ | 1.41 | 0.24 | 0.00 |
| $C_{34}H_{48}O_{12}$ | 1.41 | 0.35 | 0.00 |
| $C_{24}H_{34}S_4$ | 1.42 | 0.00 | 0.00 |
| $C_{19}H_{27}N_7S_3$ | 1.42 | 0.00 | 0.37 |
| $C_{12}H_{17}N_3OS_2$ | 1.42 | 0.08 | 0.25 |
| $C_{19}H_{27}N_3O_2S_2$ | 1.42 | 0.11 | 0.16 |
| $C_{19}H_{27}NO_3S_2$ | 1.42 | 0.16 | 0.05 |
| $C_{31}H_{44}N_4O_5S$ | 1.42 | 0.16 | 0.13 |
| $C_{36}H_{51}NO_6S_2$ | 1.42 | 0.17 | 0.03 |
| $C_{24}H_{34}O_9S$ | 1.42 | 0.38 | 0.00 |
| $C_{30}H_{43}N_{13}$ | 1.43 | 0.00 | 0.43 |
| $C_{14}H_{20}OS_2$ | 1.43 | 0.07 | 0.00 |
| $C_{21}H_{30}N_8O_2$ | 1.43 | 0.10 | 0.38 |
| $C_{23}H_{33}N_9O_3$ | 1.43 | 0.13 | 0.39 |
| $C_{21}H_{30}N_{14}O_3S$ | 1.43 | 0.14 | 0.67 |
| $C_{14}H_{20}O_2S_2$ | 1.43 | 0.14 | 0.00 |
| $C_{21}H_{30}N_8O_4$ | 1.43 | 0.19 | 0.38 |
| $C_{14}H_{20}O_3S_2$ | 1.43 | 0.21 | 0.00 |
| $C_{16}H_{23}N_3S_2$ | 1.44 | 0.00 | 0.19 |
| $C_{18}H_{26}N_6S_3$ | 1.44 | 0.00 | 0.33 |
| $C_{36}H_{52}N_2OS_5$ | 1.44 | 0.03 | 0.06 |
| $C_{27}H_{39}N_5O$ | 1.44 | 0.04 | 0.19 |
| $C_{18}H_{26}OS_2$ | 1.44 | 0.06 | 0.00 |
| $C_{36}H_{52}N_4O_2$ | 1.44 | 0.06 | 0.11 |
| $C_{18}H_{26}N_2OS_2$ | 1.44 | 0.06 | 0.11 |
| $C_{18}H_{26}N_6OS_3$ | 1.44 | 0.06 | 0.33 |
| $C_{18}H_{26}O_2S_2$ | 1.44 | 0.11 | 0.00 |
| $C_{18}H_{26}N_2O_2S_2$ | 1.44 | 0.11 | 0.11 |
| $C_{18}H_{26}N_6O_2S_3$ | 1.44 | 0.11 | 0.33 |
| $C_{39}H_{56}O_5S$ | 1.44 | 0.13 | 0.00 |
| $C_{16}H_{23}NO_2S_2$ | 1.44 | 0.13 | 0.06 |
| $C_{18}H_{26}O_3S_2$ | 1.44 | 0.17 | 0.00 |
| $C_{16}H_{23}N_3O_3S_4$ | 1.44 | 0.19 | 0.19 |
| $C_{36}H_{52}O_{11}$ | 1.44 | 0.31 | 0.00 |
| $C_{33}H_{48}S_3$ | 1.45 | 0.00 | 0.00 |
| $C_{29}H_{42}N_4$ | 1.45 | 0.00 | 0.14 |
| $C_{22}H_{32}N_6S_5$ | 1.45 | 0.00 | 0.27 |
| $C_{22}H_{32}N_8S_3$ | 1.45 | 0.00 | 0.36 |
| $C_{20}H_{29}N_3OS_2$ | 1.45 | 0.05 | 0.15 |
| $C_{22}H_{32}N_6OS_5$ | 1.45 | 0.05 | 0.27 |
| $C_{33}H_{48}N_4O_2$ | 1.45 | 0.06 | 0.12 |
| $C_{11}H_{16}N_6OS_4$ | 1.45 | 0.09 | 0.55 |
| $C_{29}H_{42}N_4O_3$ | 1.45 | 0.10 | 0.14 |
| $C_{20}H_{29}N_3O_2S_2$ | 1.45 | 0.10 | 0.15 |
| $C_{38}H_{55}NO_7$ | 1.45 | 0.18 | 0.03 |
| $C_{20}H_{29}N_7O_4$ | 1.45 | 0.20 | 0.35 |
| $C_{20}H_{29}NO_6S$ | 1.45 | 0.30 | 0.05 |
| $C_{22}H_{32}O_9$ | 1.45 | 0.41 | 0.00 |
| $C_{11}H_{16}O_{14}$ | 1.45 | 1.27 | 0.00 |
| $C_{26}H_{38}N_8S_2$ | 1.46 | 0.00 | 0.31 |
| $C_{26}H_{38}N_8OS_2$ | 1.46 | 0.04 | 0.31 |

TABLE 5B-continued

Unique Molecular Formulas Identified in the Semi-Humic Composition

| Unique Formulas | H/C | O/C | N/C |
|---|---|---|---|
| $C_{24}H_{35}N_7O_2S_2$ | 1.46 | 0.08 | 0.29 |
| $C_{26}H_{38}N_8O_2S_2$ | 1.46 | 0.08 | 0.31 |
| $C_{24}H_{35}N_9O_2$ | 1.46 | 0.08 | 0.38 |
| $C_{24}H_{35}N_3O_8$ | 1.46 | 0.33 | 0.13 |
| $C_{19}H_{28}N_2S_5$ | 1.47 | 0.00 | 0.11 |
| $C_{30}H_{44}N_4$ | 1.47 | 0.00 | 0.13 |
| $C_{30}H_{44}OS_3$ | 1.47 | 0.03 | 0.00 |
| $C_{19}H_{28}OS_2$ | 1.47 | 0.05 | 0.00 |
| $C_{19}H_{28}N_2OS_2$ | 1.47 | 0.05 | 0.11 |
| $C_{15}H_{22}N_{10}OS$ | 1.47 | 0.07 | 0.67 |
| $C_{15}H_{22}OS_2$ | 1.47 | 0.07 | 0.00 |
| $C_{30}H_{44}N_{14}O_2$ | 1.47 | 0.07 | 0.47 |
| $C_{17}H_{25}NO_2S_2$ | 1.47 | 0.12 | 0.06 |
| $C_{15}H_{22}O_2S_2$ | 1.47 | 0.13 | 0.00 |
| $C_{32}H_{47}NO_4$ | 1.47 | 0.13 | 0.03 |
| $C_{15}H_{22}N_2O_2S_5$ | 1.47 | 0.13 | 0.13 |
| $C_{19}H_{28}O_3S_2$ | 1.47 | 0.16 | 0.00 |
| $C_{38}H_{56}N_4O_7$ | 1.47 | 0.18 | 0.11 |
| $C_{17}H_{25}N_7O_3$ | 1.47 | 0.18 | 0.41 |
| $C_{15}H_{22}O_3S_2$ | 1.47 | 0.20 | 0.00 |
| $C_{15}H_{22}N_2O_3S_5$ | 1.47 | 0.20 | 0.13 |
| $C_{15}H_{22}N_4O_3S$ | 1.47 | 0.20 | 0.27 |
| $C_{31}H_{46}N_4$ | 1.48 | 0.00 | 0.13 |
| $C_{29}H_{43}N_9S_2$ | 1.48 | 0.00 | 0.31 |
| $C_{23}H_{34}N_8O$ | 1.48 | 0.04 | 0.35 |
| $C_{25}H_{37}N_9OS_3$ | 1.48 | 0.04 | 0.36 |
| $C_{25}H_{37}N_9OS_2$ | 1.48 | 0.04 | 0.36 |
| $C_{31}H_{46}N_4O_2$ | 1.48 | 0.06 | 0.13 |
| $C_{29}H_{43}NO_4S$ | 1.48 | 0.14 | 0.03 |
| $C_{31}H_{46}O_6$ | 1.48 | 0.19 | 0.00 |
| $C_{27}H_{40}O_5S_2$ | 1.48 | 0.19 | 0.00 |
| $C_{37}H_{55}NOS_3$ | 1.49 | 0.03 | 0.03 |
| $C_{41}H_{61}NO_2$ | 1.49 | 0.05 | 0.02 |
| $C_{39}H_{58}O_4S_2$ | 1.49 | 0.10 | 0.00 |
| $C_{35}H_{52}O_6S_2$ | 1.49 | 0.17 | 0.00 |
| $C_{35}H_{52}N_4O_7$ | 1.49 | 0.20 | 0.11 |
| $C_{20}H_{30}S_2$ | 1.50 | 0.00 | 0.00 |
| $C_{24}H_{36}N_2S_4$ | 1.50 | 0.00 | 0.08 |
| $C_{28}H_{42}N_4S$ | 1.50 | 0.00 | 0.14 |
| $C_{28}H_{42}N_{10}S_2$ | 1.50 | 0.00 | 0.36 |
| $C_{16}H_{24}OS_2$ | 1.50 | 0.06 | 0.00 |
| $C_{18}H_{27}N_3OS_2$ | 1.50 | 0.06 | 0.17 |
| $C_{32}H_{48}N_6O_2S_2$ | 1.50 | 0.06 | 0.19 |
| $C_{14}H_{21}NOS_3$ | 1.50 | 0.07 | 0.07 |
| $C_{14}H_{21}N_7OS$ | 1.50 | 0.07 | 0.50 |
| $C_{16}H_{24}O_2S_2$ | 1.50 | 0.13 | 0.00 |
| $C_{16}H_{24}N_2O_2S_5$ | 1.50 | 0.13 | 0.13 |
| $C_{14}H_{21}NO_2S_2$ | 1.50 | 0.14 | 0.07 |
| $C_{36}H_{54}O_6S_2$ | 1.50 | 0.17 | 0.00 |
| $C_{18}H_{27}N_7O_3$ | 1.50 | 0.17 | 0.39 |
| $C_{16}H_{24}O_3S_2$ | 1.50 | 0.19 | 0.00 |
| $C_{18}H_{27}N_7O_4$ | 1.50 | 0.22 | 0.39 |
| $C_{22}H_{33}N_5O_6$ | 1.50 | 0.27 | 0.23 |
| $C_{26}H_{39}N_{11}O_8S$ | 1.50 | 0.31 | 0.42 |
| $C_{22}H_{33}NO_{12}$ | 1.50 | 0.55 | 0.05 |
| $C_8H_{12}O_8$ | 1.50 | 1.00 | 0.00 |
| $C_{41}H_{62}OS_4$ | 1.51 | 0.02 | 0.00 |
| $C_{37}H_{56}O_5S$ | 1.51 | 0.14 | 0.00 |
| $C_{37}H_{56}O_8S_2$ | 1.51 | 0.22 | 0.00 |
| $C_{21}H_{32}S_2$ | 1.52 | 0.00 | 0.00 |
| $C_{23}H_{35}N_7S_2$ | 1.52 | 0.00 | 0.30 |
| $C_{23}H_{35}N_9S_2$ | 1.52 | 0.00 | 0.39 |
| $C_{29}H_{44}N_4OS_2$ | 1.52 | 0.03 | 0.14 |
| $C_{21}H_{32}N_2OS_2$ | 1.52 | 0.05 | 0.10 |
| $C_{31}H_{47}NO_5S_2$ | 1.52 | 0.16 | 0.03 |
| $C_{27}H_{41}N_3O_6S_4$ | 1.52 | 0.22 | 0.11 |
| $C_{23}H_{35}N_5O_5S$ | 1.52 | 0.22 | 0.22 |
| $C_{21}H_{32}O_9S$ | 1.52 | 0.43 | 0.00 |
| $C_{17}H_{26}N_2S_2$ | 1.53 | 0.00 | 0.12 |
| $C_{38}H_{58}O_2S_4$ | 1.53 | 0.05 | 0.00 |
| $C_{19}H_{29}N_3OS_2$ | 1.53 | 0.05 | 0.16 |
| $C_{17}H_{26}OS_2$ | 1.53 | 0.06 | 0.00 |
| $C_{32}H_{49}NO_2S_4$ | 1.53 | 0.06 | 0.03 |
| $C_{17}H_{26}O_2S_2$ | 1.53 | 0.12 | 0.00 |
| $C_{17}H_{26}N_2O_2S_2$ | 1.53 | 0.12 | 0.12 |
| $C_{17}H_{26}O_4$ | 1.53 | 0.24 | 0.00 |
| $C_{17}H_{26}O_4S_2$ | 1.53 | 0.24 | 0.00 |
| $C_{34}H_{52}O_{12}$ | 1.53 | 0.35 | 0.00 |
| $C_{30}H_{46}N_2O_{14}S$ | 1.53 | 0.47 | 0.07 |
| $C_{24}H_{37}N_7S_2$ | 1.54 | 0.00 | 0.29 |
| $C_{41}H_{63}NO_3$ | 1.54 | 0.07 | 0.02 |
| $C_{13}H_{20}OS_2$ | 1.54 | 0.08 | 0.00 |
| $C_{26}H_{40}N_{12}O_2$ | 1.54 | 0.08 | 0.46 |
| $C_{37}H_{57}N_3O_4S_2$ | 1.54 | 0.11 | 0.08 |
| $C_{13}H_{20}N_2O_2S_2$ | 1.54 | 0.15 | 0.15 |
| $C_{35}H_{54}O_7S_2$ | 1.54 | 0.20 | 0.00 |
| $C_{13}H_{20}O_3S_2$ | 1.54 | 0.23 | 0.00 |
| $C_{13}H_{20}N_2O_{19}$ | 1.54 | 1.46 | 0.15 |
| $C_{11}H_{17}N_7O_7S$ | 1.55 | 0.64 | 0.64 |
| $C_{20}H_{31}N_7$ | 1.55 | 0.00 | 0.35 |
| $C_{22}H_{34}OS_2$ | 1.55 | 0.05 | 0.00 |
| $C_{22}H_{34}O_2S_2$ | 1.55 | 0.09 | 0.00 |
| $C_{22}H_{34}N_8O_2$ | 1.55 | 0.09 | 0.36 |
| $C_{20}H_{31}NO_2S_2$ | 1.55 | 0.10 | 0.05 |
| $C_{20}H_{31}N_7O_3$ | 1.55 | 0.15 | 0.35 |
| $C_{18}H_{28}N_2S_5$ | 1.56 | 0.00 | 0.11 |
| $C_{27}H_{42}N_4S_4$ | 1.56 | 0.00 | 0.15 |
| $C_{25}H_{39}N_9S_2$ | 1.56 | 0.00 | 0.36 |
| $C_{25}H_{39}N_{11}S_2$ | 1.56 | 0.00 | 0.44 |
| $C_{27}H_{42}N_8OS_2$ | 1.56 | 0.04 | 0.30 |
| $C_{18}H_{28}OS_2$ | 1.56 | 0.06 | 0.00 |
| $C_{18}H_{28}N_4OS_2$ | 1.56 | 0.06 | 0.22 |
| $C_{18}H_{28}O_2S_2$ | 1.56 | 0.11 | 0.00 |
| $C_{36}H_{56}N_4O_6$ | 1.56 | 0.17 | 0.11 |
| $C_{27}H_{42}O_6S$ | 1.56 | 0.22 | 0.00 |
| $C_{18}H_{28}N_6O_4$ | 1.56 | 0.22 | 0.33 |
| $C_{25}H_{39}N_5O_6S_2$ | 1.56 | 0.24 | 0.20 |
| $C_{18}H_{28}N_{12}O_7$ | 1.56 | 0.39 | 0.67 |
| $C_{14}H_{22}O_9S_2$ | 1.57 | 0.64 | 0.00 |
| $C_7H_{11}NO_5$ | 1.57 | 0.71 | 0.14 |
| $C_{14}H_{22}O_3S_2$ | 1.57 | 0.21 | 0.00 |
| $C_{28}H_{44}N_{10}O_8$ | 1.57 | 0.29 | 0.36 |
| $C_{23}H_{36}N_8O_{10}S_2$ | 1.57 | 0.43 | 0.35 |
| $C_{14}H_{22}N_2O_{19}$ | 1.57 | 1.36 | 0.14 |
| $C_{19}H_{30}N_2S_5$ | 1.58 | 0.00 | 0.11 |
| $C_{19}H_{30}OS_2$ | 1.58 | 0.05 | 0.00 |
| $C_{38}H_{60}N_4O_3S_2$ | 1.58 | 0.08 | 0.11 |
| $C_{19}H_{30}O_2S_2$ | 1.58 | 0.11 | 0.00 |
| $C_{19}H_{30}N_6O_2S_3$ | 1.58 | 0.11 | 0.32 |
| $C_{19}H_{30}O_3S_2$ | 1.58 | 0.16 | 0.00 |
| $C_{24}H_{38}O_5S_2$ | 1.58 | 0.21 | 0.00 |
| $C_{19}H_{30}O_8S$ | 1.58 | 0.42 | 0.00 |
| $C_{19}H_{30}N_{12}O_9S_3$ | 1.58 | 0.47 | 0.63 |
| $C_{12}H_{19}N_5O_7$ | 1.58 | 0.58 | 0.42 |
| $C_{29}H_{46}N_{10}OS_2$ | 1.59 | 0.03 | 0.34 |
| $C_{17}H_{27}N_3OS_2$ | 1.59 | 0.06 | 0.18 |
| $C_{34}H_{54}O_6$ | 1.59 | 0.18 | 0.00 |
| $C_{17}H_{27}N_5O_4$ | 1.59 | 0.24 | 0.29 |
| $C_{32}H_{51}NO_{10}S_2$ | 1.59 | 0.31 | 0.03 |
| $C_{22}H_{44}O_{14}S$ | 2.00 | 0.64 | 0.00 |
| $C_{21}H_{42}O_{13}S$ | 2.00 | 0.62 | 0.00 |
| $C_{17}H_{34}N_2O_{14}S_2$ | 2.00 | 0.82 | 0.12 |
| $C_{24}H_{48}N_{16}S_3$ | 2.00 | 0.00 | 0.67 |
| $C_{16}H_{32}N_{10}S_3$ | 2.00 | 0.00 | 0.63 |
| $C_{22}H_{44}S_2$ | 2.00 | 0.00 | 0.00 |
| $C_{21}H_{42}S_4$ | 2.00 | 0.00 | 0.00 |
| $C_{25}H_{50}S_2$ | 2.00 | 0.00 | 0.00 |
| $C_9H_{18}S_8$ | 2.00 | 0.00 | 0.00 |
| $C_{34}H_{68}N_2S_6$ | 2.00 | 0.00 | 0.06 |
| $C_{25}H_{50}N_4S_5$ | 2.00 | 0.00 | 0.16 |
| $C_{17}H_{34}N_4S_2$ | 2.00 | 0.00 | 0.24 |
| $C_8H_{16}N_2S_3$ | 2.00 | 0.00 | 0.25 |
| $C_{16}H_{32}N_4S_2$ | 2.00 | 0.00 | 0.25 |
| $C_{14}H_{28}N_6S_3$ | 2.00 | 0.00 | 0.43 |
| $C_{13}H_{26}N_6S$ | 2.00 | 0.00 | 0.46 |
| $C_{30}H_{60}OS_6$ | 2.00 | 0.03 | 0.00 |
| $C_{29}H_{58}N_6OS_5$ | 2.00 | 0.03 | 0.21 |
| $C_{19}H_{38}N_{12}OS_3$ | 2.00 | 0.05 | 0.63 |
| $C_{19}H_{38}OS_2$ | 2.00 | 0.05 | 0.00 |
| $C_{19}H_{38}N_6OS_2$ | 2.00 | 0.05 | 0.32 |

TABLE 5B-continued

Unique Molecular Formulas Identified in the Semi-Humic Composition

| Unique Formulas | H/C | O/C | N/C |
|---|---|---|---|
| $C_{14}H_{28}N_2OS_2$ | 2.00 | 0.07 | 0.14 |
| $C_{15}H_{30}N_6OS_3$ | 2.00 | 0.07 | 0.40 |
| $C_{13}H_{26}N_6OS$ | 2.00 | 0.08 | 0.46 |
| $C_{23}H_{46}N_{16}O_2S$ | 2.00 | 0.09 | 0.70 |
| $C_{29}H_{58}N_2O_3S_5$ | 2.00 | 0.10 | 0.07 |
| $C_{27}H_{54}N_8O_3S_3$ | 2.00 | 0.11 | 0.30 |
| $C_{19}H_{38}N_6O_2S_4$ | 2.00 | 0.11 | 0.32 |
| $C_{17}H_{34}N_{10}O_2S_3$ | 2.00 | 0.12 | 0.59 |
| $C_{14}H_{28}O_2S_3$ | 2.00 | 0.14 | 0.00 |
| $C_{13}H_{26}N_6O_2S$ | 2.00 | 0.15 | 0.46 |
| $C_{32}H_{64}O_5S$ | 2.00 | 0.16 | 0.00 |
| $C_{26}H_{52}N_2O_5S_5$ | 2.00 | 0.19 | 0.08 |
| $C_{16}H_{32}N_2O_3S_3$ | 2.00 | 0.19 | 0.13 |
| $C_{14}H_{28}O_3$ | 2.00 | 0.21 | 0.00 |
| $C_{26}H_{52}N_{12}O_6S$ | 2.00 | 0.23 | 0.46 |
| $C_{28}H_{56}N_6O_7S_3$ | 2.00 | 0.25 | 0.21 |
| $C_{11}H_{22}N_2O_3S_5$ | 2.00 | 0.27 | 0.18 |
| $C_{27}H_{54}N_4O_8S$ | 2.00 | 0.30 | 0.15 |
| $C_{29}H_{58}N_2O_{10}S_3$ | 2.00 | 0.34 | 0.07 |
| $C_{27}H_{54}N_2O_{10}S_3$ | 2.00 | 0.37 | 0.07 |
| $C_{25}H_{50}O_{11}S_3$ | 2.00 | 0.44 | 0.00 |
| $C_{20}H_{40}N_2O_{10}$ | 2.00 | 0.50 | 0.10 |
| $C_{10}H_{20}N_2O_5S$ | 2.00 | 0.50 | 0.20 |
| $C_{15}H_{30}N_2O_8S$ | 2.00 | 0.53 | 0.13 |
| $C_{36}H_{72}N_{18}O_{19}$ | 2.00 | 0.53 | 0.50 |
| $C_{13}H_{26}N_8O_7S$ | 2.00 | 0.54 | 0.62 |
| $C_6H_{12}O_7$ | 2.00 | 1.17 | 0.00 |
| $C_{13}H_{26}N_2O_{18}$ | 2.00 | 1.38 | 0.15 |
| $C_{32}H_{65}N_3OS_5$ | 2.03 | 0.03 | 0.09 |
| $C_{23}H_{47}N_{11}OS_3$ | 2.04 | 0.04 | 0.48 |
| $C_{26}H_{53}NO_2S_2$ | 2.04 | 0.08 | 0.04 |
| $C_{26}H_{53}N_5O_2S_4$ | 2.04 | 0.08 | 0.19 |
| $C_{26}H_{53}N_5O_2S_2$ | 2.04 | 0.08 | 0.19 |
| $C_{26}H_{53}NO_5S_5$ | 2.04 | 0.19 | 0.04 |
| $C_{25}H_{51}N_5O_8S$ | 2.04 | 0.32 | 0.20 |
| $C_{28}H_{57}N_7O_{11}S$ | 2.04 | 0.39 | 0.25 |
| $C_{26}H_{53}NO_{11}S_3$ | 2.04 | 0.42 | 0.04 |
| $C_{24}H_{49}N_5O_{10}S$ | 2.04 | 0.42 | 0.21 |
| $C_{23}H_{47}N_5O_{10}S$ | 2.04 | 0.43 | 0.22 |
| $C_{19}H_{39}NO_3S_2$ | 2.05 | 0.16 | 0.05 |
| $C_{21}H_{43}N_5O_6S_3$ | 2.05 | 0.29 | 0.24 |
| $C_{21}H_{43}N_3O_7S_2$ | 2.05 | 0.33 | 0.14 |
| $C_{20}H_{41}N_{11}O_{11}$ | 2.05 | 0.55 | 0.55 |
| $C_{21}H_{43}NO_{12}S$ | 2.05 | 0.57 | 0.05 |
| $C_{17}H_{35}N_{11}O_{13}$ | 2.06 | 0.76 | 0.65 |
| $C_{34}H_{70}S_3$ | 2.06 | 0.00 | 0.00 |
| $C_{33}H_{68}O_4S$ | 2.06 | 0.12 | 0.00 |
| $C_{17}H_{35}N_9O_2S_3$ | 2.06 | 0.12 | 0.53 |
| $C_{16}H_{33}N_9O_2S_3$ | 2.06 | 0.13 | 0.56 |
| $C_{31}H_{64}O_5S$ | 2.06 | 0.16 | 0.00 |
| $C_{32}H_{66}O_7S_2$ | 2.06 | 0.22 | 0.00 |
| $C_{14}H_{29}N_3O_2S_2$ | 2.07 | 0.14 | 0.21 |
| $C_{29}H_{60}O_7S_5$ | 2.07 | 0.24 | 0.00 |
| $C_{27}H_{56}N_8O_7S_3$ | 2.07 | 0.26 | 0.30 |
| $C_{29}H_{60}N_6O_8S$ | 2.07 | 0.28 | 0.21 |
| $C_{13}H_{27}N_9S$ | 2.08 | 0.00 | 0.69 |
| $C_{13}H_{27}N_3S_2$ | 2.08 | 0.00 | 0.23 |
| $C_{26}H_{54}N_{10}S$ | 2.08 | 0.00 | 0.38 |
| $C_{26}H_{54}N_2O_4S$ | 2.08 | 0.15 | 0.08 |
| $C_{25}H_{52}N_2O_9S_3$ | 2.08 | 0.36 | 0.08 |
| $C_{13}H_{27}N_5O_5S_2$ | 2.08 | 0.38 | 0.38 |
| $C_{26}H_{54}N_2O_{13}S$ | 2.08 | 0.50 | 0.08 |
| $C_{11}H_{23}NO_9$ | 2.09 | 0.82 | 0.09 |
| $C_{23}H_{48}N_2O_7S$ | 2.09 | 0.30 | 0.09 |
| $C_{23}H_{48}N_2O_8S$ | 2.09 | 0.35 | 0.09 |
| $C_{11}H_{23}N_3O_4S$ | 2.09 | 0.36 | 0.27 |
| $C_{23}H_{48}N_4O_{10}$ | 2.09 | 0.43 | 0.17 |
| $C_{20}H_{42}N_{12}O_{15}$ | 2.10 | 0.75 | 0.60 |
| $C_{20}H_{42}S_3$ | 2.10 | 0.00 | 0.00 |
| $C_{31}H_{65}N_{17}O$ | 2.10 | 0.03 | 0.55 |
| $C_{10}H_{21}N_3O_2S_5$ | 2.10 | 0.20 | 0.30 |
| $C_{20}H_{42}N_2O_5S$ | 2.10 | 0.25 | 0.10 |
| $C_{20}H_{42}N_2O_6S$ | 2.10 | 0.30 | 0.10 |
| $C_{20}H_{42}N_2O_6S_3$ | 2.10 | 0.30 | 0.10 |
| $C_{21}H_{44}O_9S_2$ | 2.10 | 0.43 | 0.00 |
| $C_{28}H_{59}NS_7$ | 2.11 | 0.00 | 0.04 |
| $C_{18}H_{38}N_{10}OS_4$ | 2.11 | 0.06 | 0.56 |
| $C_{28}H_{59}N_3O_6S$ | 2.11 | 0.21 | 0.11 |
| $C_9H_{19}N_3O_2S_5$ | 2.11 | 0.22 | 0.33 |
| $C_{18}H_{38}O_6S_3$ | 2.11 | 0.33 | 0.00 |
| $C_{17}H_{36}N_6S_3$ | 2.12 | 0.00 | 0.35 |
| $C_{26}H_{55}N_5O_4S_3$ | 2.12 | 0.15 | 0.19 |
| $C_{25}H_{53}N_5O_{10}S$ | 2.12 | 0.40 | 0.20 |
| $C_{25}H_{53}N_3O_{11}S_4$ | 2.12 | 0.44 | 0.12 |
| $C_{33}H_{70}N_2O_{15}S_3$ | 2.12 | 0.45 | 0.06 |
| $C_{26}H_{55}NO_{13}S_2$ | 2.12 | 0.50 | 0.04 |
| $C_{16}H_{34}N_2S_5$ | 2.13 | 0.00 | 0.13 |
| $C_{30}H_{64}N_{10}S$ | 2.13 | 0.00 | 0.33 |
| $C_{15}H_{32}N_6S_3$ | 2.13 | 0.00 | 0.40 |
| $C_{15}H_{32}N_6S$ | 2.13 | 0.00 | 0.40 |
| $C_{16}H_{34}N_4OS$ | 2.13 | 0.06 | 0.25 |
| $C_{23}H_{49}N_3O_6S$ | 2.13 | 0.26 | 0.13 |
| $C_{24}H_{51}NO_7S_3$ | 2.13 | 0.29 | 0.04 |
| $C_{24}H_{51}NO_{12}S_2$ | 2.13 | 0.50 | 0.04 |
| $C_{16}H_{34}N_2O_8S$ | 2.13 | 0.50 | 0.13 |
| $C_{29}H_{62}N_{10}S$ | 2.14 | 0.00 | 0.34 |
| $C_{28}H_{60}N_{10}S$ | 2.14 | 0.00 | 0.36 |
| $C_{14}H_{30}N_6S_3$ | 2.14 | 0.00 | 0.43 |
| $C_{21}H_{45}NO_3S_4$ | 2.14 | 0.14 | 0.05 |
| $C_{21}H_{45}N_7O_3S_3$ | 2.14 | 0.14 | 0.33 |
| $C_{29}H_{62}N_2O_5S_2$ | 2.14 | 0.17 | 0.07 |
| $C_{22}H_{47}NO_4S_5$ | 2.14 | 0.18 | 0.05 |
| $C_{29}H_{62}N_2O_6S_2$ | 2.14 | 0.21 | 0.07 |
| $C_{35}H_{75}N_3O_9$ | 2.14 | 0.26 | 0.09 |
| $C_{20}H_{43}N_7O_{12}S_2$ | 2.15 | 0.60 | 0.35 |
| $C_{27}H_{58}N_{10}S$ | 2.15 | 0.00 | 0.37 |
| $C_{26}H_{56}N_{10}S$ | 2.15 | 0.00 | 0.38 |
| $C_{27}H_{58}N_2O_2S$ | 2.15 | 0.07 | 0.07 |
| $C_{13}H_{28}N_6OS$ | 2.15 | 0.08 | 0.46 |
| $C_{26}H_{56}N_2O_3S$ | 2.15 | 0.12 | 0.08 |
| $C_{13}H_{28}O_2S_3$ | 2.15 | 0.15 | 0.00 |
| $C_{20}H_{43}NO_3S_2$ | 2.15 | 0.15 | 0.05 |
| $C_{13}H_{28}N_6O_2S$ | 2.15 | 0.15 | 0.46 |
| $C_{27}H_{58}N_2O_5$ | 2.15 | 0.19 | 0.07 |
| $C_{25}H_{54}N_{10}S$ | 2.16 | 0.00 | 0.40 |
| $C_{19}H_{41}N_9OS_3$ | 2.16 | 0.05 | 0.47 |
| $C_{19}H_{41}N_{11}OS_3$ | 2.16 | 0.05 | 0.58 |
| $C_{25}H_{54}N_{16}O_2S_2$ | 2.16 | 0.08 | 0.64 |
| $C_{25}H_{54}N_2O_2S$ | 2.16 | 0.08 | 0.08 |
| $C_{23}H_{50}N_6S_4$ | 2.17 | 0.00 | 0.26 |
| $C_{24}H_{52}N_2O_2S$ | 2.17 | 0.08 | 0.08 |
| $C_{23}H_{50}N_2O_2S_4$ | 2.17 | 0.09 | 0.09 |
| $C_{24}H_{52}N_2O_3S$ | 2.17 | 0.13 | 0.08 |
| $C_{12}H_{26}N_8O_2S_6$ | 2.17 | 0.17 | 0.67 |
| $C_{12}H_{26}N_6O_2S$ | 2.17 | 0.17 | 0.50 |
| $C_{29}H_{63}N_5O_7S_2$ | 2.17 | 0.24 | 0.17 |
| $C_{24}H_{52}N_2O_6S_3$ | 2.17 | 0.25 | 0.08 |
| $C_{29}H_{63}N_3O_8S_2$ | 2.17 | 0.28 | 0.10 |
| $C_{18}H_{39}N_5O_5S_2$ | 2.17 | 0.28 | 0.28 |
| $C_{12}H_{26}N_2O_{18}$ | 2.17 | 1.50 | 0.17 |
| $C_{22}H_{48}N_2O_{20}$ | 2.18 | 0.91 | 0.09 |
| $C_{22}H_{48}N_2O_{12}S$ | 2.18 | 0.55 | 0.09 |
| $C_{21}H_{46}N_2O_{18}$ | 2.19 | 0.86 | 0.10 |
| $C_{21}H_{46}N_2O_3S_4$ | 2.19 | 0.14 | 0.10 |
| $C_{21}H_{46}N_6O_{12}$ | 2.19 | 0.57 | 0.29 |
| $C_{15}H_{33}N_9S_3$ | 2.20 | 0.00 | 0.60 |
| $C_{10}H_{22}N_2O_2S_5$ | 2.20 | 0.20 | 0.20 |
| $C_{20}H_{44}N_2O_5S$ | 2.20 | 0.25 | 0.10 |
| $C_{20}H_{44}N_{10}O_7S_3$ | 2.20 | 0.35 | 0.50 |
| $C_{29}H_{64}N_{10}S$ | 2.21 | 0.00 | 0.34 |
| $C_{23}H_{51}N_7O_{14}$ | 2.22 | 0.61 | 0.30 |
| $C_{27}H_{60}N_{10}S$ | 2.22 | 0.00 | 0.37 |
| $C_{23}H_{51}N_3OS_4$ | 2.22 | 0.04 | 0.13 |
| $C_{23}H_{51}N_3O_9$ | 2.22 | 0.39 | 0.13 |
| $C_{26}H_{58}N_{10}S$ | 2.23 | 0.00 | 0.38 |
| $C_{21}H_{47}N_7O_{13}S_2$ | 2.24 | 0.62 | 0.33 |
| $C_{25}H_{56}N_{12}O_5S$ | 2.24 | 0.20 | 0.48 |
| $C_{24}H_{54}N_{16}S_3$ | 2.25 | 0.00 | 0.67 |
| $C_8H_{18}N_2S_3$ | 2.25 | 0.00 | 0.25 |
| $C_8H_{18}N_2OS_3$ | 2.25 | 0.13 | 0.25 |

TABLE 5B-continued

Unique Molecular Formulas Identified in the Semi-Humic Composition

| Unique Formulas | H/C | O/C | N/C |
|---|---|---|---|
| $C_{12}H_{27}N_3O_2S_5$ | 2.25 | 0.17 | 0.25 |
| $C_{12}H_{27}N_7O_4S$ | 2.25 | 0.33 | 0.58 |
| $C_8H_{18}N_2O_9$ | 2.25 | 1.13 | 0.25 |

The molecular formulas determined by FTICR-MS can be categorized into compound classes, with some overlap, according to oxygen to carbon (O/C) and hydrogen to carbon (H/C) ratios.[3] Compound classification boundaries are displayed in Table 6.

TABLE 6

H/C and O/C Ratio Based Compound Classification Boundaries

| Compound Type | H/C Ratio | O/C Ratio |
|---|---|---|
| Lipid, Protein and Other Aliphatic (LPOA) | 1.5-2.2 | 0-0.67 |
| Lignin | 0.7-1.5 | 0.1-0.67 |
| Condensed Aromatic | 0.2-0.7 | 0-0.67 |
| Carbohydrate | 1.5-2.4 | 0.67-1.2 |
| Unsaturated Hydrocarbon | 0.7-1.5 | 0-0.1 |

Table 7 displays the percent of total molecular formulas assigned to each compound classification using H/C and O/C boundaries. The actual number of assigned molecular formulas is presented in parentheses. The compound classification percentages of the semi-humic composition fall between the standard humic extract and blood meal solution for LPOA, lignin, condensed aromatic and carbohydrate compound classes. However, there is a notable increase in the percent unsaturated hydrocarbon for the semi-humic composition as compared to the other samples.

TABLE 7

Compound Classification of Molecular Formulas using H/C and O/C Boundaries

| Sample | LPOA | Lignin | Condensed Aromatic | Carbohydrate | Unsaturated Hydrocarbon | Uncategorized |
|---|---|---|---|---|---|---|
| Semi-Humic Composition | 37.0% (742) | 26.5% (532) | 9.0% (181) | 1.5% (31) | 28.5% (573) | 2.7% (54) |
| Standard Humic Extract | 28.3% (482) | 27.4% (467) | 19.3% (328) | 1.3% (22) | 24.8% (423) | 2.5% (43) |
| Blood Meal Solution | 48.8% (706) | 22.0% (318) | 2.3% (34) | 3.4% (49) | 25.4% (368) | 3.0% (44) |

*Percentages of compound classifications for each sample type do not add up to 100% due to overlap of compound classification boundaries An alternative compound classification method uses a Modified Aromaticity Index ($AI_{mod}$) which can be calculated using an established formula based on the elemental components that make up a molecular formula.[4] Table 8 displays the compound classification boundaries for $AI_{mod}$.

TABLE 8

Modified Aromaticity Index ($AI_{mod}$) Based Compound Classification Boundaries

| Compound Type | $AI_{mod}$ |
|---|---|
| Non-Aromatic | ≤0.5 |
| Aromatic | >0.5 & ≤0.67 |
| Condensed Aromatic | >0.67 |

Table 9 displays the percent of total molecular formulas assigned to each compound classification using $AI_{mod}$. The $AI_{mod}$ compound classification percentages for the semi-humic composition fall between the standard humic extract and blood meal solution for non-aromatic and condensed aromatic compound classes. The aromatic compound class, on the other hand, shows a marked increase for the semi-humic composition as compared to the other samples. The difference in percent condensed aromatics calculated with $AI_{mod}$ vs H/C and O/C boundaries could be due to inclusion of some lignin components as condensed aromatics when using $AI_{mod}$.

TABLE 9

Compound Classification of Molecular Formulas using $AI_{mod}$

| Sample | Non-Aromatic | Aromatic | Condensed Aromatic | Uncategorized |
|---|---|---|---|---|
| Semi-Humic Composition | 60.7% (1217) | 19.3% (387) | 19.8% (396) | 0.2% (4) |
| Standard Humic Extract | 48.4% (824) | 15.3% (260) | 36.0% (613) | 0.3% (5) |
| Blood Meal Solution | 71.4% (1033) | 12.5% (181) | 15.8% (228) | 0.3% (4) |

Tables 10 and 11 display the compound classification percentages of the 1507 unique molecular formulas in the semi-humic composition using both H/C and O/C boundaries as well as $AI_{mod}$. The majority of the unique formulas for the semi-humic composition are classified as either LPOA using H/C and O/C boundaries or non-aromatic when using $AI_{mod}$.

TABLE 10

Compound Classification of the 1507 Unique Molecular Formulas in the Semi-Humic Composition using H/C and O/C Boundaries

| Sample | LPOA | Lignin | Condensed Aromatic | Carbohydrate | Unsaturated Hydrocarbon | Uncategorized |
|---|---|---|---|---|---|---|
| Semi-Humic Composition | 34.2% (532) | 24.7% (384) | 8.6% (133) | 1.0% (16) | 28.6% (445) | 2.8% (44) |

TABLE 11

Compound Classification of the 1507 Unique Molecular Formulas in the Semi-Humic Composition using $AI_{mod}$

| Sample | Non-Aromatic | Aromatic | Condensed Aromatic | Uncategorized |
|---|---|---|---|---|
| Semi-Humic Composition | 61.1% (919) | 20.2% (304) | 18.7% (282) | 0.1% (2) |

Figure 3A:
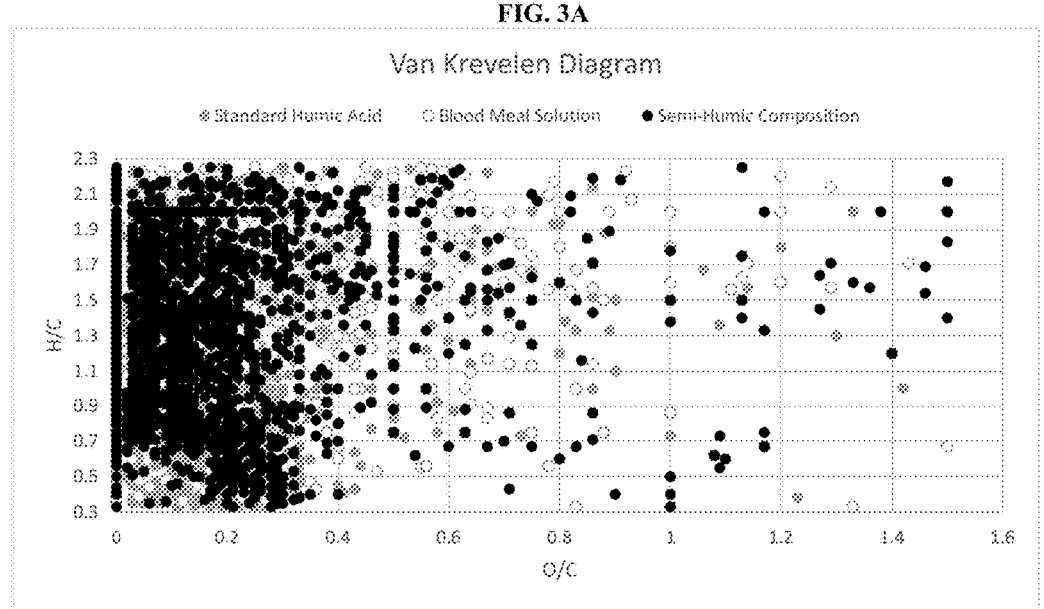
FIGS. 3A, 3B, 4A and 4B show Van Krevelen Diagrams of i) the semi-humic composition overlayed with a standard humic composition and blood meal alone (FIGS. 3A and 4A) and ii) the semi-humic composition alone (FIGS. 3B and 4B).
Figure 3B:
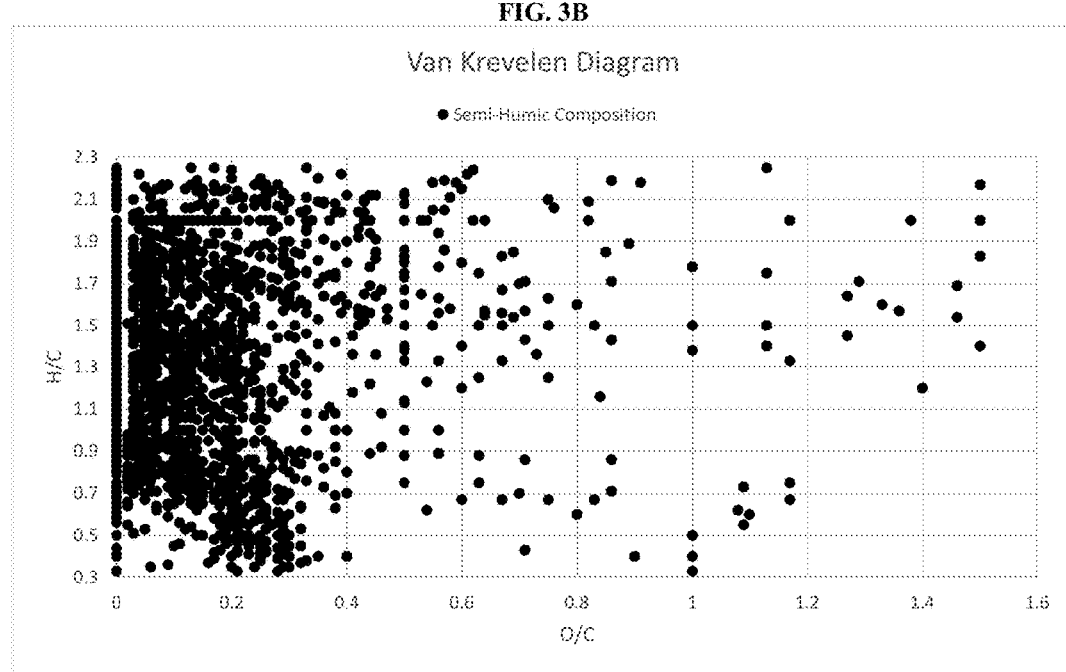
Figure 4A:
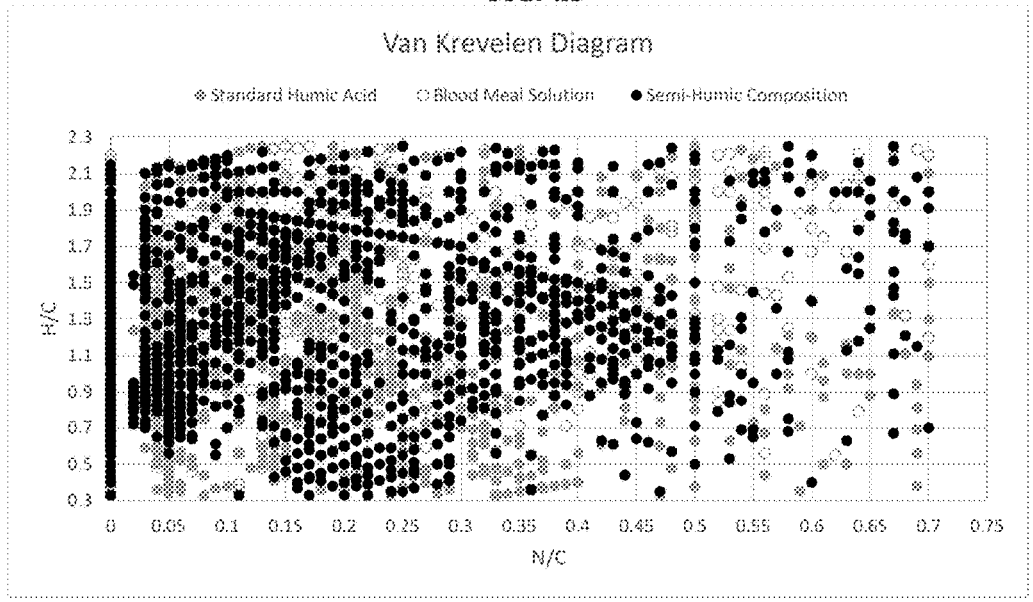
Figure 4B:
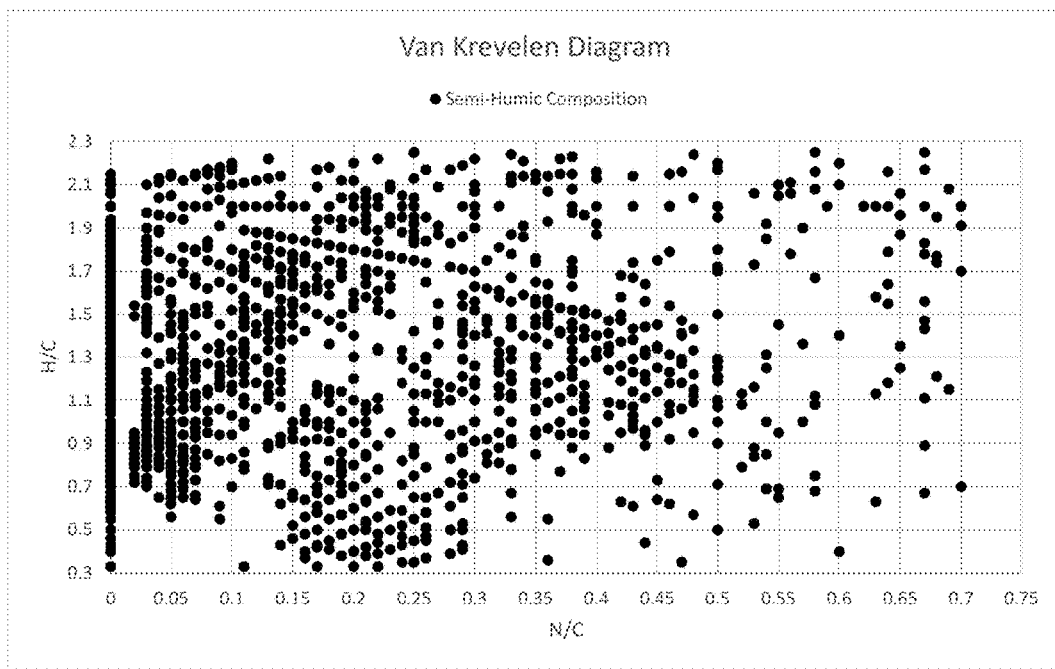

Van Krevelen diagrams allow for a convenient visual representation of FTICR-MS data. Each point in a Van Krevelen diagram represents a molecular formula with a defined H/C, O/C and/or N/C ratio.[5] FIGS. 3A and 4A show Van Krevelen Diagrams of the standard humic acid, blood meal solution and semi-humic composition. FIGS. 3B and 4B show Van Krevelen Diagrams of the semi-humic composition alone.

Conclusion

The ultra-high resolution and mass accuracy of FTICR-MS has allowed for the identification of molecular formulas between m/z 120-700 in the semi-humic composition, standard humic acid and blood meal solution. Results show that all three samples are composed of a significant number of unique molecular formulas. The majority of unique formulas in the semi-humic composition are made up of either LPOA or non-aromatic compounds, depending on the compound classification boundaries used. Further, when compared to the other samples the semi-humic composition has more unsaturated hydrocarbon and an increase in aromatic compounds. The increase in unsaturated hydrocarbon could be the result of base catalyzed elimination reactions. The increase in aromatic compounds, on the other hand, could be the result of the breakdown of larger condensed aromatics or lignin.

REFERENCES

1. Marshall, Alan G., Christopher L. Hendrickson, and George S. Jackson. "Fourier transform ion cyclotron resonance mass spectrometry: a primer." *Mass spectrometry reviews* 17.1 (1998): 1-35.
2. Stubbins, Aron, et al. "Illuminated darkness: Molecular signatures of Congo River dissolved organic matter and its photochemical alteration as revealed by ultrahigh precision mass spectrometry." *Limnology and Oceanography* 55.4 (2010): 1467-1477.
3. Ikeya, Kosuke, et al. "Characterization of the chemical composition of soil humic acids using Fourier transform ion cyclotron resonance mass spectrometry." *Geochimica et Cosmochimica Acta* 153 (2015): 169-182.
4. Blackburn, J. W. T, et al. "Laser desorption/ionization coupled to FT-ICR mass spectrometry for studies of natural organic matter." *Analytical Chemistry Published online* 23 Mar. 2017
5. Kim, Sunghwan, Robert W. Kramer, and Patrick G. Hatcher. "Graphical method for analysis of ultrahigh-resolution broadband mass spectra of natural organic matter, the van Krevelen diagram." *Analytical Chemistry* 75.20 (2003): 5336-5344.

Example 3: Mixing a Standard Humic Extract with Blood Meal does not Result in a Flowable Liquid for Use in Agriculture The semi-humic composition previously described is made up of humic extracts as well blood meal components. In this example a standard humic extract is heated then mixed with blood meal at rates equivalent to the semi-humic composition. This mixture is hereby referred to as Comparison Composition 1.

Methods

Sample Preparation.

A semi-humic composition was prepared as described herein (e.g., FIG. 1B, pH of about 14, mixing at 160° F. for 2 hours). The standard humic extract was prepared by combining 172 g of dry leonardite, 731 g of water and 97 g of 50% (w/w) KOH solution. After mixing for 3 hours, the insoluble residue was removed and the supernatant was isolated resulting in a composition having a pH of about 12. The standard humic extract was heated to 160° F. then mixed with blood meal by stirring with a magnetic stir bar for 1 hour at an equivalent rate to the semi-humic composition, to produce the Comparison Composition 1. Longer mixing times for Comparison Composition 1 were not possible due to phase change, i.e., formation of a gelled material. Table 12 displays the theoretical nitrogen and carbon values of the semi-humic composition and Comparison Composition 1.

TABLE 12

Nitrogen and Carbon Components of the Semi-Humic Composition and Comparison Composition 1

| Sample | Total Nitrogen % | Total Carbon % | Leonardite-Derived Total Carbon % | |
|---|---|---|---|---|
| Semi-Humic Composition | 3 | 13 | 2.94 | Flowable liquid |
| Comparison Composition 1 | 3* | 13* | 2.94* | Gelled solid |

*Theoretical percentages, although no final liquid composition could be formed.

Results

Soon after adding blood meal to the hot standard humic extract, the Comparison Composition 1 solidified. In contrast, the finished semi-humic composition maintains a viscosity of less than 50 cP for a period of at least 3-6 months.

Conclusion

The Comparison Composition 1 does not result in a flowable liquid product for use in agriculture. The semi-humic composition, on the other hand, remains in a flowable liquid phase for months and is ideally suited for use as an agricultural liquid.

Example 4: Nitrogen Mineralization of the Semi-Humic Composition

Ammonium ($NH_4+$) and Nitrate ($NO_3-$) are the primary sources of Nitrogen directly used by most plants. When organic Nitrogen is used as a source of Nitrogen for fertilization, mineralization into ammonium and nitrate forms is required before uptake by most plants. The challenge when using organic Nitrogen as a fertilizer is synchronizing the timing of mineralization with plant demand. Nutrient release curves help determine the correct timing and application rate of organic Nitrogen fertilizers so that Nitrogen is available during the period of plant demand.

Methods

Rosamond Loam soil was collected and prepped by passing material through a 4 mm sieve, mixed thoroughly and stored at 4° C. for no more than two weeks. Next, soil moisture content was determined and moisture content was then adjusted to 55% water filled pore space (WFPS) using a plant mister.[1,2,3] Glass jars with caps containing 1 mm holes for gas exchange were filled with 125 g of soil. Each jar of soil underwent 7 days of pre-incubation at 25° C. in which caps were removed for 1 hour per day and moisture content was corrected to 55% WFPS every 2 days. Soil treatments included the Semi-Humic Composition, Blood Meal Granules and Soil Alone. For each treatment, soil Nitrogen mineralization was measured at three time points (1, 2, 4 and 8 weeks) with three separate jars at each time point.

Results

Table 13 summarizes the treatments and rates of Nitrogen applied. Throughout the incubation period moisture content was maintained at 55% WFPS.

TABLE 13

Rates and Treatments

| Treatment | Field Equivalent Rate | Sampling Time | Replications | Total Jars |
|---|---|---|---|---|
| Soil Alone | — | 0, 1, 2, 4 and 8 weeks | 3 | 12 |
| Semi-Humic Composition* | 300 lbs N/ac | 1, 2, 4 and 8 weeks | 3 | 9 |
| Blood Meal Granules | 300 lbs N/ac | 1, 2, 4 and 8 weeks | 3 | 9 |

*The material used was Composition 1 (see also Examples 1 and 5)

Figure 5:
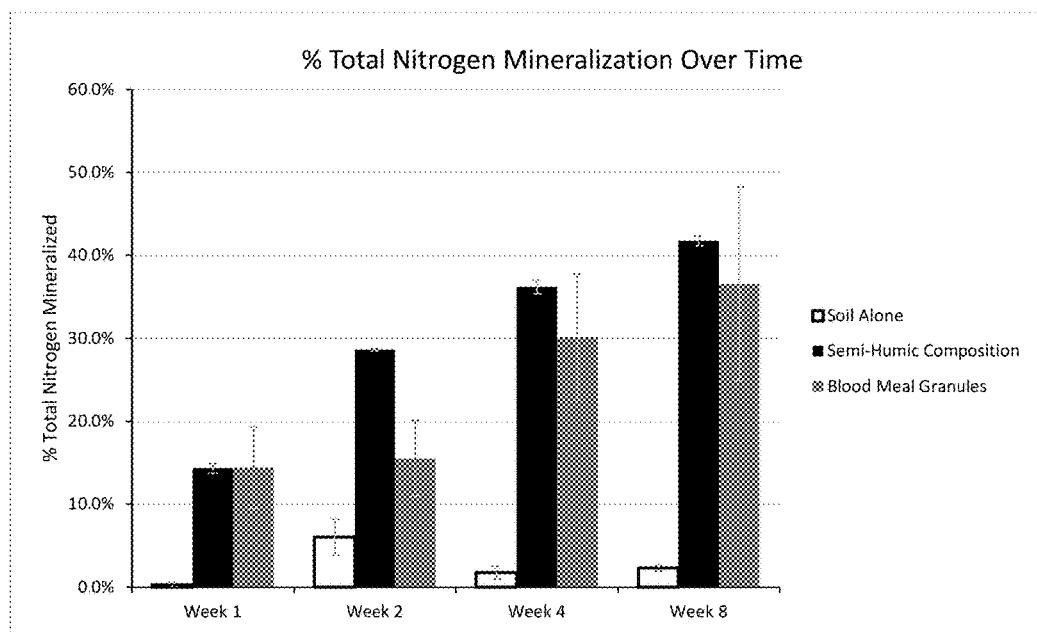
FIG. 5 shows the percent of total nitrogen mineralized over time using the semi-humic composition.

FIG. 5 summarizes results of soil Nitrogen mineralization over an eight week period. For weeks 2, 4 and 8 ANOVA results between treatments are significant ($p<0.05$). For week 1, ANOVA results are not significant between the Semi-Humic Composition and Blood Meal Granules treatments.

Conclusion

The Semi-Humic Composition provides more mineralized Nitrogen at two weeks and four weeks compared to Blood Meal Granules at the same rate of Nitrogen. In addition, the standard deviations of measured mineralized soil Nitrogen at each time point from the Semi-Humic Composition are almost an order of magnitude smaller than the Blood Meal Granules treatment. This suggests that the Semi-Humic Composition can provide faster and more consistent mineralized Nitrogen to meet plant demand.

REFERENCES

1. Abbasi, M. K., et al. "Impact of the addition of different plant residues on carbon-nitrogen content and nitrogen mineralization-immobilization turnover in a soil incubated under laboratory conditions." *Solid Earth Discussions* 6 (2014): 3051-3074.
2. Honeycutt, C. W., et al. "Protocols for nationally coordinated laboratory and field research on manure nitrogen mineralization." *Communications in soil science and plant analysis* 36.19-20 (2005): 2807-2822.
3. Goos, R. J. "A laboratory exercise to demonstrate nitrogen mineralization and immobilization." *Journal of Natural Resources and Life Sciences Education* 24.1 (1995): 68-70.

Example 5: Effect of the New Substance on Plant Growth

Introduction

The semi-humic composition as prepared in Example 1 (Composition 1) could be a valuable tool for use in organic farming. It is contemplated that forms of Nitrogen in Composition 1 will mineralize more rapidly than other organic Nitrogen sources (animal manure, green manure or compost, blood meal, etc.). Moreover, Composition 1, a liquid suspension, will be easier to apply at lower application rates than many other organic Nitrogen sources. The purpose of this study was to evaluate how plant growth is affected by Composition 1, in comparison to other organic Nitrogen sources.

Materials and Methods

Soil

The soil used was a Rosamond Loam soil collected in Lancaster, Calif. mixed with vermiculite at a 70:30 ratio by weight.

Plants and Transplanting

Commercially available pepper plants were raised from seed and transplanted, one plant per pot, into small pots (length×width×height=4 inches×4 inches×6 inches) on Day 0. Five plants were tested per treatment. Pots were arranged in a randomized complete block design on benches in the greenhouse at the Actagro R&D Facility in Biola, Calif. Temperatures ranged from 68 F to 87 F during the study. Macro and micro nutrients other than nitrogen were applied equally to all pots, to ensure that other nutrients were not limiting.

Nitrogen Sources and Nitrogen Application

Treatments were designed to match nitrogen rate at two levels for each treatment of interest. Liquid treatments were measured and applied by hand to the soil surface using a syringe on Day 0. The second application was made on Day 14. In the case of the dry blood meal treatments the material was spread on the soil surface in a circular pattern about one inch from the base of the pepper plants. The treatment list is shown in Table 14.

TABLE 14

Treatment list. The amounts shown were applied twice to all plants.

| Treatment | Description | Applied N, lbs N/acre |
|---|---|---|
| 1 | Control | 0 |
| 2 | Composition 1 | 40 |
| 3 | Composition 1 | 80 |
| 4 | Dry Blood meal | 40 |
| 5 | Dry blood meal | 80 |

Note:
Composition 1 ("Semi-humic composition") is described in Example 1.

Note: Applications were made with added water as needed such that an equal amount of liquid was applied to each pot.

Measurements & Data Analysis

All plants were harvested on Day 29, when plants were about 9-10 inches tall. Plant root length and shoot height was recorded for each plant. Plant roots were carefully washed to remove soil. Each plant was divided into shoot and root, their lengths were recorded, fresh weights were recorded, and then plants were dried at 70° C. for 3 days until constant weight. After drying, plant parts were weighed separately and totaled. Shoots were analyzed for % N by Total Nitrogen via dry combustion.

All data were analyzed by Analysis of Variance (ANOVA). Where significant differences were detected at $p<0.10$, mean separation was performed using Duncan's new multiple range (MRT) test.

Results and Discussion

TABLE 15

Results of ANOVA for the parameters measured in Example 5.

| Response variable | p-value | Conclusion | Further Analysis |
|---|---|---|---|
| Root length, inches | 0.99 | No significant treatment effect | None |
| Shoot length, inches | 0.25 | | |
| Root fresh weight, g | 0.39 | | |

TABLE 15-continued

Results of ANOVA for the parameters measured in Example 5.

| Response variable | p-value | Conclusion | Further Analysis |
|---|---|---|---|
| Shoot fresh weight, g | 0.99 | | |
| Total fresh weight, g | 0.99 | | |
| Shoot dry weight, g | 0.27 | | |
| Root dry weight, g | 0.0005 | Treatment effect is significant | Duncan's MRT (see FIG. 6) |
| Total dry weight, g (=sum of root + shoot) | 0.095 | Primary treatment effect appears to be the effect on roots | None |
| % N in shoots | 0.0001 | Treatment effect is significant | Duncan's MRT (see FIG. 7) |

As shown in Table 15, significant treatment effects were observed at the 5% level on root dry weight and on % N in shoots. Treatment means and Duncan's MRT results for these two parameters are shown in FIGS. 6 and 7.

Figure 6:
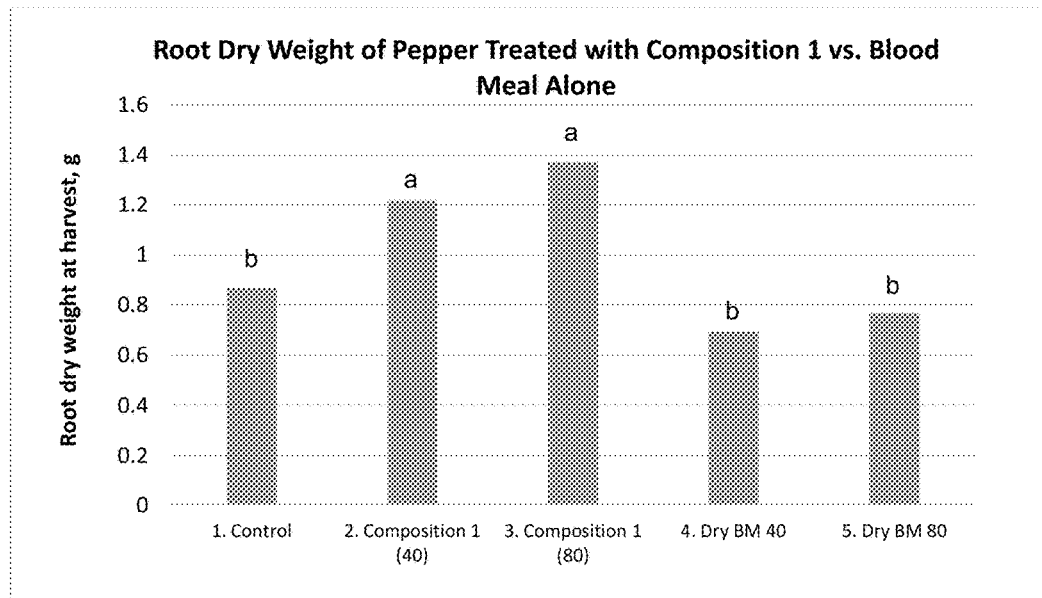
FIG. 6 shows the mean root weight of pepper at harvest as affected by Composition 1 compared to blood meal alone and the untreated control.

FIG. 6 shows the results for root dry weight, where columns with different letters are significantly different by Duncan's Multiple Range Test (p=0.05). It can be seen from FIG. 6 that pepper roots treated with Composition 1 had significantly greater root biomass than those treated with blood meal alone at either Nitrogen rate (Treatments 4-5). Root biomass is a good indicator of plant growth and is one predictor of eventual plant yield.

Figure 7:
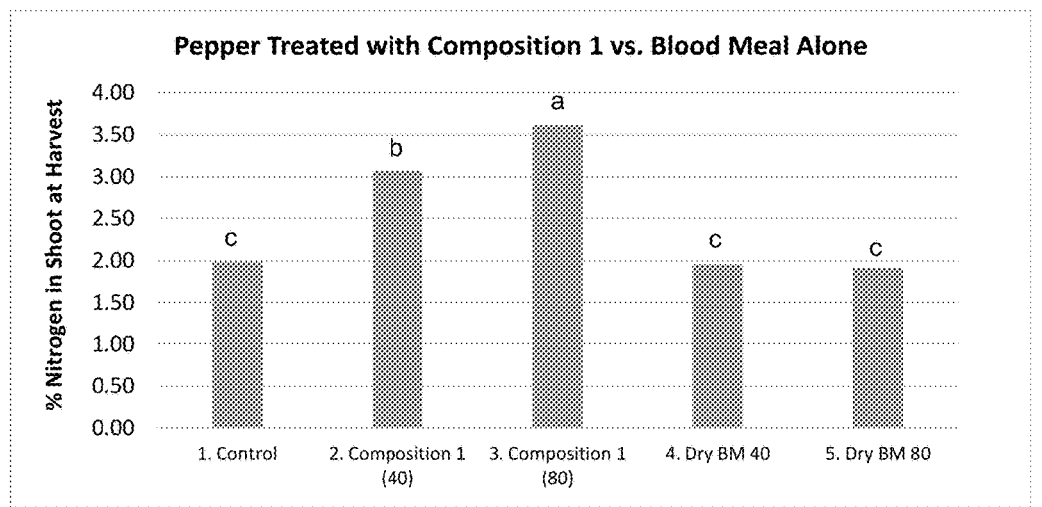
FIG. 7 shows the mean percent nitrogen content in pepper shoots at harvest as affected by Composition 1 and blood meal alone.

FIG. 7 shows the percent nitrogen in shoot biomass of peppers at harvest across treatments. Columns with different letters are significantly different by Duncan's Multiple Range Test. (p=0.01). It can be seen from FIG. 7 that shoot nitrogen content of pepper plants treated with Composition 1 had significantly greater nitrogen content than blood meal by itself at both rates of nitrogen (Treatments 4-5). It is well known that plant nitrogen content is correlated to subsequent plant development and yield. It should be noted that this trial was not designed to measure pepper yield.

Overall, FIGS. 6 and 7 show that Composition 1 was superior to blood meal alone (Treatments 4 and 5) in certain key plant growth parameters. Therefore, these results support the conclusion that Composition 1 would be a superior source of nitrogen that is readily used by the crop for its growth and development, for use by organic farmers.

What is claimed is:

1. A process for preparing a semi-humic composition derived from leonardite, said process comprising the steps of:
    (a) heating an aqueous composition of leonardite ore in the presence of sodium hydroxide or potassium hydroxide to a temperature of about 160° F. or higher to provide a composition having a liquid portion and a solids portion;
    (b) mixing blood meal with the composition of step (a) and heating to a temperature of at least about 160° F. for at least about 2 hours, and optionally further removing solids, to provide the semi-humic composition.

2. The process of claim 1, wherein the process further comprises the step of separating the liquid portion from the solids portion of step (a).

3. The process of claim 2, wherein the mixing of step (b) comprises mixing the blood meal with the liquid portion of step (a).

* * * * *